(12) United States Patent
Chiang et al.

(10) Patent No.: US 12,124,017 B2
(45) Date of Patent: Oct. 22, 2024

(54) OPTICAL LENS, CAMERA MODULE, AND ELECTRONIC DEVICE

(71) Applicant: HUAWEI TECHNOLOGIES CO., LTD., Guangdong (CN)

(72) Inventors: Yita Chiang, Dongguan (CN); Xiaodan Yu, Dongguan (CN); Haiyan Wang, Shenzhen (CN); Haishui Ye, Shanghai (CN); Zhantao Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 17/923,658

(22) PCT Filed: May 10, 2021

(86) PCT No.: PCT/CN2021/092556
§ 371 (c)(1),
(2) Date: Nov. 7, 2022

(87) PCT Pub. No.: WO2021/244223
PCT Pub. Date: Dec. 9, 2021

(65) Prior Publication Data
US 2023/0185063 A1   Jun. 15, 2023

(30) Foreign Application Priority Data

May 30, 2020   (CN) .......................... 202010480875.1

(51) Int. Cl.
*G02B 13/06* (2006.01)
*G02B 9/62* (2006.01)
(Continued)

(52) U.S. Cl.
CPC ............... *G02B 13/06* (2013.01); *G02B 9/62* (2013.01); *G02B 13/0045* (2013.01); *G02B 27/0025* (2013.01)

(58) Field of Classification Search
CPC ...... G02B 13/06; G02B 9/62; G02B 13/0045; G02B 27/0025; G02B 13/08; G02B 13/0015; G03B 30/00
See application file for complete search history.

(56) References Cited

U.S. PATENT DOCUMENTS

2014/0204478 A1* 7/2014 Asami ................ G02B 13/0045
359/752
2016/0011401 A1   1/2016 Chen et al.
(Continued)

FOREIGN PATENT DOCUMENTS

CN   204556941 U   8/2015
CN   109100854 A   12/2018
(Continued)

*Primary Examiner* — Gevell V Selby
(74) *Attorney, Agent, or Firm* — HUAWEI TECHNOLOGIES CO., LTD.

(57) ABSTRACT

This application provides an optical lens, a camera module, and an electronic device. The optical lens includes a first lens, a second lens, a third lens, a fourth lens, a fifth lens, and a sixth lens that are sequentially arranged from an object side to an image side. The first lens, the third lens, and the fifth lens all have positive focal power, the second lens and the fourth lens both have negative focal power, and the sixth lens has positive focal power or negative focal power. Object side surfaces and image side surfaces of the first lens to the sixth lens include at least one anamorphic aspherical surface. When the optical lens is applied to the camera module and the electronic device, the camera module and the electronic device can implement ultra-wide-angle photographing, and can also resolve a distortion problem in ultra-wide-angle imaging to a large degree.

19 Claims, 18 Drawing Sheets

(51) Int. Cl.
    *G02B 13/00*       (2006.01)
    *G02B 27/00*       (2006.01)

(56) References Cited

U.S. PATENT DOCUMENTS

| | | | |
|---|---|---|---|
| 2019/0302425 A1* | 10/2019 | Zeng | G02B 13/0045 |
| 2020/0057230 A1 | 2/2020 | Chang et al. | |
| 2021/0096340 A1* | 4/2021 | Li | G02B 13/10 |
| 2021/0364758 A1* | 11/2021 | Yu | G02B 9/62 |

FOREIGN PATENT DOCUMENTS

| | | |
|---|---|---|
| CN | 109375349 A | 2/2019 |
| CN | 110531502 A | 12/2019 |
| CN | 110596864 A | 12/2019 |
| CN | 111045193 A | 4/2020 |
| CN | 111679410 A | 9/2020 |
| CN | 111722371 A | 9/2020 |

\* cited by examiner

OPTICAL LENS, CAMERA MODULE, AND ELECTRONIC DEVICE

CROSS-REFERENCE TO RELATED APPLICATIONS

This application is a national stage of International Application No. PCT/CN2021/092556, filed on May 10, 2021, which claims priority to Chinese Patent Application No. 202010480875.1, filed on May 30, 2020. Both of the aforementioned applications are hereby incorporated by reference in their entireties.

TECHNICAL FIELD

This application relates to the lens field, and in particular, to an optical lens, a camera module, and an electronic device.

BACKGROUND

In recent years, a requirement for photographing by using a mobile phone is increasingly high. In particular, with popularization of a large-size high-pixel-density CMOS (complementary metal oxide semiconductor, complementary metal-oxide-semiconductor) chip, major manufacturers impose a stricter requirement on imaging quality while pursuing lightening, thinning, and miniaturization of a lens. However, a conventional mobile phone has obvious imaging distortion. Currently, to resolve a distortion problem, distortion is usually reduced through cropping by using an algorithm or distortion compensation by using an algorithm. However, performing distortion compensation by using an algorithm has a risk of losing resolution. In addition, system resources need to be consumed when real-time correction is implemented in a video application scenario or a photographing preview mode. This poses a great challenge to device power consumption, heat dissipation, a processing speed, and the like.

SUMMARY

This application provides an optical lens, a camera module, and an electronic device. Focal power of a first lens to a sixth lens is designed, and object side surfaces and image side surfaces of the first lens to the sixth lens include at least one anamorphic aspherical surface, so that ultra-wide-angle setting of the optical lens is implemented, and imaging distortion can also be reduced to a large degree.

According to a first aspect, this application provides an optical lens. The optical lens includes a first lens, a second lens, a third lens, a fourth lens, a fifth lens, and a sixth lens that are sequentially arranged from an object side to an image side. The first lens, the third lens, and the fifth lens all have positive focal power. The second lens and the fourth lens both have negative focal power. The sixth lens has positive focal power or negative focal power.

Object side surfaces and image side surfaces of the first lens to the sixth lens include at least one anamorphic aspherical surface.

It should be noted that in this embodiment of this application, when a lens is used as a boundary, a side on which a photographed object is located is an object side, and a surface of the lens that faces the object side may be referred to as an object side surface; and when a lens is used as a boundary, a side on which an image of a photographed object is located is an image side, and a surface of the lens that faces the image side may be referred to as an image side surface.

In this implementation, the first lens, the third lens, and the fifth lens have positive focal power through setting, the second lens and the fourth lens have negative focal power through setting, and the sixth lens has positive focal power or negative focal power through setting. Therefore, when it is ensured that the optical lens implements good imaging quality, a field of view of the optical lens can be increased to a large degree to implement ultra-wide-angle setting of the optical lens.

It may be understood that, as the field of view of the optical lens is increased, imaging distortion of the optical lens becomes more obvious. For example, when the field of view of the optical lens reaches 100°, imaging distortion of the optical lens has been greater than 10%. An optical lens that can implement ultra-wide-angle photographing has more obvious imaging distortion and poorer imaging quality. In this implementation, at least one anamorphic aspherical surface is disposed in the lenses of the optical lens that implements an ultra-wide-angle design. Therefore, a design degree of freedom of an optical system is improved. In addition, imaging quality of the optical lens can be optimized and distortion of the optical lens can be corrected by using asymmetry of a free region, so that good imaging quality of the optical lens is ensured.

Therefore, the optical lens in this implementation can implement ultra-wide-angle photographing, and can also resolve a distortion problem in ultra-wide-angle imaging to a large degree. In other words, in this implementation, the ultra-wide-angle optical lens with small imaging distortion is designed.

In an implementation, a focal length f1 of the first lens and a focal length f2 of the second lens meet $-0.5 < f2/f1 < -0.01$.

It may be understood that, when the focal length f1 of the first lens and the focal length f2 of the second lens meet the foregoing relation, the first lens and the second lens can cooperate well, to collect light with a large field of view to a large degree and implement ultra-wide-angle setting of the optical lens.

In an implementation, the focal length f1 of the first lens and the focal length f2 of the second lens meet $-0.35 \leq f2/f1 \leq -0.03$.

In an implementation, a focal length f3 of the third lens and a focal length f4 of the fourth lens meet $-4 < f4/f3 < 0$.

It may be understood that, when the focal length f3 of the third lens and the focal length f4 of the fourth lens meet the foregoing relation, the third lens and the fourth lens can cooperate well, so that pupil aberration in imaging by the optical lens is well corrected. In addition, the third lens and the fourth lens can reduce a divergence angle of light passing through the second lens.

In an implementation, the focal length f3 of the third lens and the focal length f4 of the fourth lens meet $-2.5 \leq f4/f3 < 0$.

In an implementation, a focal length f5 of the fifth lens and a focal length f of the optical lens meet $0.1 < f5/f < 1.5$.

It may be understood that, when the focal length f5 of the fifth lens and the focal length f of the optical lens meet the foregoing relation, focal power of the fifth lens can be properly allocated, so that the fifth lens has a good aberration correction effect.

In an implementation, the focal length f5 of the fifth lens and the focal length f of the optical lens meet $0.5 \leq f5/f \leq 1$.

In an implementation, a curvature radius R6 of the image side surface of the third lens and a curvature radius R10 of the image side surface of the fifth lens meet $0 < R6/R10 < 2.9$.

It may be understood that, when the curvature radius R6 of the image side surface of the third lens and the curvature radius R10 of the image side surface of the fifth lens meet the foregoing relation, the third lens and the fifth lens can reduce a divergence angle of light as much as possible and correct system field curvature and distortion, to implement a better imaging effect.

In an implementation, the curvature radius R6 of the image side surface of the third lens and the curvature radius R10 of the image side surface of the fifth lens meet 0<R6/R10≤2.

In an implementation, a distance T45 between the fourth lens and the fifth lens and the focal length f of the optical lens meet 0.05<T45/f<0.4.

It may be understood that, when the distance T45 between the fourth lens and the fifth lens and the focal length f of the optical lens meet the foregoing relation, curvature of the object side surface of the fifth lens can be well controlled. In this case, the fifth lens has low manufacturing difficulty and good practicability.

In an implementation, the distance T45 between the fourth lens and the fifth lens and the focal length f of the optical lens meet 0.1≤T45/f≤0.3.

In an implementation, the optical lens meets 0<(T23+T56)/TTL<0.5.

T23 is a distance between the second lens and the third lens, T56 is a distance between the fifth lens and the sixth lens, and TTL is a distance from the object side surface of the first lens to an imaging plane in an optical axis direction of the optical lens.

It may be understood that, when the optical lens meets the foregoing relation, the total track length (TTL) of the optical lens can be well controlled to facilitate miniaturization setting of the optical lens. In addition, a system height of the optical lens can also be well reduced to facilitate thinning setting of the optical lens.

In an implementation, the optical lens meets 0<(T23+T56)/TTL≤0.3.

In an implementation, the at least one anamorphic aspherical surface includes a first vertex and a second vertex. The first vertex and the second vertex are located in an optical effective region of the anamorphic aspherical surface, and are both located on a sagittal plane of a lens in which the anamorphic aspherical surface is located. The first vertex and the second vertex are symmetric with respect to a meridional plane of the lens in which the anamorphic aspherical surface is located.

A distance from the first vertex to a first reference plane is equal to a distance from the second vertex to the first reference plane, the first reference plane is perpendicular to an optical axis of the optical lens, and a point at which the optical axis of the optical lens intersects the anamorphic aspherical surface is located on the first reference plane.

It may be understood that, through setting, the first vertex and the second vertex are symmetric with respect to the meridional plane of the lens in which the anamorphic aspherical surface is located, and the distance from the first vertex to the first reference plane is equal to the distance from the second vertex to the first reference plane. Therefore, the optical lens can implement a better correction effect, and obtain high-quality imaging.

In an implementation, the anamorphic aspherical surface further includes a third vertex and a fourth vertex. The third vertex and the fourth vertex are both located in the optical effective region of the anamorphic aspherical surface, and are both located on the meridional plane of the lens in which the anamorphic aspherical surface is located. The third vertex and the fourth vertex are symmetric with respect to the sagittal plane of the lens in which the anamorphic aspherical surface is located.

A distance from the third vertex to the first reference plane is equal to a distance from the fourth vertex to the first reference plane.

It may be understood that, through setting, the third vertex and the fourth vertex are symmetric with respect to the sagittal plane of the lens in which the anamorphic aspherical surface is located, and the distance from the first vertex to the first reference plane is equal to the distance from the third vertex to the first reference plane. Therefore, the optical lens can implement a better correction effect, and obtain high-quality imaging.

In an implementation, the optical lens includes a stop, and the stop is located between the second lens and the third lens.

It may be understood that the stop is configured to limit an amount of admitted light to change imaging brightness. In addition, when the stop is located between the second lens and the third lens, the stop can properly allocate functions of the first lens to the sixth lens. For example, the first lens and the second lens can be configured to receive light with a large field of view to a large degree, and the third lens to the sixth lens can be configured to correct aberration. In this case, the optical lens in this implementation has a small quantity of lenses configured to enlarge the field of view. This helps simplify a structure of the optical lens. In addition, the optical lens in this implementation has a large quantity of lenses configured to correct aberration. This helps obtain good imaging quality. In addition, when the stop is located between the second lens and the third lens, this helps correct aberration of the stop.

In an implementation, the optical lens meets |TDT|≤5.0%, and TDT is a maximum value of TV distortion in an imaging range of the optical lens.

It may be understood that, when the optical lens meets |TDT|≤5.0%, distortion of the optical lens is small, and imaging quality of the optical lens is good.

In an implementation, the optical lens meets 100°≤FOV≤140°, and FOV is a field of view of the camera lens group.

It may be understood that, when the field of view (FOV) of the optical lens meets 100°≤FOV≤140°, the optical lens has a large field of view, namely, ultra-wide-angle setting of the optical lens is implemented.

In an implementation, the optical lens meets 135°<FOV≤140°.

In an implementation, the optical lens meets 0<ImagH/TTL<1, where TTL is the distance from the object side surface of the first lens to the imaging plane in the optical axis direction of the optical lens, and ImagH is an imaging height on the imaging plane.

It may be understood that, when the optical lens meets the foregoing relation, the imaging height on the imaging plane of the optical lens is large, namely, imaging quality of the optical lens is good. In addition, the total track length of the optical lens is small. This facilitates application to a thin electronic device such as a mobile phone or a tablet.

According to a second aspect, this application provides a camera module, where the camera module includes a circuit board, a photosensitive chip, and the foregoing optical lens, the photosensitive chip and the optical lens are both fastened to the circuit board, and the optical lens is configured to project ambient light to the photosensitive chip.

In this embodiment, when the optical lens is applied to the camera module, the camera module implements ultra-wide-angle photographing, and can also reduce imaging distortion to a large degree. In addition, a manner in which the camera module reduces imaging distortion does not consume system resources.

According to a third aspect, this application provides an electronic device. The electronic device may be a mobile phone, a tablet computer, or the like. The electronic device includes a housing and the foregoing camera module, and the camera module is mounted in the housing.

In this embodiment, when the camera module is applied to the electronic device, the electronic device implements ultra-wide-angle photographing, and can also reduce imaging distortion to a large degree. In addition, a manner in which the electronic device reduces imaging distortion does not consume system resources.

DESCRIPTION OF EMBODIMENTS

Figure 1:
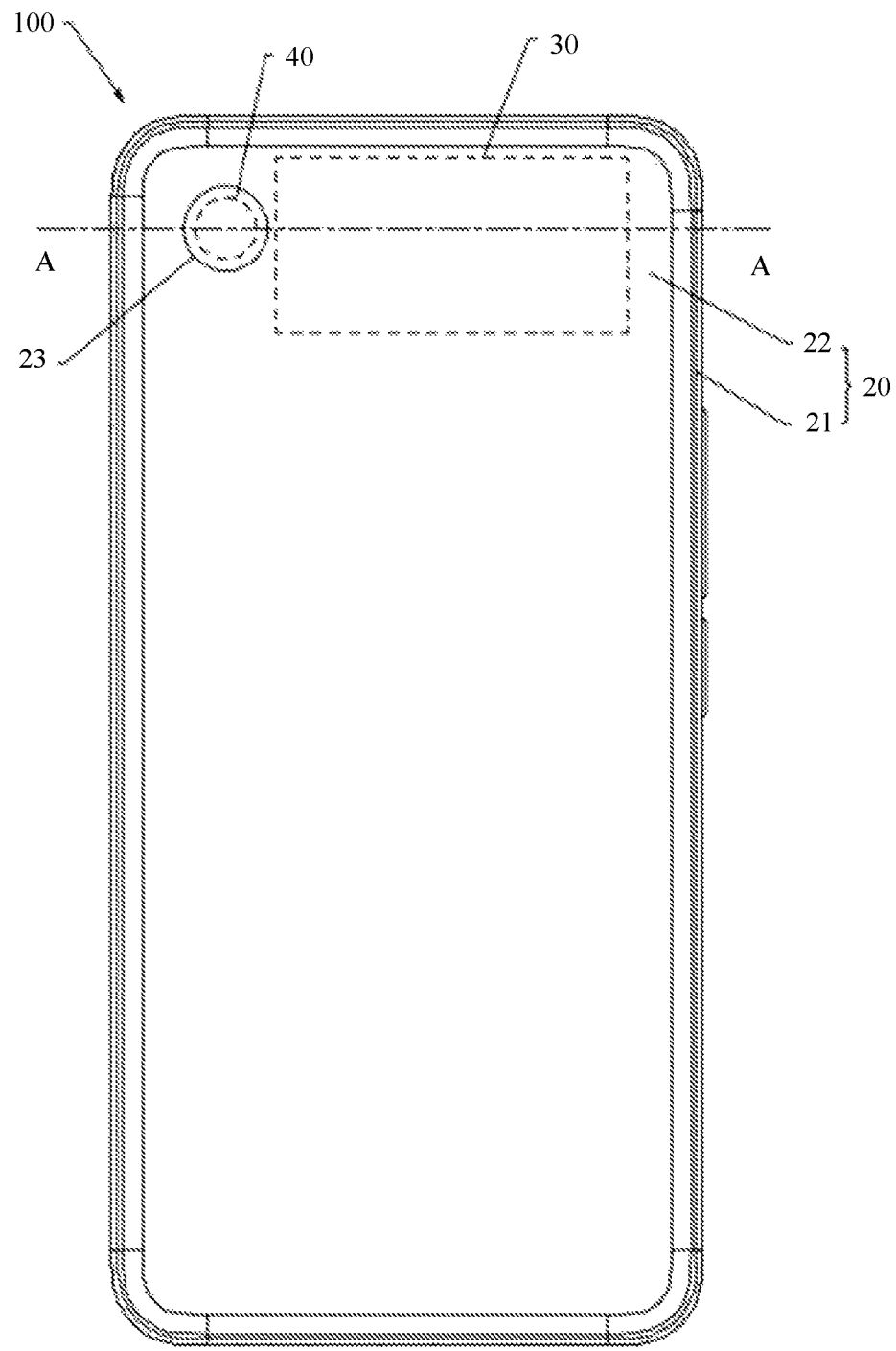
FIG. 1 is a schematic diagram of a structure of an electronic device according to an embodiment of this application.

To facilitate understanding of an optical lens provided in the embodiments of this application, related nouns used in this application are explained.

An optical axis is an axis passing through a center of each lens.

When a lens is used as a boundary, a side on which a photographed object is located is an object side, and a surface of the lens that is close to the object side is referred to as an object side surface.

When a lens is used as a boundary, a side on which an image of a photographed object is located is an image side, and a surface of the lens that is close to the image side is referred to as an image side surface.

Positive focal power may also be referred to as positive refractive power, and indicates that a lens has a positive focal length.

Negative focal power may also be referred to as negative refractive power, and indicates that a lens has a negative focal length.

A focal length (focal length), also referred to as a focal length, is a measurement manner of measuring convergence or divergence of light in an optical system, and is a vertical distance from an optical center of a lens or a lens group to a focal plane when a clear image of an infinite scene is formed on the focal plane by using the lens or the lens group. From a practical perspective, the focal length may be understood as a distance from a center of a lens to an imaging plane. A position of an optical center of a fixed-focus lens is fixed.

Field of view (field of view, FOV): In an optical instrument, a lens of the optical instrument is used as a vertex, and an included angle formed by two edges of a maximum range that an object image of a measured object can pass through the lens is referred to as a field of view. The field of view determines a view range of the optical instrument. A larger field of view indicates a larger view range and a smaller optical rate.

An aperture is an apparatus configured to control an amount of light passing through a lens, and is usually in the lens. A size of the aperture may be represented by an F-number (symbol: Fno).

The F-number is a ratio (a reciprocal of a relative aperture) of a focal length of a lens to a diameter of a clear aperture of the lens. A smaller F-number indicates a larger amount of admitted light in a same unit of time. A larger F-number indicates a smaller depth of field, so that photographed background content is blurred. This is similar to an effect achieved by a long-focus lens.

A total track length (total track length, TTL) is a distance from an object side surface of a first lens of an optical lens to an imaging plane in a direction from an object side to an image side.

An entrance pupil diameter (entrance pupil diameter, EPD) is a ratio of a focal length of the optical lens to the F-number.

The Abbe number, namely, a dispersion coefficient, is a ratio between differences between refractive indexes of an optical material at different wavelengths, and represents a dispersion degree of the material.

Distortion (distortion), also referred to as distortion, is a degree at which an image formed by the optical system for an object is distorted relative to the object. Distortion is caused because a height of a point at which chief rays with different fields of view intersect a Gaussian imaging plane after the chief rays pass through the optical system is not equal to an ideal imaging height due to an impact of stop spherical aberration, and a difference between the two heights is distortion. Therefore, distortion only changes an imaging position of an off-axis object point on an ideal plane, so that a shape of an image is distorted, but definition of the image is not affected.

TV distortion (TV distortion) is relative distortion, namely, a degree at which an actual image is deformed.

TDT represents a maximum value of TV distortion in an imaging range of the optical lens.

ImagH (imaging height) represents a half diagonal length of an effective pixel region on a photosensitive chip, namely, an imaging height on the imaging plane.

A chief ray (a chief light beam) is emitted from an edge of an object, passes through a center of an aperture stop, and finally reaches an edge of an image.

For a meridian plane, a plane formed by the chief ray (the chief light beam) from the object point off the optical axis and the optical axis is referred to as the meridian plane.

For a sagittal plane, a plane that passes through the chief ray (the chief light beam) from the object point off the optical axis and is perpendicular to the meridian plane is referred to as the sagittal plane.

First, the following specifically describes specific structures of an electronic device, a camera module, and an optical lens with reference to related accompanying drawings.

FIG. 1 is a schematic diagram of a structure of an electronic device according to an embodiment of this application. An electronic device 100 may be a mobile phone, a tablet computer (tablet personal computer), a laptop computer (laptop computer), a personal digital assistant (personal digital assistant, PDA), a camera, a personal computer, a notebook computer, a vehicle-mounted device, a wearable device, augmented reality (augmented reality, AR) glasses, an AR helmet, virtual reality (virtual reality, VR) glasses, a VR helmet, or another form of device with a photographing function. The electronic device 100 in the embodiment shown in FIG. 1 is described by using the mobile phone as an example.

Figure 2:
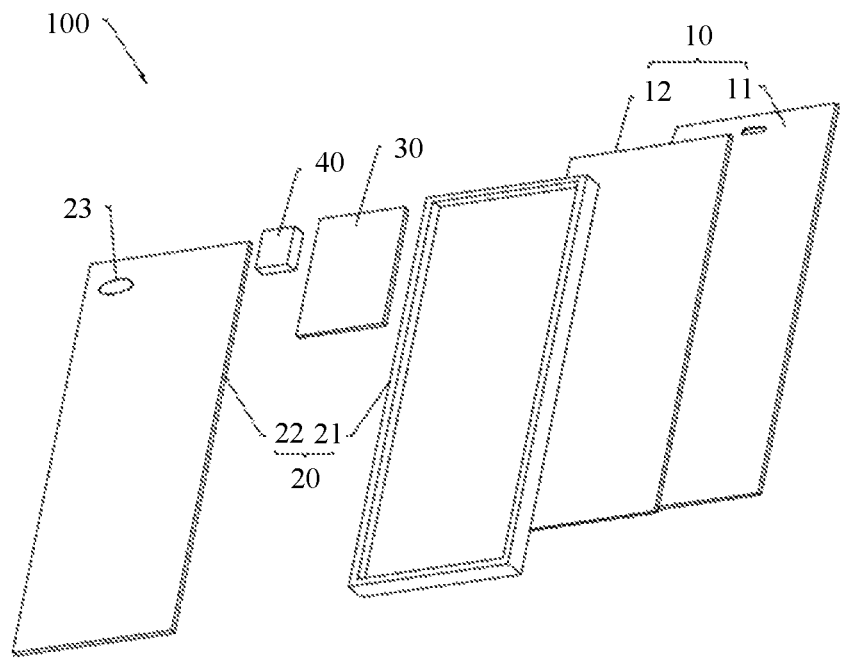
FIG. 2 is a partial schematic exploded view of the electronic device shown in FIG. 1.

With reference to FIG. 1, FIG. 2 is a partial schematic exploded view of the electronic device shown in FIG. 1. The electronic device 100 includes a screen 10, a housing 20, a host circuit board 30, and a camera module 40. It may be understood that FIG. 1 and FIG. 2 schematically show only some components included in the electronic device 100. Actual shapes, actual sizes, actual positions, and actual structures of these components are not limited in FIG. 1 and FIG. 2. In addition, when the electronic device 100 is another form of device, the electronic device 100 may not include the screen 20 and the host circuit board 30.

The screen 10 may be configured to display an image, a text, or the like. The screen 10 may be a flat screen, or may be a curved screen. In addition, the screen 10 includes a protection cover 11 and a display screen 12. The protection cover 11 is stacked on the display screen 12. The protection cover 11 may be disposed against the display screen 12, and may be mainly configured to protect the display screen 12 and protect against dust. A material of the protection cover 11 may be but is not limited to glass. The display screen 12 may be an organic light-emitting diode (organic light-emitting diode, OLED) display screen, an active-matrix organic light-emitting diode (active-matrix organic light-emitting diode, AMOLED) display screen, a quantum dot light-emitting diode (quantum dot light emitting diodes, QLED) display screen, or the like.

The housing 20 may be configured to support the screen 10. The housing 20 includes a frame 21 and a rear cover 22. The rear cover 22 and the screen 10 are respectively mounted on two opposite sides of the frame 21. In this case, the rear cover 22, the frame 21, and the screen 10 jointly surround the interior of the electronic device 100. The interior of the electronic device 100 may be configured to place a component of the electronic device 100, for example, a battery, a telephone receiver, and a microphone.

In an implementation, the rear cover 22 is fixedly connected to the frame 21 by using adhesive. In another implementation, the rear cover 22 and the frame 21 form an integral structure, namely, the rear cover 22 and the frame 21 are an integral structure.

Referring to FIG. 2 again, with reference to FIG. 1, the rear cover 22 has a light transmission member 23. The light transmission member 23 can enable ambient light to enter the interior of the electronic device 100. A shape of the light transmission member 23 is not limited to a circle shown in FIG. 1 and FIG. 2. For example, the shape of the light transmission member 23 may be an ellipse or an irregular shape.

Figure 3:
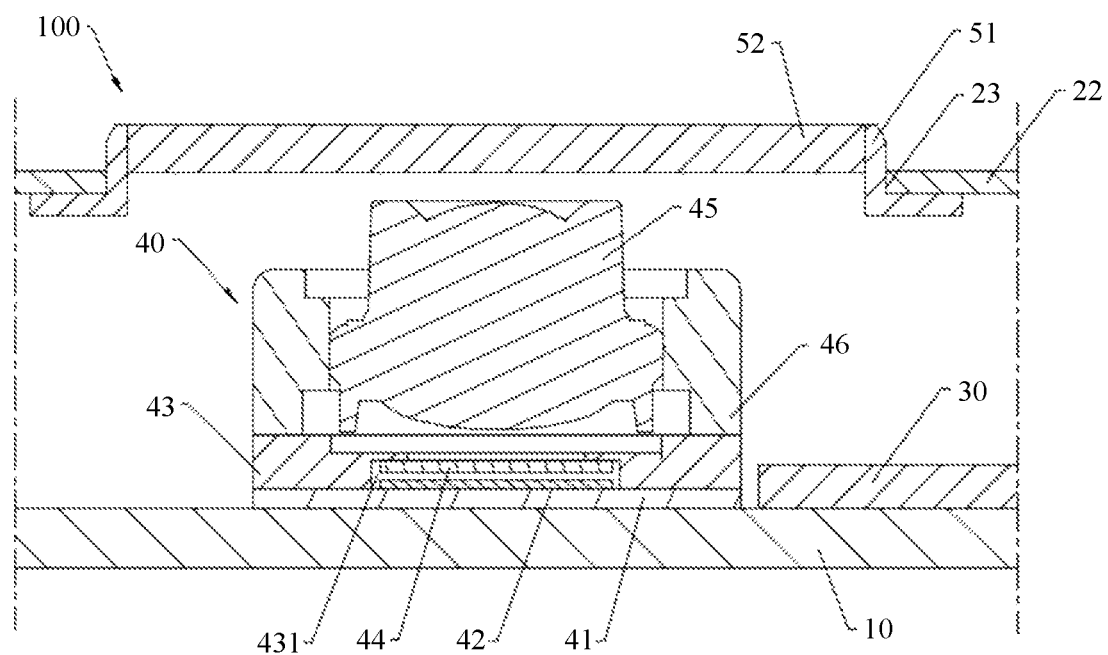
FIG. 3 is a partial schematic cross-sectional diagram of the electronic device shown in FIG. 1 at a line A-A.

FIG. 3 is a partial schematic cross-sectional diagram of the electronic device shown in FIG. 1 at a line A-A. The light transmission member 23 of the rear cover 22 is a through hole. The through hole communicates the interior of the electronic device 100 with the exterior of the electronic device 100. In addition, the electronic device 100 further includes a camera decoration member 51 and a cover 52. A part of the camera decoration member 51 may be fastened on an inner surface of the rear cover 22. A part of the camera decoration member 51 is in contact with a hole wall of the through hole. In addition, the cover 52 is fixedly connected to an inner surface of the camera decoration member 51. The cover 52 may prevent external water or dust from entering the interior of the electronic device 100. The cover 52 may be made of a glass material or plastic. FIG. 3 shows a disposition manner of the light transmission member 23. Certainly, the light transmission member 23 may be disposed in another manner. For example, a material of the rear cover 22 is a transparent material. A part of the rear cover 22 forms the light transmission member 23.

Referring to FIG. 3 again, with reference to FIG. 2, the host circuit board 30 is mounted inside the electronic device 100. The host circuit board 30 may be configured to mount an electronic component of the electronic device 100. For example, the electronic component may include a central processing unit (central processing unit, CPU), a memory, a battery management unit, or an image processor.

In addition, the host circuit board 30 may be a hard circuit board, may be a flexible circuit board, or may be a combination of a hard circuit board and a flexible circuit board. In addition, the host circuit board 30 may be an FR-4 dielectric board, may be a Rogers (Rogers) dielectric board, may be a dielectric board combining FR-4 and the Rogers, or the like. Herein, FR-4 is a grade designation for a flame-resistant material, and the Rogers dielectric board is a high frequency board.

Referring to FIG. 3 again, with reference to FIG. 2, the camera module 40 is fastened inside the electronic device 100. FIG. 3 shows that the camera module 40 is fastened on a surface of the screen 10 that faces the rear cover 22. In another implementation, the housing 20 may include a middle plate. The middle plate is connected to an inner surface of the frame 21, and the middle plate is located between the screen 10 and the rear cover 22. In this case, the camera module 40 may be fastened on a surface of the middle plate that faces the rear cover 22.

In addition, a quantity of camera modules 40 is not limited to one shown in FIG. 1 to FIG. 3. There may be two or more camera modules 40. In addition, when there are two or more camera modules 40, the two or more camera modules 40 may be integrated into one camera component. In addition, the camera module 40 may be but is not limited to an autofocus (autofocus, AF) camera module or a fixed-focus (fix focus, FF) camera module. The camera module 40 in this embodiment is described by using the fixed-focus camera module as an example.

In this embodiment, the camera module 40 is electrically connected to the host circuit board 30. In this case, the electronic component (for example, the processor) on the host circuit board 30 can send a signal to the camera module 40 to control the camera module 40 to photograph an image or a video. In another embodiment, when no host circuit board 30 is disposed in the electronic device 100, the camera module 40 may directly receive a signal, and perform photographing based on the signal.

Figure 4:
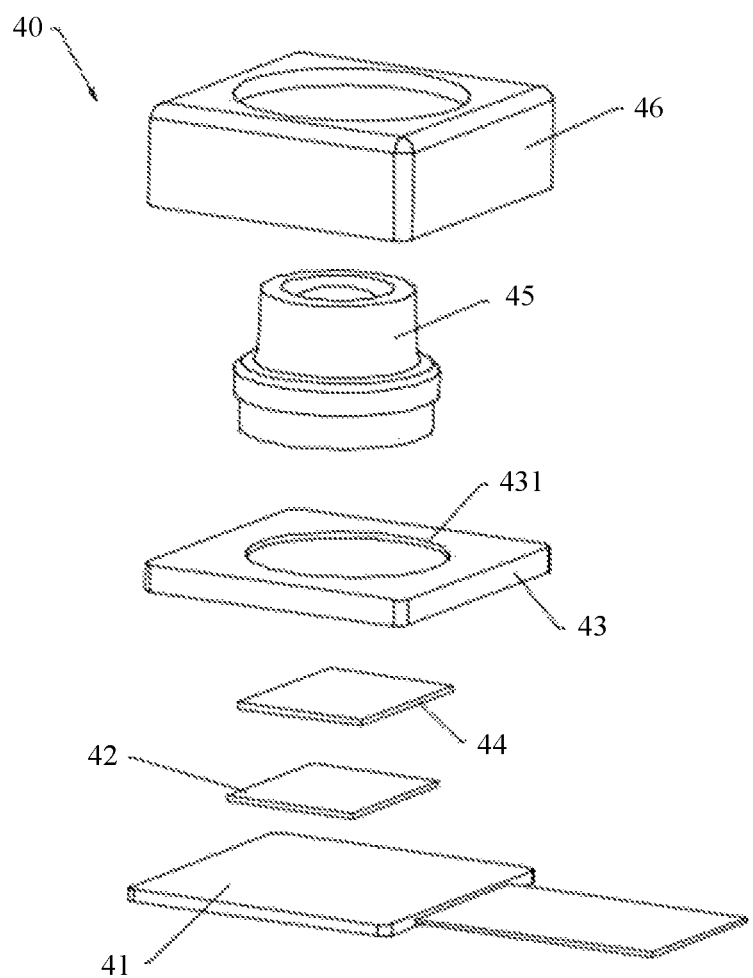
FIG. 4 is a schematic exploded view of a camera module of the electronic device shown in FIG. 1.

With reference to FIG. 3, FIG. 4 is a schematic exploded view of a camera module of the electronic device shown in FIG. 1. The camera module 40 includes a module circuit board 41, a photosensitive chip 42, a support 43, a filter 44, an optical lens 45, and a housing 46.

The module circuit board 41 may be fastened on the surface of the screen 10 that faces the rear cover 22. In another embodiment, when the housing 20 includes the middle plate, the module circuit board 41 may be fastened on the surface of the middle plate that faces the rear cover 22.

In addition, the module circuit board 41 is electrically connected to the host circuit board 30. In this way, a signal can be transmitted between the host circuit board 30 and the module circuit board 41.

The photosensitive chip 42 is fastened to the module circuit board 41, and is electrically connected to the module circuit board 41.

In an implementation, the photosensitive chip 42 may be mounted on the module circuit board 41 by using a chip on board (chip on board, COB) technology. In another implementation, the photosensitive chip 42 may be packaged on the module circuit board 41 by using a ball grid array (ball grid array, BGA) technology or a land grid array (land grid array, LGA) technology.

In another implementation, an electronic component or a chip (for example, a drive chip) may be further mounted on the module circuit board 41. The electronic component or the chip is fastened to a periphery of the photosensitive chip 42. The electronic component or the chip may be configured to assist the photosensitive chip 42 in collecting ambient light.

The support 43 is fastened to the module circuit board 41, and is located on a same side of the module circuit board 41 as the photosensitive chip 42. A light transmission hole 431 is disposed on the support 43. The photosensitive chip 42 may be located in the light transmission hole 431. The photosensitive chip 42 may collect ambient light that passes through the light transmission hole 431.

In addition, the filter 44 is fastened to the support 43, and the filter 44 may be located in the light transmission hole 431. The filter 44 is configured to: filter out stray light in the ambient light, and project the filtered ambient light to the photosensitive chip 42, to ensure that an image photographed by the electronic device 100 has good definition. The filter 44 may be but is not limited to a blue glass filter. For example, the filter 44 may be a reflective infrared filter or a dual-passband filter (the dual-passband filter may allow visible light and infrared light in the ambient light to simultaneously pass through, allow visible light and light of another specified wavelength (for example, ultraviolet light) in the ambient light to simultaneously pass through, or allow infrared light and light of another specified wavelength (for example, ultraviolet light) to simultaneously pass through).

Referring to FIG. 4, with reference to FIG. 3, the housing 46 is fastened on a surface of the support 43 that faces away from the module circuit board 43. The housing 46 may be configured to be fixedly connected to the optical lens 45, and may be further configured to protect the optical lens 45.

In addition, the optical lens 45 is fastened on an inner side of the housing 46. FIG. 3 shows that the optical lens 45 is partially located in a region surrounded by the housing 46, and partially protrudes from the housing 46. In another embodiment, the optical lens 45 may be all located in the region surrounded by the housing 46.

The foregoing specifically describes structures of related components of the camera module 40. The following specifically describes a structure and setting of related optical parameters of the optical lens 46 with reference to the accompanying drawings.

Figure 5:
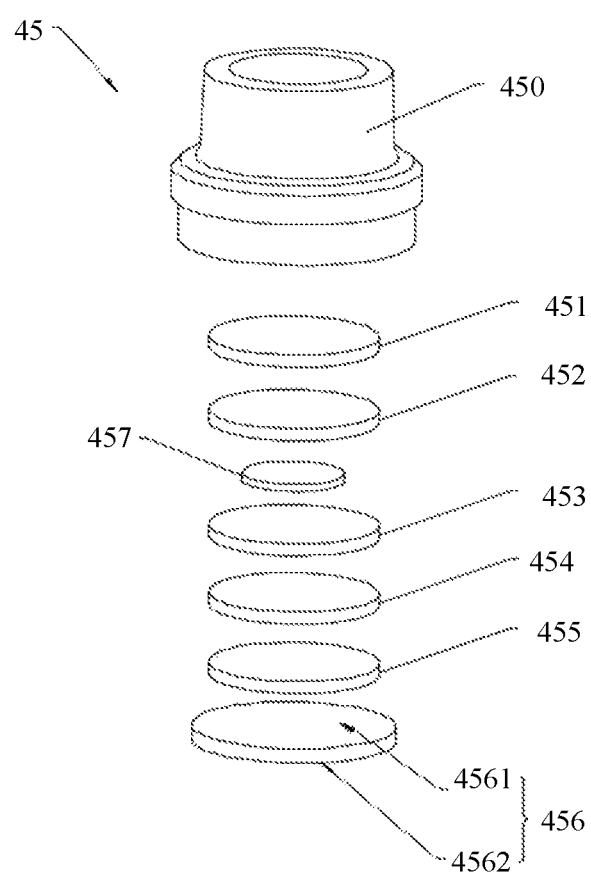
FIG. 5 is a schematic structural diagram of an optical lens of the camera module shown in FIG. 4.

FIG. 5 is a schematic structural diagram of an optical lens of the camera module shown in FIG. 4. The optical lens 45 includes a lens barrel 450, and a first lens 451, a second lens 452, a third lens 453, a fourth lens 454, a fifth lens 455, and a sixth lens 456 that are sequentially arranged from an object side to an image side. The first lens 451, the second lens 452, the third lens 453, the fourth lens 454, the fifth lens 455, and the sixth lens 456 are sequentially mounted in the lens barrel 450. In another implementation, the optical lens 45 may not include the lens barrel 450. The first lens 451 to the sixth lens 456 may be mounted in the housing 46 of the camera module 40.

In addition, the optical lens 45 in this embodiment further includes a stop 457. The stop 457 is located between every two lenses. The stop may be an aperture stop, and the aperture stop is configured to limit an amount of admitted light to change imaging brightness. A position of the stop is not limited to the stop that is shown in FIG. 5 and that is between the second lens 452 and the third lens 453. It may be understood that, when the stop 457 is located between the second lens 452 and the third lens 453, the stop 457 can properly allocate functions of the first lens 451 to the sixth lens 456. For example, the first lens 451 and the second lens 452 can be configured to receive light with a large field of view to a large degree, and the third lens 453 to the sixth lens 456 can be configured to correct aberration. In this case, the optical lens 45 in this implementation has a small quantity of lenses configured to enlarge the field of view. This helps simplify a structure of the optical lens 45. In addition, the optical lens 45 in this implementation has a large quantity of lenses configured to correct aberration. This helps obtain good imaging quality. In addition, when the stop 457 is located between the second lens 452 and the third lens 453, this helps correct aberration of the stop 457.

In another implementation, the optical lens 45 may not include the stop. It may be understood that FIG. 5 schematically shows only some components of the optical lens 45. Actual shapes, actual sizes, and actual structures of these components are not limited in FIG. 5.

In this embodiment, the first lens 451, the third lens 453, and the fifth lens 455 all have positive focal power. The second lens 452 and the fourth lens 454 both have negative focal power. The sixth lens 456 may have positive focal power, or may have negative focal power. In this way, focal power of the first lens 451 to the sixth lens 456 is set, so that when the optical lens 45 can implement good imaging quality, the field of view of the optical lens 45 can be increased to a large degree to implement ultra-wide-angle setting of the optical lens 45.

In an implementation, the first lens 451 can be configured to enlarge the field of view of the optical lens 45, so that light with a large field of view enters the optical lens 45. The second lens 452 can cooperate with the first lens 451, so that large-angle light is converged on the photosensitive chip 42 to increase the field of view of the optical lens 45. In addition, the third lens 453 and the fourth lens 454 can be configured to reduce a divergence angle of light. In addition, the third lens 453 and the fourth lens 454 can be further configured to correct aberration of the optical lens 45. The fifth lens 455 can be configured to perform beam expansion on light to increase an imaging height on an imaging plane formed on the photosensitive chip 42. The sixth lens 456 is configured to correct field curvature and astigmatism in imaging by the optical lens 45, to ensure good imaging quality of the optical lens 45.

In this implementation, object side surfaces and image side surfaces of the first lens 451 to the sixth lens 456 include at least one anamorphic aspherical surface. In other words, at least one surface in the object side surface of the first lens 451, the image side surface of the first lens 451, the object side surface of the second lens 452, the image side surface of the second lens 452, . . . , and the image side surface of the sixth lens 456 is an anamorphic aspherical surface. In this implementation, that an object side surface 4561 and an image side surface 4562 of the sixth lens 456 are anamorphic aspherical surfaces is used as an example for description. It should be noted that in this embodiment, when a lens is used as a boundary, a side on which a photographed object is located is an object side, and a surface of the lens that faces the object side may be referred to as an object side surface; and when a lens is used as a boundary, a side on which an image of a photographed object is located is an image side, and a surface of the lens that faces the image side may be referred to as an image side surface.

It may be understood that, as the field of view of the optical lens is increased, imaging distortion of the optical lens becomes more obvious. For example, when the field of view of the optical lens reaches 100°, imaging distortion of the optical lens has been greater than 10%. For ultra-wide-angle setting of the optical lens, imaging distortion of the optical lens is more obvious, and imaging quality is poorer.

In this implementation, at least one anamorphic aspherical surface is disposed in the lenses of the optical lens 45 that implements an ultra-wide-angle design. Therefore, a design degree of freedom of an optical system is improved. In addition, imaging quality of the optical lens can be optimized and distortion of the optical lens can be corrected by using asymmetry of a free region, so that good imaging quality of the optical lens is ensured.

Therefore, the optical lens 45 in this implementation can implement ultra-wide-angle photographing, and can also resolve a distortion problem in ultra-wide-angle imaging to a large degree. In other words, in this implementation, the ultra-wide-angle optical lens 45 with small imaging distortion is designed.

In addition, when the object side surface 4561 and the image side surface 4562 of the sixth lens 456 are anamorphic aspherical surfaces, the sixth lens 456 can correct field curvature and astigmatism in imaging by the optical lens 45, and can also correct distortion. Therefore, the sixth lens 456 has "a plurality of functions".

The anamorphic aspherical surface meets the following formulas:

$$z(x, y) = \frac{cr^2}{1 + \sqrt{1 - (1+K)c^2r^2}} + \sum_{i=1}^{N} A_i E^i$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 + A_6 x^3 y^0 +$$
$$A_7 x^2 y^1 + A_8 x^1 y^2 + A_9 x^0 y^3 + A_{10} x^4 y^0 + \ldots + A_{152} x^0 y^{16}$$

A coordinate system is established by using a geometric center of the sixth lens 456 as an origin O. An optical axis direction of the sixth lens 456 is a Z-axis, a direction located on a sagittal plane of the sixth lens 456 and perpendicular to an optical axis is an X-axis, and a direction located on a meridional plane of the sixth lens 456 and perpendicular to the optical axis is a Y-axis, where z (x, y) is a vector height parallel to the Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant.

It may be understood that, it can be determined, by using the foregoing relation, that the object side surface 4561 and the image side surface 4562 of the sixth lens 456 in this embodiment are anamorphic aspherical surfaces.

In addition, remaining lenses other than the sixth lens 456 in the first lens 451 to the sixth lens 456 are non-anamorphic lenses. In this embodiment, an example in which the first lens 451 to the fifth lens 455 are non-anamorphic lenses is used for description. Both an object side surface and an image side surface of the non-anamorphic lens are non-anamorphic aspherical surfaces, both the object side surface and the image side surface are non-anamorphic spherical surfaces, or one of the object side surface and the image side surface is a non-anamorphic aspherical surface, or the other is a non-anamorphic spherical surface. In this embodiment, an example in which both the object side surface and the image side surface of the non-anamorphic lens are non-anamorphic aspherical surfaces is used for description. It may be understood that the non-anamorphic aspherical surface has a high degree of freedom. Therefore, in this embodiment, the non-anamorphic lens of the optical lens 45 may be designed based on an actual requirement, to improve aberration at different positions in a targeted manner, so as to improve imaging quality.

The non-anamorphic aspherical surface of the non-anamorphic lens in this embodiment meets the following formula:

$$z = \frac{cr^2}{1+\sqrt{1-Kc^2r^2}} + u^4 \sum_{m=0}^{M} A_m Q_m^{con}(u^2)$$

A coordinate system is established by using a geometric center of the non-anamorphic lens as an origin O. An optical axis direction of the non-anamorphic lens is a Z-axis, a direction located on a sagittal plane of the non-anamorphic lens and perpendicular to an optical axis is an X-axis, and a direction located on a meridional plane of the non-anamorphic lens and perpendicular to the optical axis is a Y-axis, where z is a vector height of the aspherical surface, r is a radial coordinate of the aspherical surface, c is a spherical curvature of a vertex on the aspherical surface, K is a conic constant, $A_m$ is an aspherical surface coefficient, $r_{max}$ is a maximum value of the radial coordinate, and $u=r/r_{max}$.

It may be understood that, it can be determined, by using the foregoing relation, that the object side surfaces and the image side surfaces of the first lens 451 to the fifth lens 455 are non-anamorphic aspherical surfaces.

Figure 6:
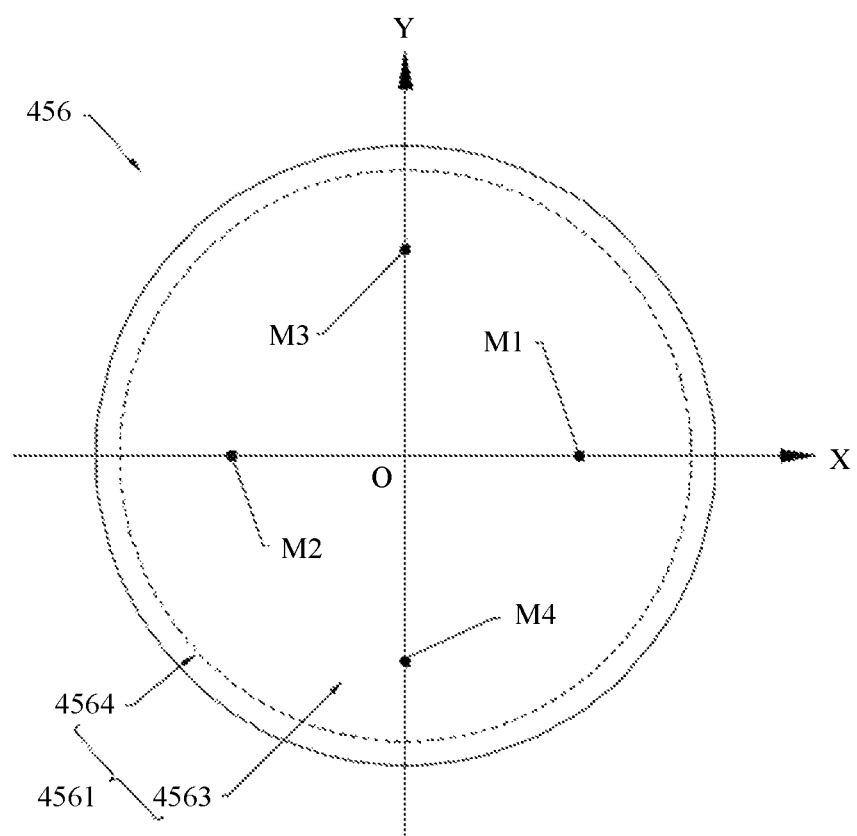
FIG. 6 is a schematic planar diagram of an object side surface of a sixth lens of the optical lens shown in FIG. 5.
Figure 7:
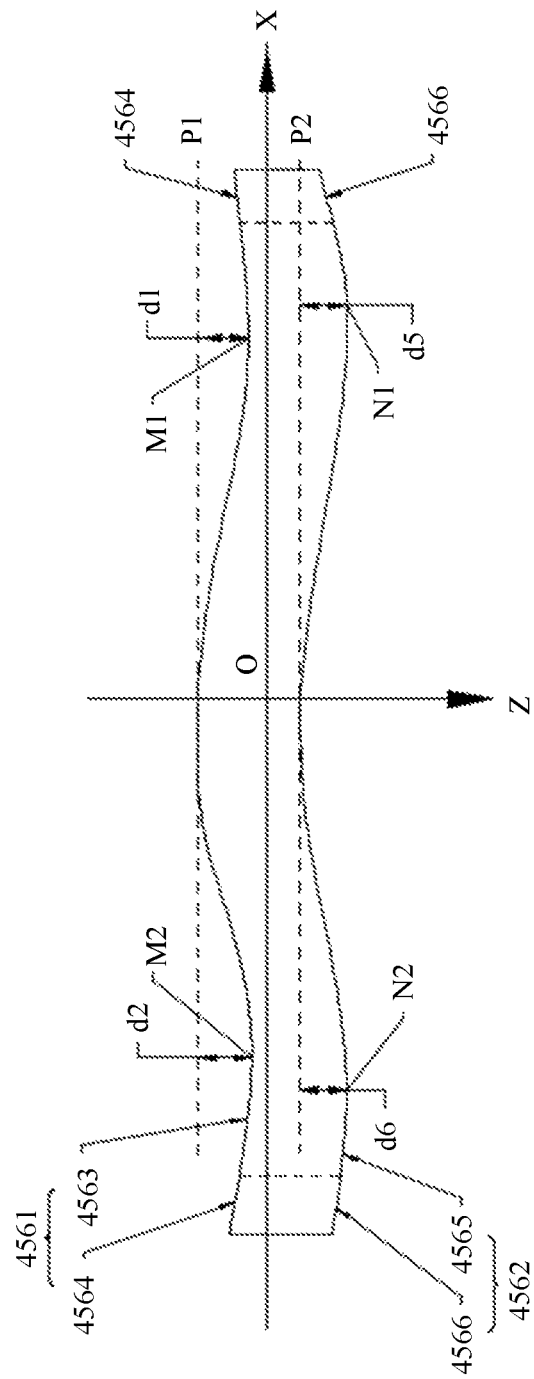
FIG. 7 is a schematic cross-sectional diagram of the sixth lens shown in FIG. 6 on a sagittal plane.

In an implementation, FIG. 6 is schematic planar diagram of an object side surface 4561 of a sixth lens 456 of the optical lens shown in FIG. 5, and FIG. 7 is a schematic cross-sectional diagram of the sixth lens 456 shown in FIG. 6 on a sagittal plane. The coordinate system is established by using the geometric center of the sixth lens 456 as the origin O. The optical axis direction of the sixth lens 456 is the Z-axis, the direction located on the sagittal plane of the sixth lens 456 and perpendicular to the optical axis is the X-axis, and the direction located on the meridional plane of the sixth lens 456 and perpendicular to the optical axis is the Y-axis. In this way, the meridional plane of the sixth lens 456 is a YOZ plane in the coordinate system, and the sagittal plane of the sixth lens 456 is an XOZ plane in the coordinate system.

The object side surface 4561 of the sixth lens 456 includes an optical effective region 4563 and a non-optical effective region 4564 connected to the optical effective region 4563. The optical effective region 4563 and the non-optical effective region 4564 are distinguished from each other by using a dashed line in both FIG. 6 and FIG. 7. In addition, the non-optical effective region 4564 of the object side surface 4561 is marked in both a positive direction and a negative direction of the X-axis in FIG. 7. The optical effective region 4563 is a region that is of the object side surface 4561 and through which light can pass. The non-optical effective region 4564 is a region that is of the object side surface 4561 and through which light cannot pass. The non-optical effective region 4564 of the object side surface 4561 may be configured to be fastened to the lens barrel 450.

In addition, the sixth lens 456 includes a first vertex M1 and a second vertex M2. The vertex is a highest point or a lowest point on the object side surface 4561 of the sixth lens 456. In this implementation, both the first vertex M1 and the second vertex M2 are lowest points on the object side surface 4561 of the sixth lens 456. In another implementation, both the first vertex M1 and the second vertex M2 may be highest points on the object side surface 4561 of the sixth lens 456. In addition, FIG. 6 schematically shows the first vertex M1 and the second vertex M2 by using a bold dot. However, shapes, sizes, and positions of the first vertex M1 and the second vertex M2 are not limited to shapes, sizes, and positions shown in FIG. 6.

In addition, the first vertex M1 and the second vertex M2 are both located on the object side surface 4561 of the sixth lens 456, and are both located in the optical effective region 4563 of the object side surface 4561. In addition, the first vertex M1 and the second vertex M2 are both located on the XOZ plane (namely, the sagittal plane of the sixth lens 456). The first vertex M1 and the second vertex M2 are symmetric with respect to the YOZ plane (namely, the meridian plane of the sixth lens 456).

Referring to FIG. 7, a distance d1 from the first vertex M1 to a first reference plane P1 is equal to a distance d2 from the second vertex M2 to the first reference plane P1. The first reference plane P1 is perpendicular to the Z-axis (namely, an optical axis of the optical lens 45), and a point at which the Z-axis intersects the object side surface 4561 is located on the first reference plane P1.

It may be understood that the first vertex M1 and the second vertex M2 are symmetric with respect to the YOZ plane, and the distance d1 from the first vertex M1 to the first reference plane P1 is equal to the distance d2 from the second vertex M2 to the first reference plane P1. Therefore, the optical lens 45 can implement a better correction effect, and obtain high-quality imaging.

Figure 8:
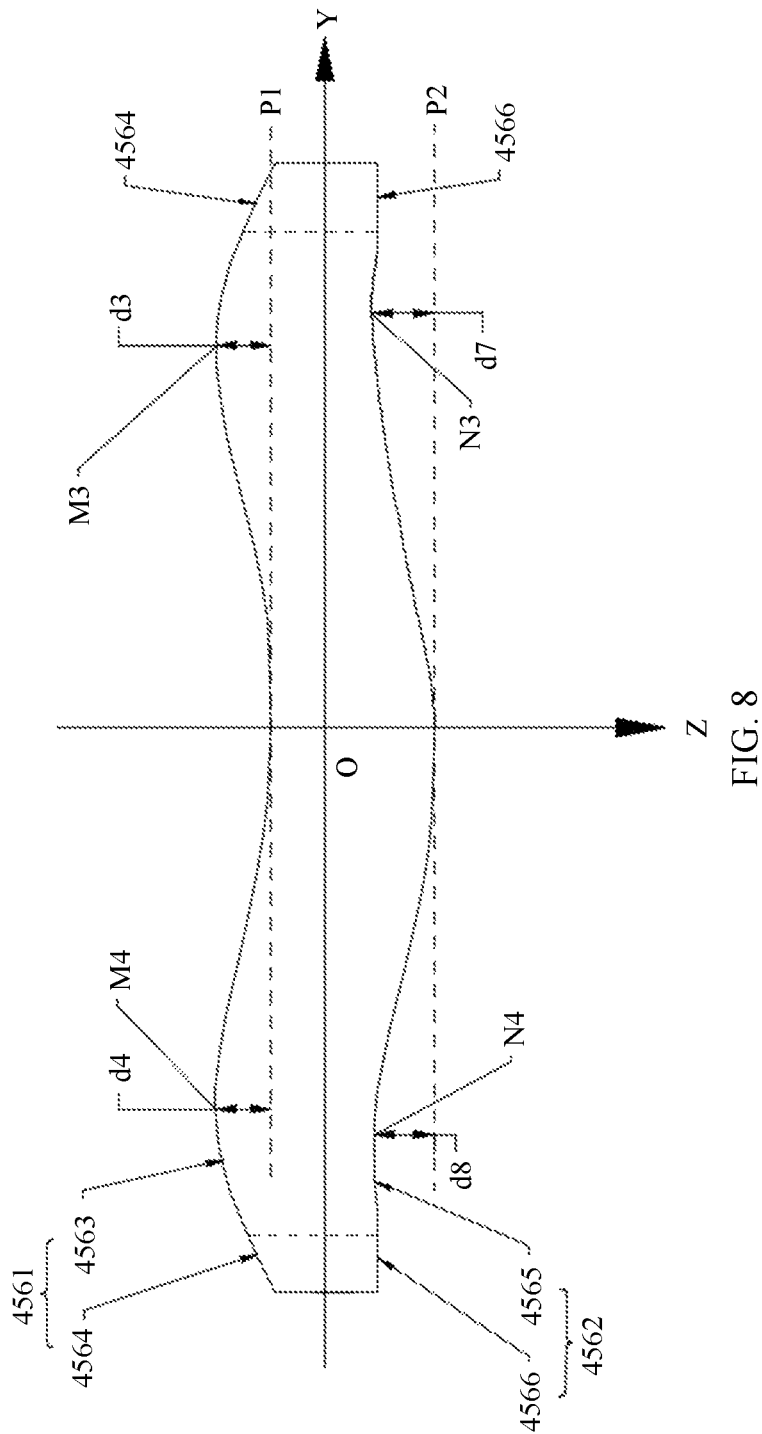
FIG. 8 is a schematic cross-sectional diagram of the sixth lens shown in FIG. 6 on a meridional plane.

Referring to FIG. 6 again, FIG. 8 is a schematic cross-sectional diagram of the sixth lens 456 shown in FIG. 6 on a meridional plane. The sixth lens 456 includes a third vertex M3 and a fourth vertex M4. In this implementation, both the third vertex M3 and the fourth vertex M4 are highest points on the object side surface 4561 of the sixth lens 456. In another implementation, both the third vertex M3 and the fourth vertex M4 may be lowest points on the object side surface 4561 of the sixth lens 456. In addition, FIG. 6 schematically shows the third vertex M3 and the fourth vertex M4 by using a bold dot. However, shapes, positions, and sizes of the third vertex M3 and the fourth vertex M4 are not limited to shapes, positions, and sizes shown in FIG. 6.

In addition, the third vertex M3, the fourth vertex M4, the first vertex M1, and the second vertex M2 are all located on the object side surface 4561 of the sixth lens 456, and are located in the optical effective region 4563 of the object side surface 4561. The third vertex M3 and the fourth vertex M4 are located on the YOZ plane. In addition, the third vertex M3 and the fourth vertex M4 are symmetric with respect to the XOZ plane.

Referring to FIG. 8 again, a distance d3 from the third vertex M3 to the first reference plane P1 is equal to a distance d4 from the fourth vertex M4 to the first reference plane P1.

It may be understood that the third vertex M3 and the fourth vertex M4 are symmetric with respect to the XOZ plane, and the distance d3 from the third vertex M3 to the first reference plane P1 is equal to the distance d4 from the fourth vertex M4 to the first reference plane P1. Therefore, the optical lens 45 can implement a better correction effect, and obtain high-quality imaging.

Figure 9:
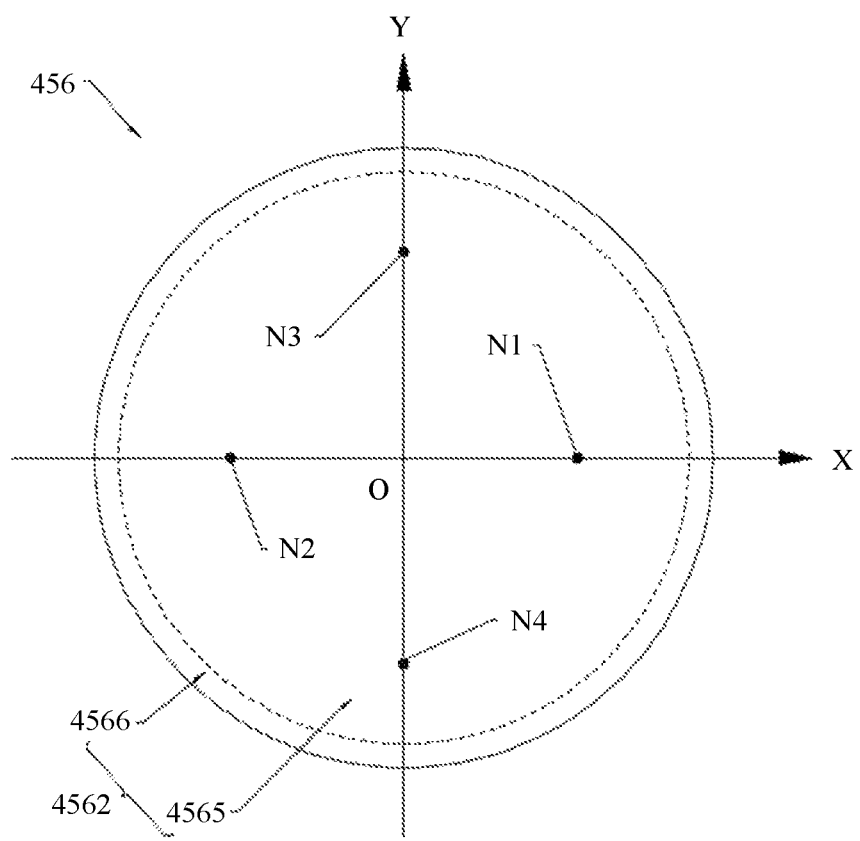
FIG. 9 is a schematic planar diagram of an image side surface of a sixth lens of the optical lens shown in FIG. 6.

With reference to FIG. 7, FIG. 9 is a schematic planar diagram of an image side surface 4562 of a sixth lens 456 of the optical lens shown in FIG. 6. The image side surface 4562 of the sixth lens 456 includes an optical effective region 4565 and a non-optical effective region 4566 connected to the optical effective region 4565. The optical effective region 4565 of the image side surface 4562 and the non-optical effective region 4566 of the image side surface 4562 are distinguished from each other by using a dashed line in both FIG. 9 and FIG. 7. In addition, the non-optical effective region 4566 of the image side surface 4562 is marked in both the positive direction and the negative direction of the X-axis in FIG. 7. The optical effective region 4565 of the image side surface 4562 is a region that is of the image side surface 4562 and through which light can pass. The non-optical effective region 4566 of the image side surface 4562 is a region that is of the image side surface 4562 and through which light cannot pass. The non-optical effective region 4566 of the image side surface 4562 may be configured to be fastened to the lens barrel 450.

In addition, the sixth lens 456 includes a fifth vertex N1 and a sixth vertex N2. The vertex is a highest point or a lowest point on the image side surface 4562 of the sixth lens 456. In this implementation, both the fifth vertex N1 and the sixth vertex N2 are highest points on the image side surface 4562 of the sixth lens 456. In another implementation, both the fifth vertex N1 and the sixth vertex N2 may be lowest points on the image side surface 4562 of the sixth lens 456. In addition, FIG. 9 schematically shows the fifth vertex N1 and the sixth vertex N2 by using a bold dot. However, shapes, sizes, and positions of the fifth vertex N1 and the sixth vertex N2 are not limited to shapes, sizes, and positions shown in FIG. 9.

In addition, the fifth vertex N1 and the sixth vertex N2 are both located on the image side surface 4562 of the sixth lens 456, and are both located in the optical effective region 4565 of the image side surface 4562. The fifth vertex N1 and the sixth vertex N2 are both located on the XOZ plane (namely, the sagittal plane of the sixth lens 456). In addition, the fifth vertex N1 and the sixth vertex N2 are symmetric with respect to the YOZ plane (namely, the meridian plane of the sixth lens 456).

Referring to FIG. 7, a distance d5 from the fifth vertex N1 to a second reference plane P2 is equal to a distance d6 from the sixth vertex N2 to the second reference plane P2. The second reference plane P2 is perpendicular to the Z-axis (namely, the optical axis of the optical lens 45), and a point at which the Z-axis intersects the image side surface 4562 is located on the second reference plane P2.

It may be understood that the fifth vertex N1 and the sixth vertex N2 are symmetric with respect to the YOZ plane, and the distance d5 from the fifth vertex N1 to the second reference plane P2 is equal to the distance d6 from the sixth vertex N2 to the second reference plane P2. Therefore, the optical lens 45 can implement a better correction effect, and obtain high-quality imaging.

Referring to FIG. 9 again, with reference to FIG. 8, the sixth lens 456 includes a seventh vertex N3 and an eighth vertex N4. In this implementation, both the seventh vertex N3 and the eighth vertex N4 are lowest points on the image side surface 4562 of the sixth lens 456. In another implementation, both the seventh vertex N3 and the eighth vertex N4 may be highest points on the image side surface 4562 of the sixth lens 456. In addition, FIG. 9 schematically shows the seventh vertex N3 and the eighth vertex N4 by using a bold dot. However, shapes, positions, and sizes of the seventh vertex N3 and the eighth vertex N4 are not limited to shapes, positions, and sizes shown in FIG. 9.

In addition, the seventh vertex N3, the eighth vertex N4, the fifth vertex N1, and the sixth vertex N2 are all located on the image side surface 4562 of the sixth lens 456, and are located in the optical effective region 4565 of the image side surface 4562. The seventh vertex N3 and the eighth vertex N4 are located on the YOZ plane. In addition, the seventh vertex N3 and the eighth vertex N4 are symmetric with respect to the XOZ plane.

Referring to FIG. 8 again, a distance d7 from the seventh vertex N3 to the second reference plane P2 is equal to a distance d8 from the eighth vertex N4 to the second reference plane P2.

It may be understood that the seventh vertex N3 and the eighth vertex N4 are symmetric with respect to the XOZ plane, and the distance d7 from the seventh vertex N3 to the second reference plane P2 is equal to the distance d8 from the eighth vertex N4 to the second reference plane P2. Therefore, the optical lens 45 can implement a better correction effect, and obtain high-quality imaging.

In the foregoing implementation, that the object side surface 4561 and the image side surface 4562 of the sixth lens 456 are anamorphic aspherical surfaces is used as an example for description. In another embodiment, when an object side surface and an image side surface of another lens are anamorphic aspherical surfaces, for the object side surface and the image side surface of the another lens, refer to a setting manner of the object side surface 4561 and the image side surface 4562 of the sixth lens 456. Details are not described herein again.

The foregoing specifically describes several setting manners of the object side surface 4561 and the image side surface 4562 of the sixth lens 456. The following specifically describes several setting manners of optical parameters of the optical lens 45.

In an implementation, the first lens 451 and the second lens 452 meet $-0.5 < f2/f1 < -0.01$, where f1 is a focal length of the first lens 451, and f2 is a focal length of the second lens 452. For example, f2/f1 is equal to $-0.4$, $-0.3$, $-0.28$, $-0.21$, $-0.1$, or $-0.02$.

It may be understood that, when the focal length f1 of the first lens 451 and the focal length f2 of the second lens 452 meet the foregoing relation, the first lens 451 and the second lens 452 can cooperate well, to collect light with a large field of view to a large degree and implement ultra-wide-angle setting of the optical lens 45.

Certainly, in another implementation, the focal length f1 of the first lens 451 and the focal length f2 of the second lens 452 may not meet the foregoing relation.

In an implementation, the focal length f1 of the first lens 451 and the focal length f2 of the second lens 452 meet $-0.35 \leq f2/f1 \leq -0.03$.

In an implementation, the third lens 453 and the fourth lens 454 meet $-4 < f4/f3 < 0$, where f3 is a focal length of the third lens 453, and f4 is a focal length of the fourth lens 454. For example, f4/f3 is equal to $-3.8$, $-3$, $-2.2$, $-2$, $-1.7$, $-1$, or $-0.8$.

It may be understood that, when the focal length f3 of the third lens 453 and the focal length f4 of the fourth lens 454 meet the foregoing relation, the third lens 453 and the fourth lens 454 can cooperate well, so that pupil aberration in imaging by the optical lens 45 is well corrected. In addition, the third lens 453 and the fourth lens 454 can reduce a divergence angle of light passing through the second lens 452.

Certainly, in another implementation, the focal length f3 of the third lens 453 and the focal length f4 of the fourth lens 454 may not meet the foregoing relation.

In an implementation, the focal length f3 of the third lens 453 and the focal length f4 of the fourth lens 454 meet $-2.5 \leq f4/f3 < 0$.

In an implementation, the fifth lens 455 meets $0.1 < f5/f < 1.5$, where f5 is a focal length of the fifth lens 455, and f is a focal length of the optical lens 45. For example, f5/f is equal to 0.2, 0.22, 0.33, 0.37, 0.5, 0.7, 0.9, 1, 1.1, 1.3, or 1.4.

It may be understood that, when the focal length f5 of the fifth lens 455 and the focal length f of the optical lens 45 meet the foregoing relation, focal power of the fifth lens 455 can be properly allocated, so that the fifth lens 455 has a good aberration correction effect.

Certainly, in another implementation, the focal length f5 of the fifth lens 455 and the focal length f of the optical lens 45 may not meet the foregoing relation.

In an implementation, the focal length f5 of the fifth lens 455 and the focal length f of the optical lens 45 meet $0.5 \leq f5/f \leq 1$.

In an implementation, the fifth lens 455 and the third lens 453 meet $0 < R6/R10 < 2.9$, where R6 is a curvature radius of the image side surface of the third lens 453, and R10 is a curvature radius of the image side surface of the fifth lens 455. For example, R6/R10 is equal to 0.22, 0.31, 0.5, 0.9, 1, 1.3, 2, 2.4, 2.6, or 2.8.

It may be understood that, when the curvature radius R6 of the image side surface of the third lens 453 and the curvature radius R10 of the image side surface of the fifth lens 455 meet the foregoing relation, the third lens 453 and the fifth lens 455 can reduce a divergence angle of light as much as possible and correct system field curvature and distortion, to implement a better imaging effect.

Certainly, in another implementation, the curvature radius R6 of the image side surface of the third lens 453 and the curvature radius R10 of the image side surface of the fifth lens 455 may not meet the foregoing relation.

In an implementation, the curvature radius R6 of the image side surface of the third lens 453 and the curvature radius R10 of the image side surface of the fifth lens 455 meet $0 < R6/R10 \leq 2$.

In an implementation, the fourth lens 454 and the fifth lens 455 meet $-0.05 < T45/f < 0.4$, where T45 is a distance between the fourth lens 454 and the fifth lens 455, and f is the focal length of the optical lens 45. For example, T45/f is equal to 0.06, 0.11, 0.25, 0.29, 0.3, 0.33, 0.35, 0.36, or 0.39.

It may be understood that, when the distance T45 between the fourth lens 454 and the fifth lens 455 and the focal length f of the optical lens 45 meet the foregoing relation, curvature of the object side surface of the fifth lens 455 can be well controlled. In this case, the fifth lens 455 has low manufacturing difficulty and good practicability.

Certainly, in another implementation, the distance T45 between the fourth lens 454 and the fifth lens 455 and the focal length f of the optical lens 45 may not meet the foregoing relation.

In an implementation, the distance T45 between the fourth lens 454 and the fifth lens 455 and the focal length f of the optical lens 45 meet $0.1 \leq T45/f \leq 0.3$.

In an implementation, the optical lens 45 meets $0 < (T23+T56)/TTL < 0.5$, where T23 is a distance between the second lens 452 and the third lens 453, T56 is a distance between the fifth lens 455 and the sixth lens 456, and TTL is a distance from the object side surface of the first lens 451 to an imaging plane in an optical axis direction of the optical lens 45. For example, (T23+T56)/TTL is equal to 0.02, 0.13, 0.24, 0.27, 0.3, 0.32, 0.35, 0.4, or 0.48.

It may be understood that, when the optical lens 45 meets the foregoing relation, the total track length (TTL) of the optical lens 45 can be well controlled to facilitate miniaturization setting of the optical lens 45. In addition, a system height of the optical lens 45 can also be well reduced to facilitate thinning setting of the optical lens 45.

Certainly, in another implementation, the optical lens 45 may not meet the foregoing relation.

In an implementation, the optical lens 45 meets $0 < (T23+T56)/TTL \leq 0.3$.

In an implementation, the optical lens 45 meets $|TDT| \leq 5.0\%$, and TDT is a maximum value of TV distortion in an imaging range of the optical lens 45.

It may be understood that, when the optical lens 45 meets $|TDT| \leq 5.0\%$, distortion of the optical lens 45 is small, and imaging quality of the optical lens 45 is good.

In an implementation, the optical lens 45 meets $100° \leq FOV \leq 140°$, and FOV is a field of view of the camera lens group. For example, FOV is equal to 100°, 103°, 112°, 126°, 135°, 136°, 137°, 138°, 139°, or 140°.

It may be understood that, when the field of view (FOV) of the optical lens 45 meets $100° \leq FOV \leq 140°$, the optical lens 45 has a large field of view, namely, ultra-wide-angle setting of the optical lens 45 is implemented.

In an implementation, the optical lens 45 meets $135° < FOV \leq 140°$. For example, FOV is equal to 136°, 137°, 138°, 139°, or 140°.

In an implementation, the optical lens 45 meets $0 < ImagH/TTL < 1$, where TTL is the distance from the object side surface of the first lens 451 to the imaging plane in the optical axis direction of the optical lens 45, and ImagH is a half diagonal length of an effective pixel region on the photosensitive chip 42, namely, an imaging height on the imaging plane. For example, ImagH/TTL is equal to 0.1, 0.22, 0.34, 0.45, 0.52, 0.66, 0.81, or 0.97.

It may be understood that, when the optical lens 45 meets the foregoing relation, the imaging height on the imaging plane of the optical lens 45 is large, namely, imaging quality of the optical lens 45 is good. In addition, the total track length of the optical lens 45 is small. This facilitates application to a thin electronic device such as a mobile phone or a tablet.

In an implementation, each lens of the optical lens 45 may be made of a plastic material, a glass material, or another composite material. The plastic material can be used to easily produce various lens structures with complex shapes. A refractive index n1 of a lens of the glass material meets $1.50 \leq n1 \leq 1.90$. The refractive index can be selected from a wider range than a refractive index of a plastic lens with a range (1.55 to 1.65). Therefore, a thin but better-performance glass lens is more easily obtained, this helps reduce on-axis thicknesses of a plurality of lenses of the optical lens 45, and a lens structure with a complex shape is not easily produced. Therefore, in some implementations of this application, production costs, efficiency, and optical effects are considered, and specific application materials of different lenses are properly used based on a requirement.

The following describes in more detail some specific but non-limiting examples in the implementations of this application with reference to related accompanying drawings.

Figure 10:
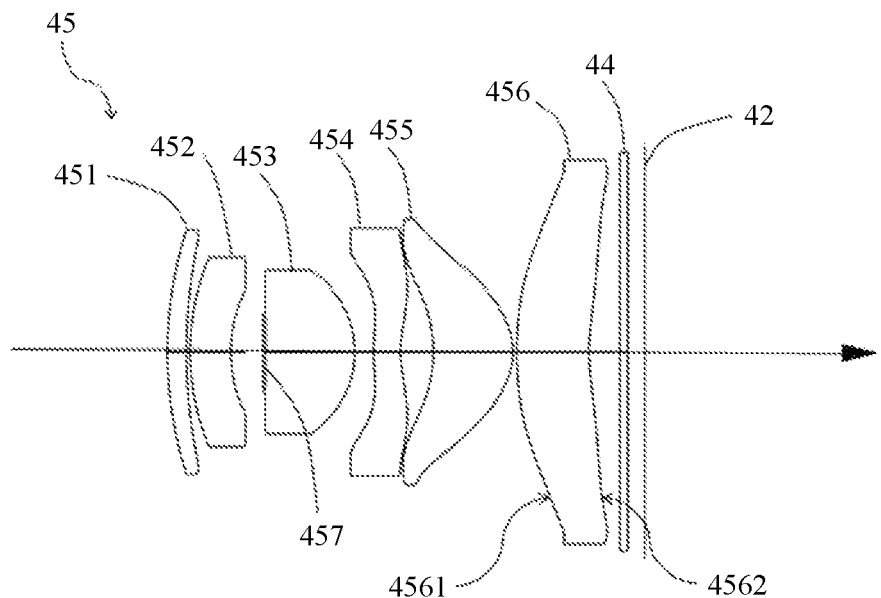
FIG. 10 is a schematic structural diagram of an implementation of lenses of the optical lens shown in FIG. 5.

Implementation 1: FIG. 10 is a schematic structural diagram of an implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, both an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 10 shows an optical axis direction of the optical lens 45 by using a solid line with an arrow. In addition, the direction of the arrow represents a direction from the object side to the image side.

Design parameters of the optical lens 45 in Implementation 1 of this application are shown in the following Table 1.

TABLE 1

Design parameters of an optical lens 45 in Implementation 1

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | |
| S1 | Aspherical surface | 9.000 | 0.500 | 1.661 | 20.365 | 50.491 | 0 |
| S2 | Aspherical surface | 12.000 | 0.100 | | | | 0 |
| S3 | Aspherical surface | 5.902 | 1.075 | 1.923 | 20.881 | −11.413 | 0 |
| S4 | Aspherical surface | 3.434 | 0.843 | | | | 0 |
| STOP | Spherical surface | | 0.066 | | | | 0 |
| S5 | Aspherical surface | 49.999 | 2.350 | 1.544 | 55.865 | 4.053 | 3.203 |
| S6 | Aspherical surface | −2.280 | 0.500 | | | | −0.274 |
| S7 | Aspherical surface | 5.049 | 0.709 | 1.661 | 20.365 | −8.241 | −0.280 |
| S8 | Aspherical surface | 2.496 | 0.862 | | | | −9.511 |
| S9 | Aspherical surface | −3.285 | 2.100 | 1.544 | 55.865 | 3.345 | −1.984 |
| S10 | Aspherical surface | −1.440 | 0.100 | | | | −3.668 |
| S11 (AAS) | Aspherical surface | 9.170 | 1.896 | 1.544 | 55.865 | −8.868 | −8.878 |
| S12 (AAS) | Aspherical surface | 2.939 | 0.813 | | | | −46.201 |
| S13 | Spherical surface | Infinite | 0.210 | 1.517 | 64.167 | | |
| S14 | Spherical surface | Infinite | 0.449 | | | | |

OBJ (English full name: object) represents an object surface. S1 represents the object side surface of the first lens 451. S2 represents the image side surface of the first lens 451. S3 represents the object side surface of the second lens 452. S4 represents the image side surface of the second lens 452. S5 represents the object side surface of the third lens 453. S6 represents the image side surface of the third lens 453. S7 represents the object side surface of the fourth lens 454. S8 represents the image side surface of the fourth lens 454. S9 represents the object side surface of the fifth lens 455. S10 represents the image side surface of the fifth lens 455. S11 represents the object side surface of the sixth lens 456. AAS (anamorphic aspherical surface) is an anamorphic aspherical surface. Therefore, S11 (AAS) indicates that the object side surface of the sixth lens 456 is an anamorphic aspherical surface. S12 represents the image side surface of the sixth lens 456. S12 (AAS) indicates that the image side surface of the sixth lens 456 is an anamorphic aspherical surface. S13 represents an object side surface of the filter 44. S14 represents an image side surface of the filter 44. STOP represents the stop 457. It should be noted that in this application, symbols such as OBJ, S1, S2, S3, S4, S5, S6, S7, S8, S9, S10, S11, S12, S13, S14, AAS, and STOP represent same meanings, and are not described again when the symbols appear below again.

In addition, a thickness of S1 is a distance between the object side surface of the first lens 451 and the image side surface of the first lens 451. A thickness of S2 is a distance between the image side surface of the first lens 451 and the object side surface of the second lens 452. A thickness of S3 is a distance between the object side surface of the second lens 452 and the image side surface of the second lens 452. A thickness of S4 is a distance between the image side surface of the second lens 452 and the stop. A thickness of the stop is a distance between the stop and the third lens 453. A thickness of S5 is a distance between the object side surface of the third lens 453 and the image side surface of the third lens 453. A thickness of S6 is a distance between the image side surface of the third lens 453 and the object side surface of the fourth lens 454. A thickness of S7 is a distance between the object side surface of the fourth lens 454 and the image side surface of the fourth lens 454. A thickness of S8 is a distance between the image side surface of the fourth lens 451 and the object side surface of the fifth lens 455. A thickness of S9 is a distance between the object side surface of the fifth lens 455 and the image side surface of the fifth lens 455. A thickness of S10 is a distance between the image side surface of the fifth lens 455 and the object side surface of the sixth lens 456. A thickness of S11 is a distance between the object side surface of the sixth lens 456 and the image side surface of the sixth lens 456. A thickness of S12 is a distance between the image side surface of the sixth lens 456 and the object side surface of the filter 44. A thickness of S13 is a distance between the object side surface of the filter 44 and the image side surface of the filter 44. A thickness of S14 is a distance between the image side surface of the filter 44 and an imaging plane. It should be noted that in this application, when the foregoing symbols appear in the following tables again, the symbols represent same meanings, and not described again.

Based on the data in Table 1, the design parameters of the optical lens 45 in Implementation 1 of this application may be obtained, and are shown in Table 2.

TABLE 2

Design parameters of an optical lens 45 in Implementation 1

| f1 (mm) | 50.491 | f4 (mm) | −8.241 |
|---|---|---|---|
| f2 (mm) | −11.143 | f5 (mm) | 3.345 |
| f3 (mm) | 4.053 | f6 (mm) | −8.868 |

TABLE 2-continued

Design parameters of an optical lens 45 in Implementation 1

| f (mm) | 4.18 | |f1/f| | 12.078 |
|---|---|---|---|
| |f2/f| | 2.665 | |f3/f| | 0.969 |
| |f4/f| | 1.971 | |f5/f| | 0.8 |
| |f6/f| | 2.121 | f2/f1 | −0.221 |
| f4/f3 | −2.033 | FOV (°) | 104 |
| f/EPD | 2.05 | T45/f | 0.243 |
| ImagH (mm) | 4.46 | TTL (mm) | 12.653 |
| ImagH/TTL | 0.352 | (T23 + T56)/TTL | 0.019 |
| R6/R10 | 1.583 | Fno | 2.05 |

In the foregoing table, f1 represents a focal length of the first lens 451, f2 represents a focal length of the second lens 452, f3 represents a focal length of the third lens 453, f4 represents a focal length of the fourth lens 454, f5 represents a focal length of the fifth lens 455, f6 represents a focal length of the sixth lens 456, f represents a focal length of the optical lens 45, FOV is a field of view of the optical lens 45, EPD represents an entrance pupil diameter of the optical lens 45, T45 represents a distance between the fourth lens 454 and the fifth lens 455, ImagH represents a half diagonal length of an effective pixel region on the photosensitive chip 42, namely, an imaging height on the imaging plane, TTL represents a total track length of the optical lens 45, T23 is a distance between the second lens 452 and the third lens 453, T56 is a distance between the fifth lens 455 and the sixth lens 456, R6 is a curvature radius of the image side surface of the third lens 453, R10 is a curvature radius of the image side surface of the fifth lens 455, and Fno is an F-number of the optical lens 45. It should be noted that in this application, symbols such as f1, f2, f3, f4, f5, f6, f, EPD, T45, ImagH, TTL, T23, T56, R6, R10, Fno, and FOV represent same meanings, and are not described again when the symbols appear below again.

It may be learned from Table 2 that the field of view (FOV) of the optical lens 45 is 104° and the F-number (Fno) is 2.05. In other words, the optical lens 45 in this application can implement a large field of view and a wide aperture (it may be understood that a smaller F-number (Fno) indicates a wider aperture), and can better meet a photographing requirement. In addition, TTL is 12.653 mm, ImagH is 4.46 mm, and ImagH/TTL=0.352. In other words, when the effective pixel region formed on the photosensitive chip 42 through projection by the optical lens 45 in this implementation is large, the total optical length (TTL) of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 1 of this application are shown in the following Table 3.

TABLE 3

Design parameters of non-anamorphic lenses of an optical lens 45 in Implementation 1

| Surface number | $A_0$ | $A_1$ | $A_2$ | $A_3$ | $A_4$ | $A_5$ | $A_6$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 |
| S3 | 2.4965E−03 | −5.6139E−05 | 0.0000E+00 | 0.0000E+00 | 0.0000E+00 | 0.0000E+00 | 0.0000E+00 |
| S4 | 7.9848E−03 | −1.5913E−04 | 0.0000E+00 | 0.0000E+00 | 0.0000E+00 | 0.0000E+00 | 0.0000E+00 |
| S5 | 3.3387E+00 | −1.2819E+00 | 2.9002E−01 | −1.2724E−01 | −1.7361E−03 | 3.7577E−02 | −5.1035E−02 |
| S6 | 3.5319E+00 | −3.5425E+00 | −4.4467E−01 | 4.1033E−01 | −1.6697E−01 | −1.5267E−01 | −1.1400E−01 |
| S7 | 2.6616E+00 | −1.7635E+00 | 3.7925E−01 | −1.8843E−02 | −2.6318E−03 | −6.9181E−03 | 2.2100E−03 |
| S8 | 3.5006E+00 | −1.3561E+00 | 3.6278E−01 | −1.4376E−01 | −4.0291E−02 | −2.5340E−02 | −1.8542E−03 |
| S9 | 4.7024E+00 | 2.2063E+00 | −1.9711E−01 | −1.4412E−01 | 2.5364E−01 | −1.6378E−02 | 9.2933E−03 |
| S10 | 4.3924E+00 | 1.2783E+00 | 2.8222E+00 | −1.1204E−01 | −1.8356E−01 | −2.9911E−01 | −1.8144E−01 |

Symbols such as $A_0$, $A_1$, $A_2$, $A_3$, $A_4$, $A_5$, and $A_6$ represent the aspherical surface coefficients. It should be noted that each parameter in the table is represented through scientific notation. For example, 2.4965E-03 means $2.4965 \times 10^{-3}$, and −5.6139E−05 means $-5.6139 \times 10^{-5}$.

The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the sixth lens 456 in Implementation 1 of this application are shown in the following Table 4.

TABLE 4

Design parameters of anamorphic aspherical surfaces of an optical lens 45 in Implementation 1

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 6.961E−03 | 1.418E−02 | 7.016E−03 | −5.885E−04 | −1.760E−03 | −1.661E−03 | −5.957E−04 | 1.332E−05 |
| S12 | −3.081E−03 | −5.802E−03 | −2.852E−03 | 2.080E−04 | 6.429E−04 | 6.514E−04 | 2.136E−04 | −5.019E−06 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 5.613E−05 | 7.766E−05 | 4.953E−05 | 1.606E−05 | 1.156E−07 | 5.566E−07 | 1.377E−06 | 1.181E−06 |
| S12 | −1.943E−05 | −3.324E−05 | −1.622E−05 | −3.815E−06 | 7.750E−08 | 5.050E−07 | 7.744E−07 | 7.767E−07 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | 1.114E−06 | 1.436E−07 | −7.782E−09 | −3.441E−08 | −9.585E−08 | −1.429E−07 | −1.704E−07 | −7.028E−08 |
| S12 | −2.012E−07 | 4.490E−08 | 8.907E−10 | 2.782E−08 | −5.212E−09 | 4.679E−08 | 7.789E−08 | 9.297E−09 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | −9.456E−09 | 1.867E−10 | 1.447E−09 | 2.898E−09 | 5.206E−10 | −8.234E−09 | 9.248E−09 | 1.020E−10 |
| S12 | 6.456E−10 | 1.108E−10 | 8.786E−10 | −1.279E−09 | −3.189E−09 | −2.776E−12 | −3.636E−10 | −1.112E−08 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 1.135E−10 | 1.726E−11 | 1.321E−11 | 1.971E−11 | −1.884E−10 | −9.634E−10 | −2.433E−09 | 1.499E−09 |
| S12 | −8.632E−11 | −3.929E−12 | 6.581E−11 | −1.365E−10 | −4.042E−10 | −5.594E−10 | −1.174E−10 | −3.156E−10 |

| Surface sequence number | $A_{150}$ | $A_{152}$ |
|---|---|---|
| S11 | −3.730E−10 | −5.362E−12 |
| S12 | −9.850E−11 | −6.269E−12 |

Symbols such as $A_{10}$, $A_{12}$, $A_{14}$, $A_{21}$, $A_{23}$, $A_{25}$, $A_{27}$, ..., $A_{144}$, $A_{146}$, $A_{150}$, and $A_{152}$ represent polynomial coefficients. The foregoing parameters are substituted into the following formulas:

$$z = \frac{cr^2}{1+\sqrt{1-(1+k)c^2r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 11:
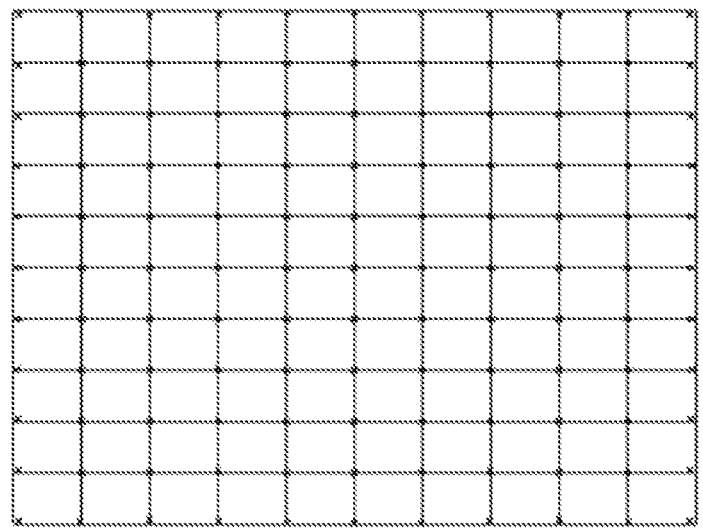
FIG. 11 is an imaging simulation diagram of each lens of the optical lens shown in FIG. 10.

FIG. 11 is an imaging simulation diagram of each lens of the optical lens shown in FIG. 10. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=1.6694%, and TV distortion in the imaging range of the optical lens 4510 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 12:
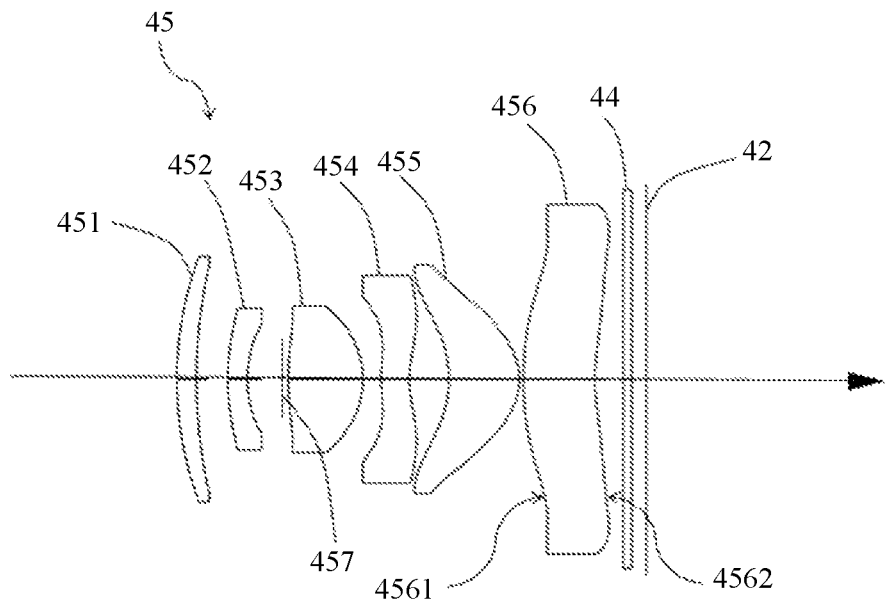
FIG. 12 is a schematic structural diagram of another implementation of lenses of the optical lens shown in FIG. 5.

Implementation 2: FIG. 12 is a schematic structural diagram of another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, both an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 12 shows an optical axis direction of the optical lens 45 by using a solid line with an arrow. In addition, the direction of the arrow represents a direction from the object side to the image side.

Design parameters of the optical lens 45 in Implementation 2 of this application are shown in the following Table 5.

TABLE 5

Design parameters of an optical lens 45 in Implementation 2

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | 0 |
| S1 | Aspherical surface | 9.000 | 0.500 | 1.661 | 20.365 | 40.980 | 0 |
| S2 | Aspherical surface | 13.106 | 0.800 | | | | 0 |
| S3 | Aspherical surface | 6.163 | 0.500 | 1.923 | 20.881 | −3.387 | 0 |
| S4 | Aspherical surface | 3.162 | 0.897 | | | | 0 |
| STOP | Spherical surface | Infinite | 0.146 | | | | 0 |
| S5 | Aspherical surface | 7.000 | 1.9 | 1.544 | 55.865 | 3.468 | 6.990 |
| S6 | Aspherical surface | −2.350 | 0.475 | | | | −0.282 |
| S7 | Aspherical surface | 5.299 | 0.709 | 1.661 | 20.365 | −7.619 | −0.331 |
| S8 | Aspherical surface | 2.457 | 1.009 | | | | −9.459 |
| S9 | Aspherical surface | −2.985 | 1.800 | 1.544 | 55.865 | 3.639 | −1.971 |
| S10 | Aspherical surface | −1.448 | 0.098 | | | | −3.665 |
| S11 (AAS) | Aspherical surface | 9.341 | 1.818 | 1.544 | 55.865 | −10.446 | −10.033 |
| S12 (AAS) | Aspherical surface | 3.300 | 0.724 | | | | −49.970 |
| S13 | Aspherical surface | Infinite | 0.210 | 1.517 | 64.167 | | 0 |
| S14 | Spherical surface | Infinite | 0.375 | | | | 0 |

Based on the data in Table 5, the design parameters of the optical lens 45 in Implementation 2 of this application may be obtained, and are shown in Table 6.

TABLE 6

Design parameters of an optical lens 45 in Implementation 2

| | | | |
|---|---|---|---|
| f1 (mm) | 40.980 | f4 (mm) | −7.619 |
| f2 (mm) | −3.387 | f5 (mm) | 3.639 |
| f3 (mm) | 3.468 | f6 (mm) | −10.446 |
| f (mm) | 4.141 | $|f1/f|$ | 9.897 |
| $|f2/f|$ | 0.818 | $|f3/f|$ | 0.837 |
| $|f4/f|$ | 1.84 | $|f5/f|$ | 0.879 |
| $|f6/f|$ | 2.522 | f2/f1 | −0.0826 |
| f4/f3 | −2.197 | FOV (°) | 101 |
| f/EPD | 2.05 | T45/f | 0.244 |
| ImagH (mm) | 4.38 | TTL (mm) | 12.042 |
| ImagH/TTL | 0.364 | (T23 + T56)/TTL | 0.075 |
| R6/R10 | 1.623 | Fno | 2.05 |

It may be learned from Table 6 that the field of view (FOV) of the optical lens 45 is 101° and the F-number (Fno) is 2.05. In other words, the optical lens 45 in this application can implement a large field of view and a wide aperture, and can better meet a photographing requirement. In addition, TTL is 12.042 mm, ImagH is 4.38 mm, and ImagH/TTL=0.364. In other words, when the effective pixel region formed on the photosensitive chip 42 through projection by the optical lens 45 in this implementation is large, the total optical length (TTL) of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 2 of this application are shown in the following Table 7.

TABLE 7

Design parameters of non-anamorphic lenses of an optical lens 45 in Implementation 2

| Surface number | $A_0$ | $A_1$ | $A_2$ | $A_3$ | $A_4$ | $A_5$ | $A_6$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 |
| S3 | 1.1577E−03 | −2.4902E−04 | 0.0000E+00 | 0.0000E+00 | 0.0000E+00 | 0.0000E+00 | 0.0000E+00 |
| S4 | 8.1578E−03 | 1.6693E−04 | 0.0000E+00 | 0.0000E+00 | 0.0000E+00 | 0.0000E+00 | 0.0000E+00 |
| S5 | 3.6777E+00 | −1.1523E+00 | 2.3687E−01 | −1.1198E−01 | 1.9730E−01 | 2.8580E−02 | −4.4142E−02 |
| S6 | 3.4502E+00 | −3.5990E+00 | −4.4512E−01 | 4.2115E−01 | 1.6085E−01 | −1.5000E−01 | −1.1190E−01 |
| S7 | 2.6508E+00 | −1.7955E+00 | 3.8154E−01 | −1.6180E−02 | 5.0310E−04 | −6.1123E−03 | 2.1212E−03 |
| S8 | 3.5078E+00 | −1.3153E+00 | 3.4338E−01 | −1.4396E−01 | −3.6263E−02 | −2.6597E−02 | −2.7090E−03 |
| S9 | 4.7247E+00 | 2.0221E+00 | −1.8966E−01 | −7.8227E−02 | 2.2936E−01 | −5.6007E−03 | 8.2865E−03 |
| S10 | 4.3497E+00 | 1.8621E+00 | 2.7926E+00 | −1.4598E−01 | −1.6696E−01 | −3.0213E−01 | −1.7885E−01 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1+\sqrt{1-Kc^2r^2}} + u^4\sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the sixth lens 456 in Implementation 2 of this application are shown in the following Table 8.

-continued $$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 13:
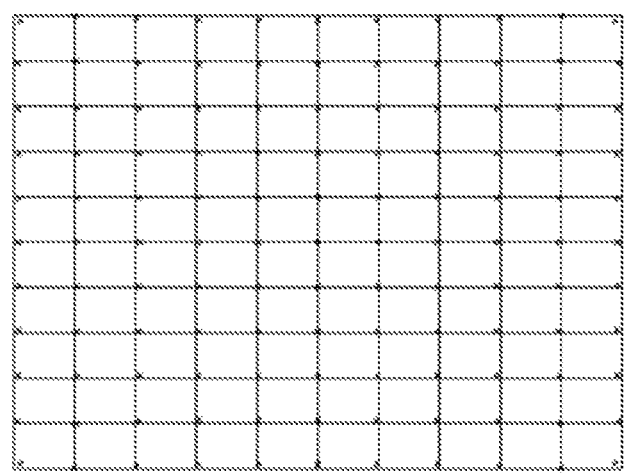
FIG. 13 is an imaging simulation diagram of each lens of the optical lens shown in FIG. 12.

FIG. 13 is an imaging simulation diagram of each lens of the optical lens shown in FIG. 12. A solid-line grid is an ideal imaging grid diagram, and a grid structure formed by a symbol "X" is a schematic diagram of imaging by the optical lens 45 in this implementation. It may be learned from the

TABLE 8

Design parameters of anamorphic aspherical surfaces of an optical lens 45 in Implementation 2

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 6.525E−03 | 1.147E−02 | 6.464E−03 | −6.689E−04 | −1.968E−03 | −1.849E−03 | −6.720E−04 | 8.521E−06 |
| S12 | −3.495E−03 | −7.210E−03 | −2.938E−03 | 2.204E−04 | 5.722E−04 | 5.863E−04 | 2.813E−04 | −3.646E−06 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 4.902E−05 | 6.281E−05 | 5.181E−05 | 1.490E−05 | −1.588E−07 | 5.990E−08 | 5.538E−07 | −2.992E−07 |
| S12 | −2.252E−05 | −3.668E−05 | −1.763E−05 | −6.184E−06 | 1.520E−07 | 3.390E−07 | 3.248E−07 | 5.834E−07 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | −7.648E−08 | 5.918E−08 | −1.639E−08 | −6.353E−08 | −1.728E−07 | −3.377E−07 | −7.119E−07 | −6.650E−08 |
| S12 | −6.569E−07 | −2.548E−08 | −5.743E−09 | 2.580E−08 | −9.782E−09 | −2.418E−08 | 1.708E−07 | −4.263E−08 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | 7.265E−09 | 1.792E−09 | 3.672E−09 | −5.627E−09 | −4.867E−09 | −3.145E−08 | −4.606E−08 | −1.307E−09 |
| S12 | −6.176E−09 | 6.666E−12 | 7.938E−10 | −2.804E−10 | −4.515E−09 | 3.340E−09 | −7.152E−09 | −2.388E−08 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 3.606E−10 | 1.754E−10 | 1.243E−09 | 5.021E−10 | −1.617E−09 | −1.513E−09 | −8.188E−09 | 1.065E−08 |
| S12 | −1.050E−10 | −2.789E−11 | 6.994E−11 | −7.317E−11 | −5.146E−10 | −8.071E−10 | 7.099E−11 | 4.583E−10 |

| Surface sequence number | $A_{150}$ | $A_{152}$ |
|---|---|---|
| S11 | −1.682E−09 | −6.675E−11 |
| S12 | 4.301E−10 | −3.844E−14 |

Symbols such as $A_{10}$, $A_{12}$, $A_{14}$, $A_{21}$, $A_{23}$, $A_{25}$, $A_{27}$, ..., $A_{144}$, $A_{146}$, $A_{150}$, and $A_{152}$ represent polynomial coefficients. The foregoing parameters are substituted into the following formulas:

$$z = \frac{cr^2}{1+\sqrt{1-(1+k)c^2r^2}} + \sum_{i=1}^{N} A_i E_i(x, y)$$

figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=2.3119%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 14:
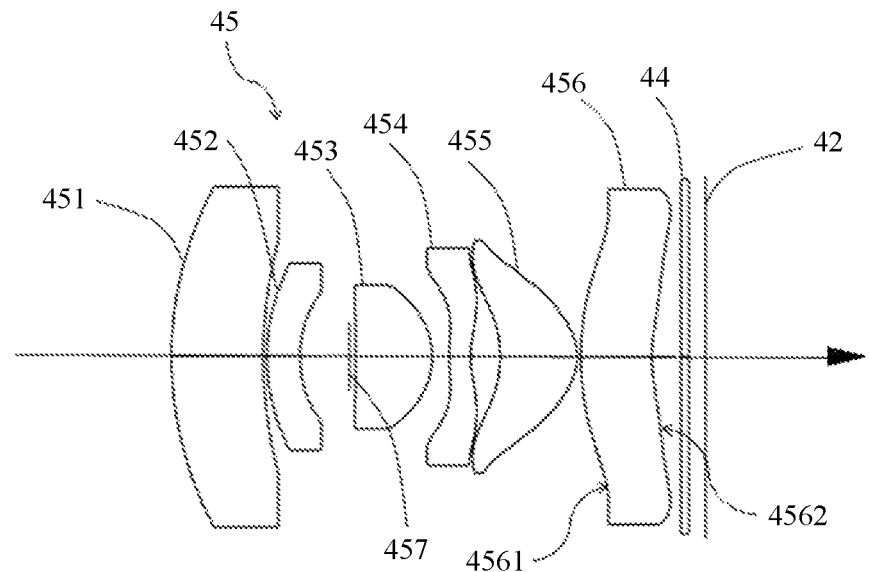
FIG. 14 is a schematic structural diagram of still another implementation of lenses of the optical lens shown in FIG. 5.

Implementation 3: FIG. 14 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 14 shows an optical axis direction of the optical lens 45 by using a solid line with an arrow. In addition, the direction of the arrow represents a direction from the object side to the image side.

Design parameters of the optical lens 45 in Implementation 3 of this application are shown in the following Table 9.

TABLE 9

Design parameters of an optical lens 45 in Implementation 3

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | |
| S1 | Aspherical surface | 9.977 | 2.500 | 1.661 | 20.365 | 52.743 | 0.000 |
| S2 | Aspherical surface | 12.519 | 0.100 | | | | 0.000 |
| S3 | Aspherical surface | 5.766 | 0.900 | 1.923 | 20.881 | −3.478 | 0.000 |
| S4 | Aspherical surface | 3.246 | 1.340 | | | | 0.000 |
| STOP | Spherical surface | Infinite | 0.180 | | | | 0.000 |
| S5 | Aspherical surface | 34.549 | 2.082 | 1.544 | 55.865 | 3.817 | −25.433 |
| S6 | Aspherical surface | −2.173 | 0.462 | | | | −0.272 |
| S7 | Aspherical surface | 5.100 | 0.587 | 1.661 | 20.365 | −8.359 | −0.339 |
| S8 | Aspherical surface | 2.543 | 0.804 | | | | −9.749 |
| S9 | Aspherical surface | −3.376 | 2.101 | 1.544 | 55.865 | 3.287 | −2.027 |
| S10 | Aspherical surface | −1.431 | 0.109 | | | | −3.701 |
| S11 (AAS) | Aspherical surface | 9.911 | 1.916 | 1.544 | 55.865 | −6.731 | −10.716 |
| S12 (AAS) | Aspherical surface | 2.500 | 0.817 | | | | −37.422 |
| S13 | Spherical surface | Infinite | 0.210 | 1.517 | 64.167 | | 0.000 |
| S14 | Spherical surface | Infinite | 0.435 | | | | 0.000 |

Based on the data in Table 9, the design parameters of the optical lens 45 in Implementation 3 of this application may be obtained, and are shown in the following Table 10.

TABLE 10

Design parameters of an optical lens 45 in Implementation 3

| f1 (mm) | 52.743 | f4 (mm) | −8.359 |
|---|---|---|---|
| f2 (mm) | −3.478 | f5 (mm) | 3.287 |
| f3 (mm) | 3.817 | f6 (mm) | −6.731 |
| f (mm) | 4.21 | |f1/f| | 12.533 |
| |f2/f| | 0.826 | |f3/f| | 0.907 |
| |f4/f| | 1.986 | |f5/f| | 0.781 |
| |f6/f| | 1.599 | f2/f1 | −0.066 |
| f4/f3 | −2.190 | FOV (°) | 100 |
| f/EPD | 2.04 | T45/f | 0.191 |
| ImagH (mm) | 4.39 | TTL (mm) | 14.623 |
| ImagH/TTL | 0.3 | (T23 + T56)/TTL | 0.014 |
| R6/R10 | 1.519 | Fno | 2.04 |

It may be learned from Table 10 that the field of view (FOV) of the optical lens 45 is 100° and the F-number (Fno) is 2.04. In other words, the optical lens 45 in this application can implement a large field of view and a wide aperture, and can better meet a photographing requirement. In addition, TTL is 14.623 mm, ImagH is 4.39 mm, and ImagH/TTL=0.3. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 3 of this application are shown in the following Table 11.

TABLE 11

Design parameters of non-anamorphic lenses of an optical lens 45 in Implementation 3

| Surface number | $A_0$ | $A_1$ | $A_2$ | $A_3$ | $A_4$ | $A_5$ | $A_6$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 |
| S3 | 2.6177E−03 | −7.1695E−05 | 0.0000E+00 | 0.0000E+00 | 0.0000E+00 | 0.0000E+00 | 0.0000E+00 |
| S4 | 6.2457E−03 | −1.6474E−04 | 0.0000E+00 | 0.0000E+00 | 0.0000E+00 | 0.0000E+00 | 0.0000E+00 |
| S5 | 3.2414E+00 | −1.0821E+00 | 3.2488E−01 | −1.0098E−01 | 1.2073E−02 | 3.3096E−02 | −3.8390E−02 |
| S6 | 3.4756E+00 | −3.4977E+00 | −4.5751E−01 | 4.2179E−01 | 1.5905E−01 | −1.4458E−01 | −1.1653E−01 |
| S7 | 2.6625E+00 | −1.7365E+00 | 3.8310E−01 | −1.6967E−02 | −1.9119E−03 | −8.0984E−03 | 4.4516E−03 |
| S8 | 3.4896E+00 | −1.3727E+00 | 3.6406E−01 | −1.4937E−01 | −4.0489E−02 | −2.6909E−02 | −3.0597E−03 |
| S9 | 4.6950E+00 | 2.2273E+00 | −2.0976E−01 | −1.2943E−01 | 2.3726E−01 | −8.2719E−03 | 1.0964E−02 |
| S10 | 4.3941E+00 | 1.3309E+00 | 2.8230E+00 | −1.1652E−01 | −1.9823E−01 | −2.9619E−01 | −1.7306E−01 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the sixth lens 456 in Implementation 3 of this application are shown in the following Table 12.

TABLE 12

Design parameters of anamorphic aspherical surfaces of an optical lens 45 in Implementation 3

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 6.795E−03 | 1.247E−02 | 6.503E−03 | −6.325E−04 | −1.873E−03 | −1.691E−03 | −6.457E−04 | 1.215E−05 |
| S12 | −2.434E−03 | −6.007E−03 | −2.630E−03 | 1.765E−04 | 5.598E−04 | 6.458E−04 | 2.607E−04 | −4.606E−06 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 5.634E−05 | 6.102E−05 | 5.037E−05 | 1.805E−05 | 3.073E−08 | 1.517E−06 | 1.759E−06 | 1.192E−06 |
| S12 | −2.064E−05 | −3.989E−05 | −2.038E−05 | −3.837E−06 | 6.927E−08 | 6.103E−07 | 8.443E−07 | 2.213E−06 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | 2.025E−06 | 1.934E−07 | −1.238E−08 | 4.396E−08 | −5.843E−08 | −1.212E−07 | −4.131E−07 | −3.086E−08 |
| S12 | −1.078E−06 | −1.569E−07 | −7.652E−10 | −3.024E−08 | −2.202E−08 | −2.786E−08 | 6.549E−08 | 2.639E−07 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | −1.574E−08 | 1.840E−10 | −3.620E−09 | −8.794E−10 | 7.125E−09 | −1.500E−08 | 3.294E−09 | −1.064E−08 |
| S12 | −3.663E−09 | 1.260E−10 | 1.678E−09 | −2.082E−09 | −8.195E−09 | 1.526E−08 | −2.190E−08 | −4.079E−08 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 1.209E−10 | 1.020E−10 | 2.313E−10 | −1.615E−09 | −2.280E−09 | −4.519E−09 | −1.162E−08 | 8.950E−09 |
| S12 | −4.196E−11 | −4.262E−12 | 2.656E−10 | 6.308E−11 | −5.435E−10 | −8.834E−10 | 4.989E−10 | −1.659E−09 |

| Surface sequence number | $A_{150}$ | $A_{152}$ |
|---|---|---|
| S11 | −3.307E−10 | −1.327E−11 |
| S12 | 1.028E−09 | 1.712E−12 |

Symbols such as $A_{10}$, $A_{12}$, $A_{14}$, $A_{21}$, $A_{23}$, $A_{25}$, and $A_{27}$ represent polynomial coefficients.

The foregoing parameters are substituted into the following formulas:

$$z = \frac{cr^2}{1+\sqrt{1-(1+k)c^2r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 15:
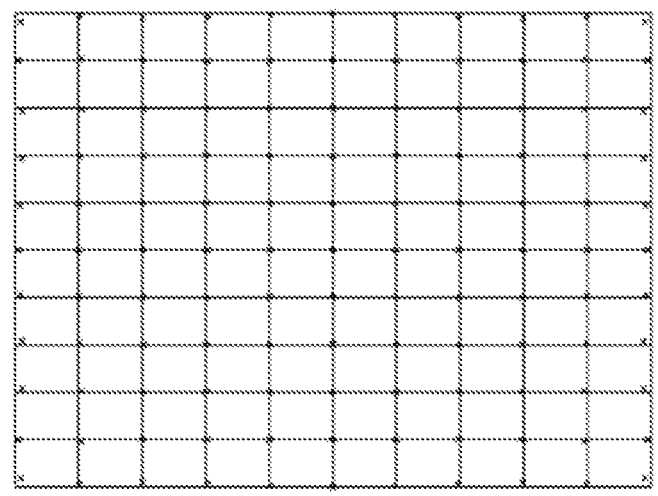
FIG. 15 is an imaging simulation diagram of each lens of the optical lens shown in FIG.

FIG. 15 is an imaging simulation diagram of each lens of the optical lens shown in FIG. 14. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=2.6506%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 16:
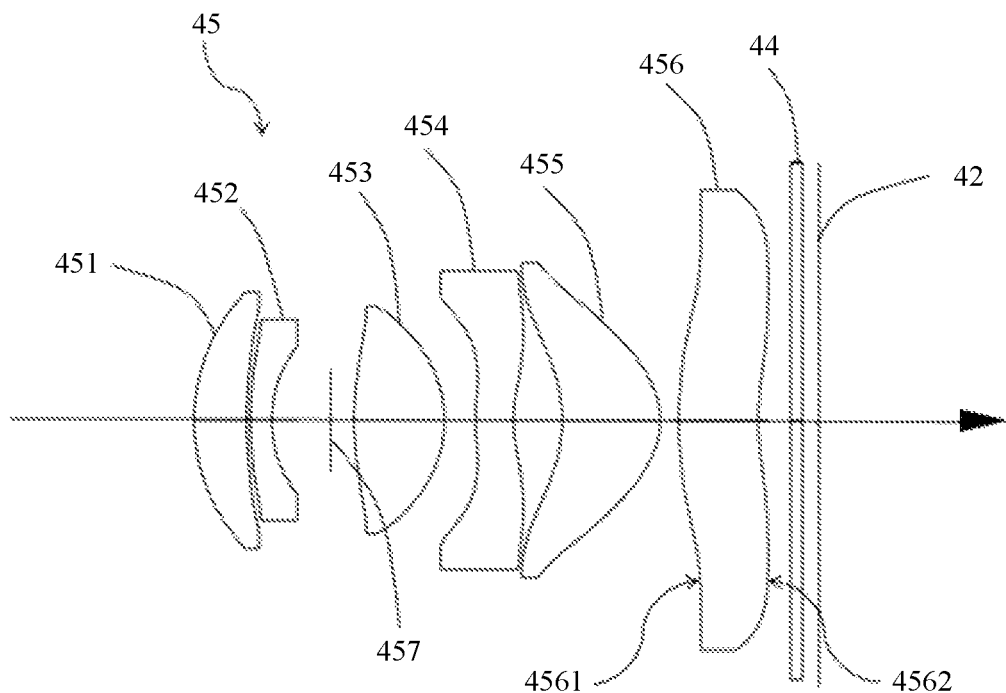
FIG. 16 is a schematic structural diagram of still another implementation of lenses of the optical lens shown in FIG. 5.

Implementation 4: FIG. 16 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 16 shows an optical axis direction of the optical lens 45 by using a solid line with an arrow. In addition, the direction of the arrow represents a direction from the object side to the image side.

Design parameters of the optical lens 45 in Implementation 4 of this application are shown in the following Table 13.

TABLE 13

Design parameters of an optical lens 45 in Implementation 4

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | |
| S1 | Aspherical surface | 3.500 | 0.995 | 1.923 | 20.881 | 8.635 | 0.000 |
| S2 | Aspherical surface | 10.000 | 0.070 | | | | 0.000 |
| S3 | Aspherical surface | 7.315 | 0.402 | 1.923 | 20.881 | −2.611 | 0.195 |
| S4 | Aspherical surface | 2.437 | 1.112 | | | | 0.011 |
| STOP | Spherical surface | Infinite | 0.445 | | | | 0.000 |
| S5 | Aspherical surface | 6.121 | 1.700 | 1.544 | 55.865 | 3.357 | 1.166 |
| S6 | Aspherical surface | −2.363 | 0.599 | | | | −0.286 |
| S7 | Aspherical surface | 5.258 | 0.709 | 1.661 | 20.365 | −7.871 | −0.413 |
| S8 | Aspherical surface | 2.488 | 0.918 | | | | −9.799 |
| S9 | Aspherical surface | −2.827 | 1.850 | 1.544 | 55.865 | 3.593 | −2.229 |
| S10 | Aspherical surface | −1.427 | 0.350 | | | | −3.574 |
| S11 (AAS) | Aspherical surface | 8.902 | 1.499 | 1.544 | 55.865 | −12.052 | −9.787 |
| S12 (AAS) | Aspherical surface | 3.561 | 0.619 | | | | −47.872 |
| S13 | Spherical surface | Infinite | 0.210 | 1.517 | 64.167 | | 0.000 |
| S14 | Spherical surface | Infinite | 0.310 | | | | 0.000 |

Based on the data in Table 13, the design parameters of the optical lens 45 in Implementation 4 of this application may be obtained, and are shown in the following Table 14.

TABLE 14

Design parameters of an optical lens 45 in Implementation 4

| | | | |
|---|---|---|---|
| f1 (mm) | 8.635 | f4 (mm) | −7.871 |
| f2 (mm) | −2.611 | f5 (mm) | 3.593 |
| f3 (mm) | 3.357 | f6 (mm) | −12.052 |
| f (mm) | 4.253 | |f1/f| | 2.03 |
| |f2/f| | 0.614 | |f3/f| | 0.790 |
| |f4/f| | 1.853 | |f5/f| | 0.846 |
| |f6/f| | 2.837 | f2/f1 | −0.302 |

TABLE 14-continued

| Design parameters of an optical lens 45 in Implementation 4 | | | |
|---|---|---|---|
| f4/f3 | −2.345 | FOV (°) | 100 |
| f/EPD | 2.05 | T45/f | 0.217 |
| ImagH (mm) | 3.94 | TTL (mm) | 11.8684 |
| ImagH/TTL | 0.332 | (T23 + T56)/TTL | 0.036 |
| R6/R10 | 1.657 | Fno | 2.05 |

It may be learned from Table 14 that the field of view (FOV) of the optical lens 45 is 100° and the F-number (Fno) is 2.05. In other words, the optical lens 45 in this application can implement a large field of view and a wide aperture, and can better meet a photographing requirement. In addition, TTL is 11.8684 mm, ImagH is 3.94 mm, and ImagH/TTL=0.332. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 4 of this application are shown in the following Table 15.

TABLE 15

| Design parameters of non-anamorphic lenses of an optical lens 45 in Implementation 4 | | | | | | | |
|---|---|---|---|---|---|---|---|
| Surface number | $A_0$ | $A_1$ | $A_2$ | $A_3$ | $A_4$ | $A_5$ | $A_6$ |
| S1 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 |
| S3 | −1.4285E+00 | 2.0901E−01 | −4.9205E−02 | 2.2758E−02 | 4.6089E−02 | −3.5650E−02 | −3.2758E−02 |
| S4 | −3.3642E+00 | −5.2680E−01 | 4.3980E−01 | 1.5015E−01 | −1.4959E−01 | −8.5065E−02 | −1.5040E−02 |
| S5 | −1.8300E+00 | 3.9127E−01 | 6.0647E−03 | 1.8752E−03 | −2.6337E−03 | 6.2850E−03 | 1.5888E−03 |
| S6 | −1.1820E+00 | 3.1251E−01 | −1.5220E−01 | −4.7590E−02 | −2.2504E−02 | −6.7780E−04 | −4.1749E−04 |
| S7 | 2.2171E+00 | −2.9100E−01 | −5.4245E−04 | 1.8737E−01 | 1.4373E−02 | 1.0547E−02 | −1.6012E−02 |
| S8 | 1.8892E+00 | 2.7806E+00 | −1.3519E−01 | −1.7452E−01 | −2.8777E−01 | −1.7306E−01 | −8.3124E−02 |
| S9 | −1.4285E+00 | 2.0901E−01 | −4.9205E−02 | 2.2758E−02 | 4.6089E−02 | −3.5650E−02 | −3.2758E−02 |
| S10 | −3.3642E+00 | −5.2680E−01 | 4.3980E−01 | 1.5015E−01 | −1.4959E−01 | −8.5065E−02 | −1.5040E−02 |

Symbols such as $A_0, A_1, A_2, A_3, A_4, A_5$, and $A_6$ represent the aspherical surface coefficients. The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the sixth lens 456 in Implementation 4 of this application are shown in the following Table 16.

TABLE 16

| Design parameters of anamorphic aspherical surfaces of an optical lens 45 in Implementation 4 | | | | | | | | |
|---|---|---|---|---|---|---|---|---|
| Surface sequence number | $A_{10}$ | $A_{12}$ | $A_{14}$ | $A_{21}$ | $A_{23}$ | $A_{25}$ | $A_{27}$ | $A_{36}$ |
| S11 | 6.219E−03 | 1.103E−02 | 5.476E−03 | −8.654E−04 | −2.194E−03 | −2.085E−03 | −8.524E−04 | 1.063E−05 |
| S12 | −3.862E−03 | −9.936E−03 | −3.680E−03 | 1.887E−04 | 5.392E−04 | 3.472E−04 | 2.101E−04 | −3.883E−06 |
| Surface sequence number | $A_{38}$ | $A_{40}$ | $A_{42}$ | $A_{44}$ | $A_{55}$ | $A_{57}$ | $A_{59}$ | $A_{61}$ |
| S11 | −1.261E−05 | −4.330E−05 | −3.504E−05 | 2.095E−05 | −1.558E−07 | 9.369E−07 | 1.821E−06 | −9.500E−06 |
| S12 | −2.545E−05 | −3.298E−05 | −2.044E−05 | −4.979E−06 | 1.523E−07 | 8.506E−07 | 3.874E−07 | 1.887E−06 |

TABLE 16-continued

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | 1.205E−06 | 1.148E−07 | −5.020E−08 | −5.210E−08 | −5.677E−08 | 8.061E−07 | −1.642E−06 | 5.914E−07 |
| S12 | −8.046E−07 | −3.798E−10 | −1.091E−08 | 2.128E−08 | −1.256E−08 | −5.110E−08 | 4.262E−07 | 1.518E−07 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | 2.990E−08 | −4.684E−10 | −6.861E−09 | 7.587E−09 | 6.878E−08 | −8.035E−08 | −1.041E−07 | 4.128E−08 |
| S12 | −8.082E−09 | −3.077E−10 | −1.761E−09 | 1.056E−09 | −3.812E−09 | 6.110E−10 | −5.880E−09 | −5.891E−08 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 3.238E−09 | 1.362E−10 | 4.453E−10 | −3.254E−09 | 1.455E−09 | 7.965E−09 | −1.004E−08 | 3.055E−08 |
| S12 | −4.918E−10 | −6.174E−11 | 1.533E−11 | 1.424E−10 | −5.692E−11 | −1.353E−09 | 3.695E−11 | −5.059E−10 |

| Surface sequence number | $A_{150}$ | $A_{152}$ |
|---|---|---|
| S11 | −1.268E−08 | −2.400E−10 |
| S12 | −1.190E−09 | 2.102E−11 |

Symbols such as $A_{10}$, $A_{12}$, $A_{14}$, $A_{21}$, $A_{23}$, $A_{25}$, and $A_{27}$ represent polynomial coefficients.

The foregoing parameters are substituted into the following formula:

$$z = \frac{cr^2}{1+\sqrt{1-(1+k)c^2r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 17:
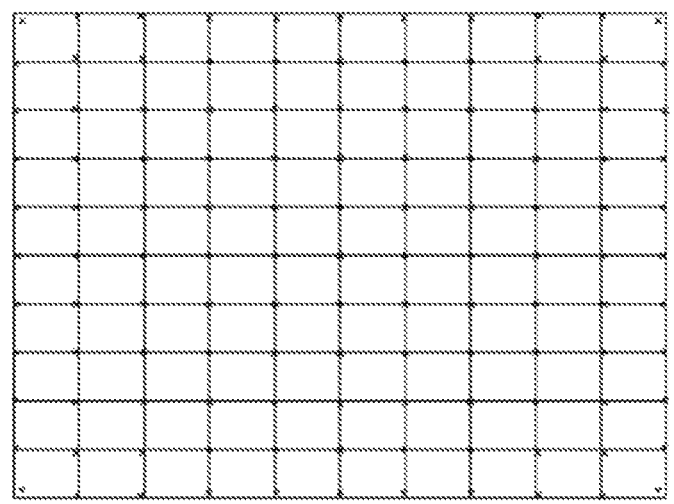
FIG. 17 is an imaging simulation diagram of each lens of the optical lens shown in FIG. 16.

FIG. 17 is an imaging simulation diagram of each lens of the optical lens shown in FIG. 16. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=2.8277%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 18:
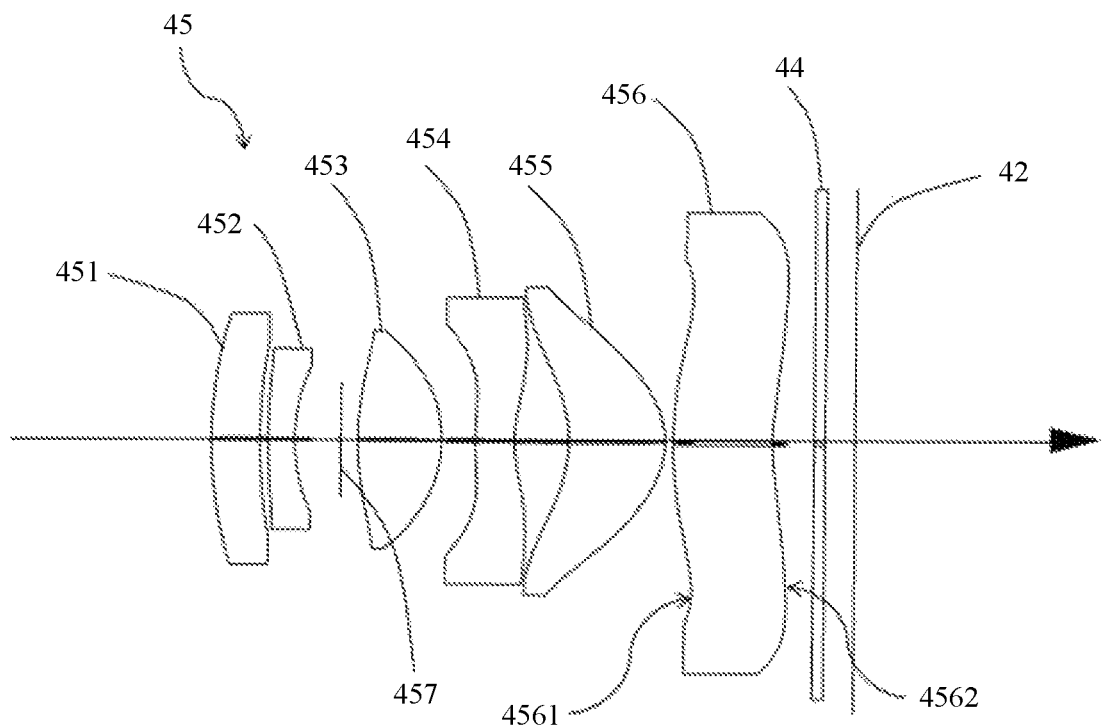
FIG. 18 is a schematic structural diagram of still another implementation of lenses of the optical lens shown in FIG. 5.

Implementation 5: FIG. 18 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 465 has negative focal power.

In this implementation, an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 18 shows an optical axis direction of the optical lens 45 by using a solid line with an arrow. In addition, the direction of the arrow represents a direction from the object side to the image side.

Design parameters of the optical lens 45 in Implementation 5 of this application are shown in the following Table 17.

TABLE 17

Design parameters of an optical lens 45 in Implementation 5

| Surface number | Surface type | Curvature radius | Thickness | Material Refractive index | Material Abbe number | Focal length | Conic coefficient |
|---|---|---|---|---|---|---|---|
| OBJ | Spherical surface | Infinite | Infinite | | | | |
| S1 | Aspherical surface | 7.781 | 0.900 | 1.923 | 20.881 | 55.415 | 0.000 |

TABLE 17-continued

Design parameters of an optical lens 45 in Implementation 5

| Surface number | Surface type | Curvature radius | Thickness | Material Refractive index | Abbe number | Focal length | Conic coefficient |
|---|---|---|---|---|---|---|---|
| S2 | Aspherical surface | 9.772 | 0.150 | | | | 0.000 |
| S3 | Aspherical surface | 10.785 | 0.501 | 1.923 | 20.881 | −3.767 | 0.000 |
| S4 | Aspherical surface | 3.516 | 0.858 | | | | 0.000 |
| STOP | Spherical surface | Infinite | 0.308 | | | | 0.000 |
| S5 | Aspherical surface | 5.000 | 1.559 | 1.544 | 55.865 | 3.123 | 1.251 |
| S6 | Aspherical surface | −2.306 | 0.617 | | | | −0.321 |
| S7 | Aspherical surface | 5.053 | 0.728 | 1.661 | 20.365 | −5.943 | −0.403 |
| S8 | Aspherical surface | 2.096 | 1.007 | | | | −9.880 |
| S9 | Aspherical surface | −2.656 | 1.796 | 1.544 | 55.865 | 3.767 | −2.253 |
| S10 | Aspherical surface | −1.437 | 0.150 | | | | −3.562 |
| S11 (AAS) | Aspherical surface | 7.803 | 1.840 | 1.544 | 55.865 | −12.283 | −8.679 |
| S12 (AAS) | Aspherical surface | 3.308 | 0.773 | | | | −48.290 |
| S13 | Spherical surface | Infinite | 0.210 | 1.517 | 64.167 | | 0.000 |
| S14 | Spherical surface | Infinite | 0.554 | | | | 0.000 |

Based on the data in Table 17, the design parameters of the optical lens 45 in Implementation 5 of this application may be obtained, and are shown in the following Table 18.

TABLE 18

Design parameters of an optical lens 45 in Implementation 5

| f1 (mm) | 55.415 | f4 (mm) | −5.943 |
|---|---|---|---|
| f2 (mm) | −3.767 | f5 (mm) | 3.767 |
| f3 (mm) | 3.123 | f6 (mm) | −12.283 |
| f (mm) | 4.175 | |f1/f| | 13.272 |
| |f2/f| | 0.902 | |f3/f| | 0.748 |
| |f4/f| | 1.423 | |f5/f| | 0.902 |
| |f6/f| | 2.942 | f2/f1 | −0.068 |
| f4/f3 | −1.903 | FOV (°) | 101 |
| f/EPD | 2.05 | T45/f | 0.241 |
| ImagH (mm) | 4.25 | TTL (mm) | 12.031 |
| ImagH/TTL | 0.354 | (T23 + T56)/TTL | 0.084 |
| R6/R10 | 1.605 | Fno | 2.05 |

It may be learned from Table 18 that the field of view (FOV) of the optical lens 45 is 101° and the F-number (Fno) is 2.05. In other words, the optical lens 45 in this application can implement a large field of view and a wide aperture, and can better meet a photographing requirement. In addition, TTL is 12.031 mm, ImagH is 4.25 mm, and ImagH/TTL=0.354. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 5 of this application are shown in the following Table 19.

TABLE 19

Design parameters of non-anamorphic lenses of an optical lens 45 in Implementation 5

| Surface number | $A_0$ | $A_1$ | $A_2$ | $A_3$ | $A_4$ | $A_5$ | $A_6$ |
|---|---|---|---|---|---|---|---|
| S1 | 0.0000E+00 | 0.0000E+00 | 0.0000E+00 | 0.0000E+00 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 |
| S3 | −4.7136E−05 | −4.6581E−04 | 0.0000E+00 | 0.0000E+00 | 0.0000E+00 | 0.0000E+00 | 0.0000E+00 |
| S4 | 1.0699E−02 | −3.3017E−04 | 0.0000E+00 | 0.0000E+00 | 0.0000E+00 | 0.0000E+00 | 0.0000E+00 |
| S5 | −1.5734E+00 | 2.4840E−01 | −9.3049E−02 | −7.3303E−03 | 2.5035E−02 | −3.1238E−02 | −2.8120E−02 |
| S6 | −3.3124E+00 | −4.9982E−01 | 4.4351E−01 | 1.4851E−01 | −1.4865E−01 | −9.9596E−02 | −2.3765E−02 |
| S7 | −1.8541E+00 | 3.9796E−01 | 2.6770E−03 | 5.7753E−04 | −2.0272E−03 | 3.9776E−03 | 2.3068E−03 |
| S8 | −1.1514E+00 | 2.9622E−01 | −1.5178E−01 | −4.5098E−02 | −2.3692E−02 | −1.8388E−03 | 5.7623E−04 |
| S9 | 2.1431E+00 | −2.8161E−01 | −1.8436E−02 | 1.8813E−01 | 9.9322E−03 | 8.9805E−03 | −1.9777E−02 |
| S10 | 1.9797E+00 | 2.7760E+00 | −1.2827E−01 | −1.7749E−01 | −2.9102E−01 | −1.7835E−01 | −7.0347E−02 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the sixth lens 456 in Implementation 5 of this application are shown in the following Table 20.

-continued $$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 19:
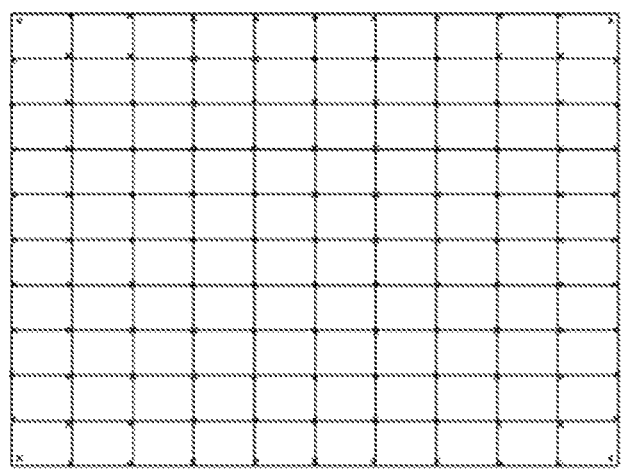
FIG. 19 is an imaging simulation diagram of each lens of the optical lens shown in FIG. 18.

FIG. 19 is an imaging simulation diagram of each lens of the optical lens shown in FIG. 18. A solid-line grid is an ideal imaging grid diagram, and a grid structure formed by a symbol "X" is a schematic diagram of imaging by the optical lens 45 in this implementation. It may be learned from the

TABLE 20

Design parameters of anamorphic aspherical surfaces of an optical lens 45 in Implementation 5

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 5.611E−03 | 8.326E−03 | 4.830E−03 | −7.988E−04 | −2.243E−03 | −2.191E−03 | −9.090E−04 | 9.428E−06 |
| S12 | −2.052E−03 | −7.944E−03 | −2.246E−03 | 1.733E−04 | 4.778E−04 | 4.860E−04 | 2.248E−04 | −4.908E−06 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 3.661E−05 | −5.982E−07 | 3.888E−05 | 1.963E−05 | −2.189E−07 | 3.288E−07 | 1.675E−06 | −6.355E−06 |
| S12 | −2.297E−05 | −4.367E−05 | −2.488E−05 | −1.129E−05 | 4.971E−08 | 7.768E−07 | 5.202E−07 | 8.046E−07 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | 2.666E−07 | 1.085E−07 | −9.463E−08 | −2.187E−07 | −2.626E−07 | −5.631E−07 | −9.633E−07 | 3.622E−07 |
| S12 | −1.237E−06 | 4.530E−09 | −7.228E−09 | 1.628E−08 | 3.347E−08 | −4.159E−08 | 2.756E−07 | −1.847E−07 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | 1.884E−08 | 3.721E−11 | −6.512E−09 | 6.857E−08 | −1.190E−07 | −8.687E−08 | −8.202E−08 | 8.537E−09 |
| S12 | −1.177E−08 | −1.656E−10 | 8.878E−10 | 1.583E−09 | −3.704E−09 | −6.559E−11 | −7.922E−09 | −4.147E−08 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 2.551E−09 | 1.729E−10 | 2.023E−09 | −2.865E−09 | −8.300E−09 | −1.286E−08 | −3.110E−08 | 2.044E−08 |
| S12 | −2.645E−10 | −1.000E−10 | 7.745E−12 | −7.976E−12 | −2.271E−10 | −1.361E−09 | 7.617E−10 | 1.593E−09 |

| Surface sequence number | $A_{150}$ | | | | $A_{152}$ | | | |
|---|---|---|---|---|---|---|---|---|
| S11 | −1.581E−08 | | | | −3.038E−10 | | | |
| S12 | 1.631E−09 | | | | 3.553E−11 | | | |

Symbols such as $A_{10}$, $A_{12}$, $A_{14}$, $A_{21}$, $A_{23}$, $A_{25}$, and $A_{27}$ represent polynomial coefficients. The foregoing parameters are substituted into the following formulas:

$$z = \frac{cr^2}{1+\sqrt{1-(1+k)c^2 r^2}} + \sum_{i=1}^{N} A_i E_i(x, y)$$

figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=2.5481%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 20:
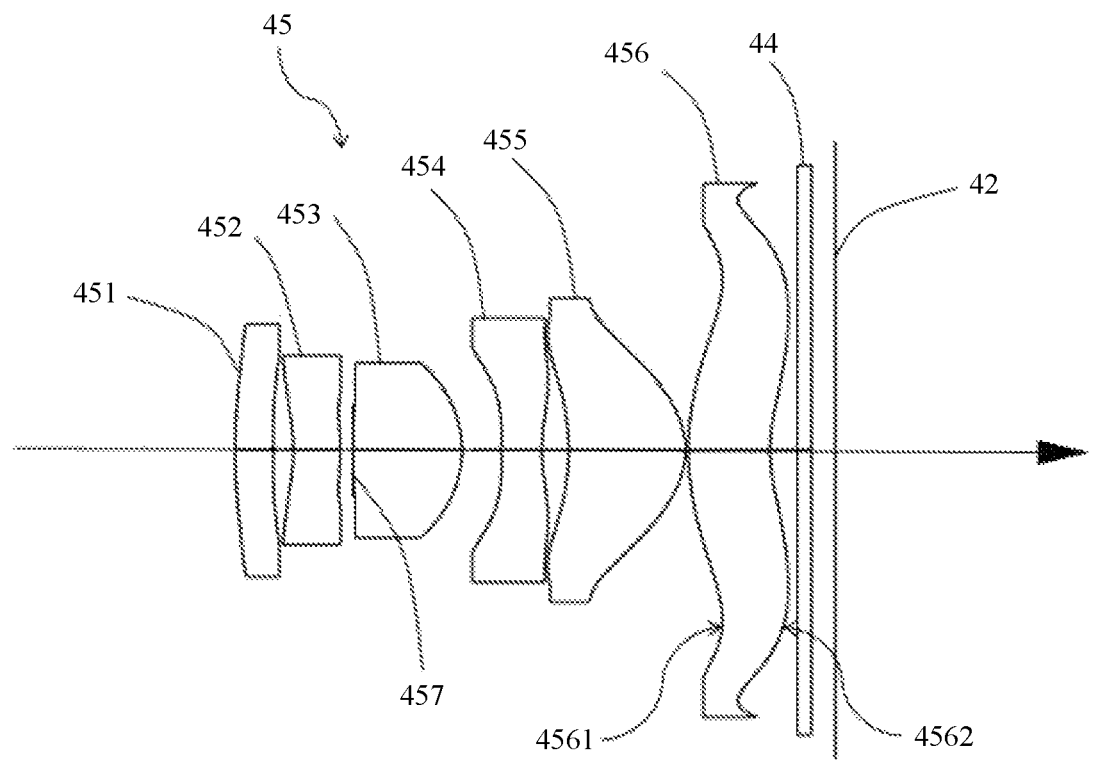
FIG. 20 is a schematic structural diagram of still another implementation of lenses of the optical lens shown in FIG. 5.

Implementation 6: FIG. 20 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 465 has negative focal power.

In this implementation, an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 20 shows an optical axis direction of the optical lens 45 by using a solid line with an arrow. In addition, the direction of the arrow represents a direction from the object side to the image side.

Design parameters of the optical lens 45 in Implementation 6 of this application are shown in the following Table 21.

TABLE 21

Design parameters of an optical lens 45 in Implementation 6

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | 0.000 |
| S1 | Aspherical surface | 11.866 | 0.700 | 1.544 | 55.865 | 46.254 | 0.000 |
| S2 | Aspherical surface | 15.321 | 0.380 | | | | 0.000 |
| S3 | Aspherical surface | −3.177 | 0.865 | 1.544 | 55.865 | −16.111 | 0.000 |
| S4 | Aspherical surface | −5.447 | 0.239 | | | | 0.000 |
| STOP | Spherical surface | Infinite | 0.000 | | | | 1.251 |
| S5 | Aspherical surface | 17.633 | 2.029 | 1.544 | 55.865 | 3.527 | −0.321 |
| S6 | Aspherical surface | −2.076 | 0.733 | | | | −0.403 |
| S7 | Aspherical surface | 120.000 | 0.756 | 1.661 | 20.365 | −4.222 | −9.880 |
| S8 | Aspherical surface | 2.877 | 0.494 | | | | −2.253 |
| S9 | Aspherical surface | −4.792 | 2.174 | 1.544 | 55.865 | 3.066 | −3.562 |
| S10 | Aspherical surface | −1.441 | 0.056 | | | | −8.679 |
| S11 (AAS) | Aspherical surface | 5.212 | 1.511 | 1.544 | 55.865 | −10.494 | −48.290 |
| S12 (AAS) | Aspherical surface | 2.451 | 0.517 | | | | 0.000 |
| S13 | Spherical surface | Infinite | 0.210 | 1.517 | 64.167 | | 0.000 |
| S14 | Spherical surface | Infinite | 0.458 | | | | 0.000 |

Based on the data in Table 21, the design parameters of the optical lens 45 in Implementation 6 of this application may be obtained, and are shown in Table 22.

TABLE 22

Design parameters of an optical lens 45 in Implementation 6

| | | | |
|---|---|---|---|
| f1 (mm) | 46.254 | f4 (mm) | −4.222 |
| f2 (mm) | −16.111 | f5 (mm) | 3.066 |
| f3 (mm) | 3.527 | f6 (mm) | −10.494 |
| f (mm) | 3.646 | \|f1/f\| | 12.685 |
| \|f2/f\| | 4.419 | \|f3/f\| | 0.967 |
| \|f4/f\| | 1.158 | \|f5/f\| | 0.840 |
| \|f6/f\| | 2.878 | f2/f1 | −0.348 |
| f4/f3 | −1.254 | FOV (°) | 112 |
| f/EPD | 2.23 | T45/f | 0.136 |
| ImagH (mm) | 5.00 | TTL (mm) | 11.2236 |
| ImagH/TTL | 0.445 | (T23 + T56)/TTL | 0.026 |
| R6/R10 | 1.441 | Fno | 2.23 |

It may be learned from Table 22 that the field of view (FOV) of the optical lens 45 is 112° and the F-number (Fno) is 2.23. In other words, the optical lens 45 in this application can implement a large field of view and a wide aperture, and can better meet a photographing requirement. In this implementation, TTL is 11.2236 mm, ImagH is 5.00 mm, and ImagH/TTL=0.445. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 6 of this application are shown in the following Table 23.

TABLE 23

Design parameters of non-anamorphic lenses of an optical lens 45 in Implementation 6

| Surface number | A0 | A1 | A2 | A3 | A4 | A5 | A6 |
|---|---|---|---|---|---|---|---|
| S1 | 1.48E−03 | 1.75E−05 | 0.00E+00 | 0.00E+00 | 0.00E+00 | 0.00E+00 | 0.00E+00 |
| S2 | −7.23E−03 | −5.09E−04 | 0.00E+00 | 0.00E+00 | 0.00E+00 | 0.00E+00 | 0.00E+00 |
| S3 | 3.10E+00 | 2.95E−02 | 1.74E−01 | −3.88E−02 | −1.67E−02 | −1.64E−02 | −7.39E−04 |
| S4 | 4.91E+01 | 9.61E+00 | −3.26E+00 | −2.53E+00 | −4.85E−01 | −1.57E−02 | 1.95E−02 |
| S5 | 7.03E−03 | −3.31E−02 | 7.80E−03 | 3.08E−03 | 5.62E−04 | −7.63E−04 | −5.00E−04 |
| S6 | −5.93E−01 | 2.00E−02 | −2.83E−02 | −5.89E−03 | −5.27E−03 | −1.15E−03 | −3.86E−04 |
| S7 | −7.55E−01 | 1.57E−01 | −1.25E−02 | −7.72E−04 | −2.30E−03 | −3.92E−05 | 5.85E−04 |
| S8 | −6.02E−01 | 1.63E−01 | −1.84E−02 | 3.80E−03 | −2.96E−03 | −2.58E−06 | 1.67E−04 |
| S9 | 3.69E−01 | 1.25E−01 | −2.22E−02 | −4.52E−04 | −1.58E−03 | 1.21E−03 | −2.26E−04 |
| S10 | −4.50E−01 | 3.08E−01 | −4.72E−03 | −9.14E−03 | −3.34E−03 | 1.87E−03 | 5.44E−04 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the sixth lens 456 in Implementation 6 of this application are shown in the following Table 24.

TABLE 24

Design parameters of anamorphic aspherical surfaces of an optical lens 45 in Implementation 6

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 1.58E−02 | 2.89E−02 | 1.53E−02 | −3.84E−03 | −9.99E−03 | −1.01E−02 | −3.75E−03 | 4.44E−04 |
| S12 | −2.98E−02 | −5.12E−02 | −2.87E−02 | 7.51E−03 | 2.11E−02 | 2.22E−02 | 7.14E−03 | −1.21E−03 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 1.52E−03 | 2.47E−03 | 1.60E−03 | 4.08E−04 | −4.06E−05 | −2.14E−04 | −4.43E−04 | −4.31E−04 |
| S12 | −4.91E−03 | −7.48E−03 | −4.84E−03 | −1.24E−03 | 1.28E−04 | 6.47E−04 | 1.28E−03 | 1.29E−03 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | −2.23E−04 | −4.38E−05 | 3.07E−06 | 1.98E−05 | 4.94E−05 | 6.59E−05 | 5.02E−05 | 2.03E−05 |
| S12 | 6.50E−04 | 1.28E−04 | −7.88E−06 | −4.72E−05 | −1.18E−04 | −1.58E−04 | −1.16E−04 | −4.78E−05 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | 3.07E−06 | −1.38E−07 | −8.22E−07 | −2.09E−06 | −4.90E−06 | −4.06E−06 | −2.88E−06 | −5.68E−07 |
| S12 | −7.87E−06 | 2.55E−07 | 1.80E−06 | 5.42E−06 | 8.83E−06 | 9.10E−06 | 5.50E−06 | 1.62E−06 |

| Surface sequence number | $A_{119}$ | $A_{136}$ | $A_{138}$ | $A_{40}$ | $A_{142}$ | $A_{144}$ | $A_{146}$ | $A_{148}$ |
|---|---|---|---|---|---|---|---|---|
| S11 | −1.08E−07 | 1.03E−09 | 3.79E−09 | −2.68E−09 | 8.46E−08 | 1.23E−07 | −9.95E−10 | 7.46E−08 |
| S12 | 2.59E−07 | −3.62E−09 | −3.09E−08 | −8.90E−08 | −1.97E−07 | −2.48E−07 | −1.73E−07 | −1.27E−07 |

| Surface sequence number | $A_{150}$ | $A_{152}$ |
|---|---|---|
| S11 | −4.51E−08 | 1.76E−09 |
| S12 | −2.96E−08 | −3.17E−09 |

Symbols such as $A_{10}$, $A_{12}$, $A_{14}$, $A_{21}$, $A_{23}$, $A_{25}$, and $A_{27}$ represent polynomial coefficients.

The foregoing parameters are substituted into the following formulas:

$$z = \frac{cr^2}{1+\sqrt{1-(1+k)c^2r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 + A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 21:
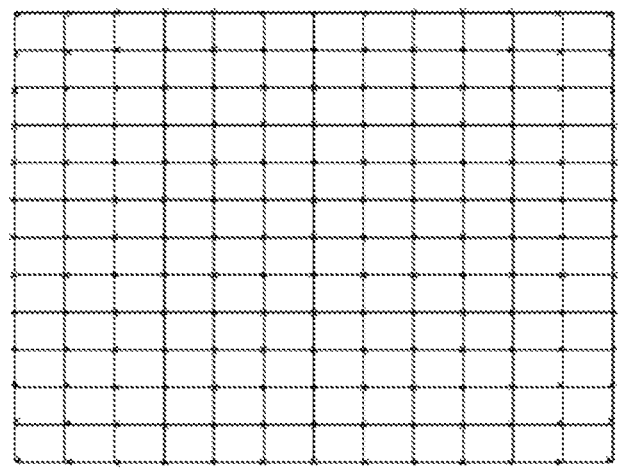
FIG. 21 is an imaging simulation diagram of each lens of the optical lens shown in FIG. 20.

FIG. 21 is an imaging simulation diagram of each lens of the optical lens shown in FIG. 20. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=1.5569%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 22:
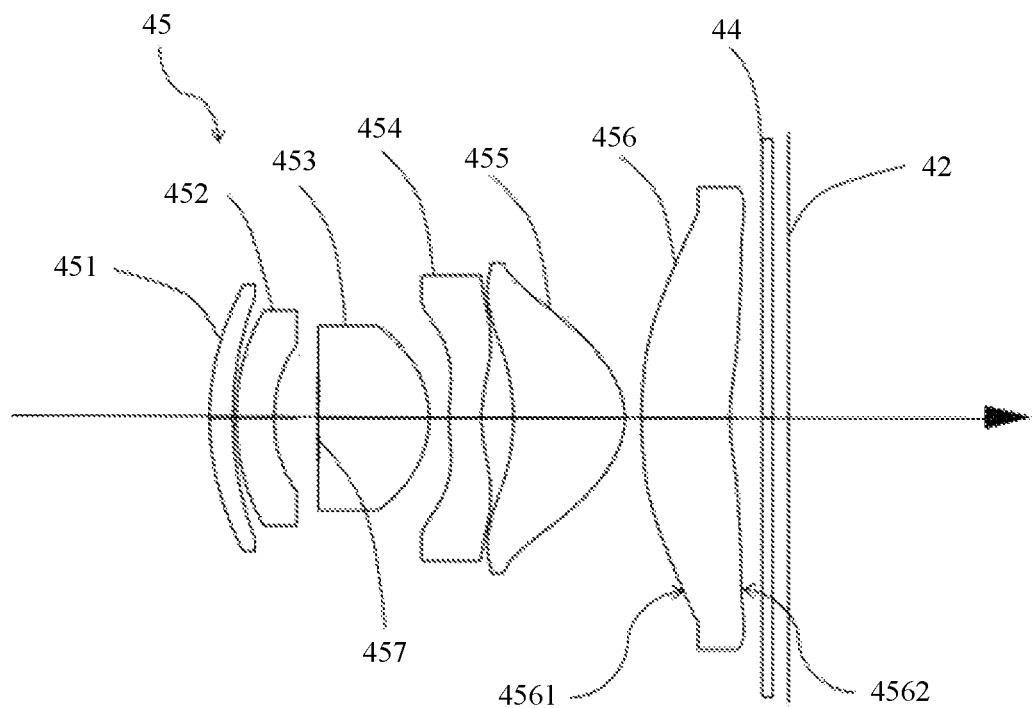
FIG. 22 is a schematic structural diagram of still another implementation of lenses of the optical lens shown in FIG. 5.

Implementation 7: FIG. 22 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 22 shows an optical axis direction of the optical lens 45 by using a solid line with an arrow. In addition, the direction of the arrow represents a direction from the object side to the image side.

Design parameters of the optical lens 45 in Implementation 7 of this application are shown in the following Table 25.

TABLE 25

Design parameters of an optical lens 45 in Implementation 7

| Surface number | Surface type | Curvature radius | Thickness | Refractive index | Abbe number | Focal length | Conic coefficient |
|---|---|---|---|---|---|---|---|
| OBJ | Spherical surface | Infinite | Infinite | | | | 0.000 |
| S1 | Aspherical surface | 5.704 | 0.488 | 1.717 | 47.961 | 38.003 | 0.000 |
| S2 | Aspherical surface | 7.000 | 0.071 | | | | 0.000 |
| S3 | Aspherical surface | 4.902 | 0.799 | 1.923 | 20.881 | −3.126 | 0.000 |
| S4 | Aspherical surface | 2.917 | 0.925 | | | | 0.000 |
| STOP | Spherical surface | Infinite | 0.013 | | | | 0.000 |
| S5 | Aspherical surface | 33.966 | 2.330 | 1.544 | 55.865 | 4.043 | 47.278 |
| S6 | Aspherical surface | −2.307 | 0.427 | | | | −0.254 |
| S7 | Aspherical surface | 4.850 | 0.677 | 1.661 | 20.365 | −7.614 | −0.203 |
| S8 | Aspherical surface | 2.344 | 0.669 | | | | −9.263 |

TABLE 25-continued

Design parameters of an optical lens 45 in Implementation 7

| Surface number | Surface type | Curvature radius | Thickness | Material Refractive index | Abbe number | Focal length | Conic coefficient |
|---|---|---|---|---|---|---|---|
| S9 | Aspherical surface | −5.405 | 2.361 | 1.498 | 82.571 | 3.332 | −1.979 |
| S10 | Aspherical surface | −1.457 | 0.349 | | | | −3.693 |
| S11 (AAS) | Aspherical surface | 10.411 | 1.861 | 1.544 | 55.865 | −7.362 | −5.099 |
| S12 (AAS) | Aspherical surface | 2.719 | 0.690 | | | | −49.586 |
| S13 | Spherical surface | Infinite | 0.210 | 1.517 | 64.167 | | 0.000 |
| S14 | Spherical surface | Infinite | 0.338 | | | | 0.000 |

Based on the data in Table 25, the design parameters of the optical lens 45 in Implementation 7 of this application may be obtained, and are shown in Table 26.

TABLE 26

Design parameters of an optical lens 45 in Implementation 7

| | | | |
|---|---|---|---|
| f1 (mm) | 38.003 | f4 (mm) | −7.614 |
| f2 (mm) | −3.126 | f5 (mm) | 3.332 |
| f3 (mm) | 4.043 | f6 (mm) | −7.362 |
| f (mm) | 4.092 | |f1/f| | 9.287 |
| |f2/f| | 0.763 | |f3/f| | 0.988 |
| |f4/f| | 1.860 | |f5/f| | 0.814 |
| |f6/f| | 1.799 | f2/f1 | −0.082 |
| f4/f3 | −1.883 | FOV (°) | 113 |
| f/EPD | 2.05 | T45/f | 0.164 |
| ImagH (mm) | −3.190 | TTL (mm) | 12.2892 |
| ImagH/TTL | −0.260 | (T23 + T56)/TTL | 0.104 |
| R6/R10 | 1.582 | Fno | 2.05 |

It may be learned from Table 26 that the field of view (FOV) of the optical lens 45 is 113° and the F-number (Fno) is 2.23. In other words, the optical lens 45 in this application can implement a large field of view and a wide aperture, and can better meet a photographing requirement. In this implementation, TTL is 12.2892 mm, ImagH is −3.190 mm, and ImagH/TTL=−0.260. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 7 of this application are shown in the following Table 27.

TABLE 27

Design parameters of non-anamorphic lenses of an optical lens 45 in Implementation 7

| Surface number | $A_0$ | $A_1$ | $A_2$ | $A_3$ | $A_4$ | $A_5$ | $A_6$ |
|---|---|---|---|---|---|---|---|
| S1 | 4.5851E−05 | −1.1944E−05 | 0.0000E+00 | 0.0000E+00 | 0.0000E+00 | 0.0000E+00 | 0.0000E+00 |
| S2 | 5.0823E−04 | 1.4852E−05 | 0.0000E+00 | 0.0000E+00 | 0.0000E+00 | 0.0000E+00 | 0.0000E+00 |
| S3 | 2.3829E−03 | −5.9726E−05 | 0.0000E+00 | 0.0000E+00 | 0.0000E+00 | 0.0000E+00 | 0.0000E+00 |
| S4 | 7.6679E−03 | −1.6866E−04 | 0.0000E+00 | 0.0000E+00 | 0.0000E+00 | 0.0000E+00 | 0.0000E+00 |
| S5 | −1.3144E+00 | 2.7732E−01 | −1.3261E−01 | −3.6522E−03 | 3.3210E−02 | −5.0816E−02 | −3.2074E−02 |
| S6 | −3.5654E+00 | −4.4067E−01 | 4.0940E−01 | 1.6636E−01 | −1.5404E−01 | −1.1443E−01 | −3.2480E−02 |
| S7 | −1.7736E+00 | 3.8152E−01 | −1.9297E−02 | −2.4216E−03 | −6.0501E−03 | 2.5367E−03 | 1.6128E−03 |
| S8 | −1.3978E+00 | 3.3036E−01 | −1.3787E−01 | −3.9654E−02 | −2.3089E−02 | −1.2913E−03 | 3.7844E−04 |
| S9 | 2.0355E+00 | −8.8988E−02 | −1.5832E−01 | 2.3324E−01 | −7.0980E−03 | 1.1812E−02 | −1.6392E−02 |
| S10 | 1.4289E+00 | 2.8523E+00 | −1.1320E−01 | −1.9060E−01 | −2.9395E−01 | −1.8131E−01 | −7.2198E−02 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u = r/r_{max}$.

In addition, design parameters of anamorphic aspherical surface coefficients of the sixth lens 456 in Implementation 7 of this application are shown in the following Table 28.

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 23:
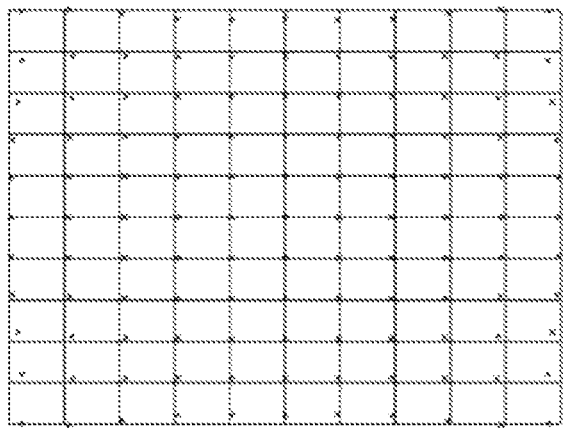
FIG. 23 is an imaging simulation diagram of each lens of the optical lens shown in FIG. 22.

FIG. 23 is an imaging simulation diagram of each lens of the optical lens shown in FIG. 22. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implemen-

TABLE 28

Design parameters of anamorphic aspherical surfaces of an optical lens 45 in Implementation 7

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 6.668E−03 | 1.175E−02 | 6.311E−03 | −6.180E−04 | −1.804E−03 | −1.676E−03 | −5.758E−04 | 1.069E−05 |
| S12 | −4.483E−03 | −8.941E−03 | −3.364E−03 | 2.009E−04 | 6.978E−04 | 4.358E−04 | 2.009E−04 | −3.719E−06 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 5.853E−05 | 7.592E−05 | 3.975E−05 | 1.891E−05 | −2.511E−08 | 6.845E−07 | 1.918E−06 | 2.172E−06 |
| S12 | −2.829E−05 | −3.398E−05 | −2.620E−05 | −3.295E−06 | 8.833E−08 | 4.089E−07 | 6.957E−07 | 1.611E−06 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | 5.062E−07 | 8.016E−08 | −1.636E−08 | −1.660E−08 | −8.334E−08 | −2.178E−07 | −2.625E−07 | 5.546E−10 |
| S12 | −1.131E−06 | 1.002E−08 | −4.116E−09 | 2.446E−08 | −2.125E−08 | 2.865E−08 | 1.008E−07 | −1.885E−07 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | −1.661E−08 | 8.853E−10 | 1.714E−09 | −1.488E−09 | −1.370E−08 | −9.986E−09 | −5.636E−08 | 9.597E−10 |
| S12 | −1.175E−10 | 4.486E−11 | 1.526E−09 | −1.464E−09 | −2.204E−09 | 3.765E−09 | −1.963E−09 | −1.855E−08 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 2.655E−10 | 1.914E−11 | 1.235E−10 | 1.708E−10 | −6.540E−10 | −8.277E−10 | −4.475E−09 | −9.490E−09 |
| S12 | 3.343E−11 | −4.311E−12 | 1.422E−10 | −2.174E−10 | −3.579E−10 | −1.593E−10 | −4.155E−11 | 4.528E−10 |

| Surface sequence number | $A_{150}$ | | | | $A_{152}$ | | | |
|---|---|---|---|---|---|---|---|---|
| S11 | −7.283E−10 | | | | −1.660E−12 | | | |
| S12 | 8.721E−10 | | | | −3.908E−12 | | | |

Symbols such as $A_{10}$, $A_{12}$, $A_{14}$, $A_{21}$, $A_{23}$, $A_{25}$, and $A_{27}$ represent polynomial coefficients. The foregoing parameters are substituted into the following formulas:

$$z = \frac{cr^2}{1+\sqrt{1-(1+k)c^2r^2}} + \sum_{i=1}^{N} A_i E_i(x, y)$$

tation is basically the same as ideal imaging, and TV distortion in an imaging range of the optical lens 45 is small. Specifically, in this implementation, a maximum value TDT of TV distortion in the imaging range of the optical lens 45 meets |TDT|=4.8350%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 24:
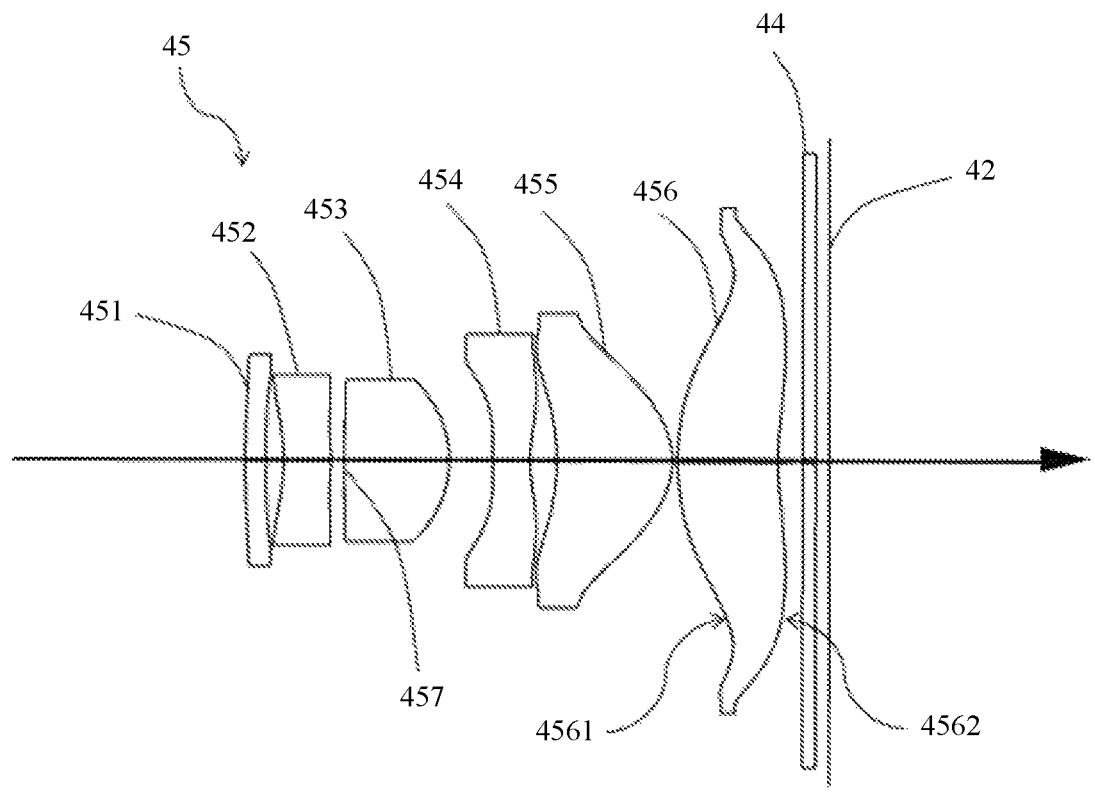
FIG. 24 is a schematic structural diagram of still another implementation of lenses of the optical lens shown in FIG. 5.

Implementation 8: FIG. 24 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has positive focal power.

In this implementation, an object side surface 4561 and an image side surface 4562 of the sixth lens 456 are anamorphic aspherical surfaces. Other lenses are all non-anamorphic lenses (namely, the first lens 451, the second lens 452, the third lens 453, the fourth lens 454, and the fifth lens 455 are all non-anamorphic lenses), and both an object side surface and an image side surface of the non-anamorphic lens are non-anamorphic aspherical surfaces. FIG. 24 shows an optical axis direction of the optical lens 45 by using a solid line with an arrow. In addition, the direction of the arrow represents a direction from the object side to the image side.

Design parameters of the optical lens 45 in Implementation 8 of this application are shown in the following Table 29.

TABLE 29

Design parameters of an optical lens 45 in Implementation 8

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | 0.000 |
| S1 | Aspherical surface | 22.386 | 0.350 | 1.544 | 55.865 | 450.799 | 22.203 |
| S2 | Aspherical surface | 16.000 | 0.348 | | | | −22.149 |
| S3 | Aspherical surface | −3.040 | 0.896 | 1.544 | 55.865 | −14.904 | −0.031 |
| S4 | Aspherical surface | −5.355 | 0.246 | | | | 0.043 |
| STOP | Spherical surface | Infinite | 0.000 | | | | 0.000 |
| S5 | Aspherical surface | 15.916 | 2.001 | 1.544 | 55.865 | 3.365 | 42.112 |
| S6 | Aspherical surface | −1.988 | 0.836 | | | | −7.154 |
| S7 | Aspherical surface | 120.000 | 0.707 | 1.661 | 20.365 | −3.831 | −93.658 |
| S8 | Aspherical surface | 2.501 | 0.506 | | | | −13.187 |
| S9 | Aspherical surface | −4.766 | 2.188 | 1.498 | 82.571 | 3.126 | 1.384 |
| S10 | Aspherical surface | −1.462 | 0.102 | | | | −2.312 |
| S11 (AAS) | Aspherical surface | 7.116 | 1.970 | 1.544 | 55.865 | 90.409 | −5.000 |
| S12 (AAS) | Aspherical surface | 7.500 | 0.482 | | | | −15.993 |
| S13 | Spherical surface | Infinite | 0.252 | 1.517 | 64.167 | | 0.000 |
| S14 | Spherical surface | Infinite | 0.268 | | | | 0.000 |

Based on the data in Table 29, the design parameters of the optical lens 45 in Implementation 8 of this application may be obtained, and are shown in the following Table 30.

TABLE 30

Design parameters of an optical lens 45 in Implementation 8

| | | | |
|---|---|---|---|
| f1 (mm) | 450.799 | f4 (mm) | −3.831 |
| f2 (mm) | −14.904 | f5 (mm) | 3.126 |
| f3 (mm) | 3.365 | f6 (mm) | 90.409 |
| f (mm) | 3.234 | |f1/f| | 139.386 |
| |f2/f| | 4.608 | |f3/f| | 1.041 |
| |f4/f| | 1.185 | |f5/f| | 0.967 |
| |f6/f| | 27.954 | f2/f1 | −0.033 |
| f4/f3 | −1.138 | FOV (°) | 130 |
| f/EPD | 2.24 | T45/f | 0.156 |
| ImagH (mm) | 4.995 | TTL (mm) | 11.1277 |
| ImagH/TTL | 0.445 | (T23 + T56)/TTL | 0.031 |
| R6/R10 | 1.359 | Fno | 2.24 |

It may be learned from Table 30 that the field of view (FOV) of the optical lens 45 is 130° and the F-number (Fno) is 2.23. In other words, the optical lens 45 in this application can implement a large field of view and a wide aperture, and can better meet a photographing requirement. In this implementation, TTL is 11.1277 mm, ImagH is 4.995 mm, and ImagH/TTL=0.445. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the first lens 451, the second lens 452, the third lens 453, the fourth lens 454, and the fifth lens 455) in Implementation 8 of this application are shown in the following Table 31.

TABLE 31

Design parameters of non-anamorphic lenses of an optical lens 45 in Implementation 8

| Surface number | $A_0$ | $A_1$ | $A_2$ | $A_3$ | $A_4$ | $A_5$ | $A_6$ |
|---|---|---|---|---|---|---|---|
| S1  | 1.4762E−03  | 1.7478E−05  | 0.0000E+00  | 0.0000E+00  | 0.0000E+00  | 0.0000E+00  | 0.0000E+00 |
| S2  | −7.2268E−03 | −5.0910E−04 | 0.0000E+00  | 0.0000E+00  | 0.0000E+00  | 0.0000E+00  | 0.0000E+00 |
| S3  | 3.0997E+00  | 2.9531E−02  | 1.7439E−01  | −3.8770E−02 | −1.6703E−02 | −1.6440E−02 | −7.3926E−04 |
| S4  | 4.9057E+01  | 9.6124E+00  | −3.2636E+00 | −2.5320E+0  | −4.8540E−01 | −1.5692E−02 | 1.9548E−02 |
| S5  | 1.2486E−02  | −3.2960E−02 | 8.6854E−03  | 2.8498E−03  | 1.5030E−03  | −6.6726E−04 | −3.4940E−04 |
| S6  | −5.9267E−01 | 2.7938E−02  | −2.7908E−02 | −6.2007E−03 | −6.4321E−03 | −1.9555E−03 | −5.7225E−04 |
| S7  | −7.5223E−01 | 1.5932E−01  | −8.9152E−03 | 9.3672E−04  | −6.8548E−04 | −4.4212E−04 | 1.4436E−03 |
| S8  | −6.0014E−01 | 1.6298E−01  | −1.8353E−02 | 4.4839E−03  | −1.9129E−03 | −1.1461E−03 | 2.2716E−04 |
| S9  | 3.7758E−01  | 1.2345E−01  | −2.2225E−02 | 2.8058E−04  | −1.5228E−04 | 2.2063E−04  | −1.5353E−04 |
| S10 | −4.5841E−01 | 3.2003E−01  | −2.1905E−03 | −1.7138E−03 | 8.7588E−05  | 9.4878E−04  | 4.7193E−03 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1 + \sqrt{1 - Kc^2 r^2}} + u^4 \sum_{m=0}^{M} A_m Q_m^{con}(u^2)$$

After the foregoing operation, surface types of the object side surfaces and the image side surfaces of the first lens 451, the second lens 452, the third lens 453, the fourth lens 454, and the fifth lens 455 can be obtained.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u = r/r_{max}$.

In addition, design parameters of anamorphic aspherical surface coefficients of the sixth lens 456 in Implementation 8 of this application are shown in the following Table 32.

TABLE 32

Design parameters of anamorphic aspherical surfaces of an optical lens 45 in Implementation 8

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S11 | 2.682E−02  | 3.993E−02  | 2.540E−02  | −4.674E−03 | −9.383E−03 | −9.888E−03 | −4.116E−03 | 4.235E−04 |
| S12 | −3.024E−02 | −5.097E−02 | −2.806E−02 | 7.551E−03  | 2.109E−02  | 2.199E−02  | 7.350E−03  | −1.216E−03 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S11 | 0.000E+00 | 1.409E−03  | 2.397E−03  | 1.170E−03  | 4.005E−04  | −3.713E−05 | −2.216E−04 | −4.414E−04 |
| S12 | 0.000E+00 | −4.917E−03 | −7.495E−03 | −4.840E−03 | −1.223E−03 | 1.283E−04  | 6.486E−04  | 1.282E−03 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S11 | −4.218E−04 | −2.316E−04 | −4.316E−05 | 3.168E−06  | 1.923E−05  | 5.004E−05  | 6.872E−05  | 4.909E−05 |
| S12 | 1.286E−03  | 6.524E−04  | 1.279E−04  | −7.854E−06 | −4.721E−05 | −1.180E−04 | −1.584E−04 | −1.153E−04 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S11 | 2.359E−05  | 3.129E−06  | −1.355E−07 | −8.047E−07 | −2.100E−06 | −4.761E−06 | −3.869E−06 | −2.884E−06 |
| S12 | −4.589E−05 | −8.014E−06 | 2.568E−07  | 1.797E−06  | 5.426E−06  | 8.817E−06  | 9.076E−06  | 5.497E−06 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S11 | 5.609E−07 | −1.162E−07 | 5.605E−10  | 1.221E−08  | 9.482E−09  | 8.463E−08  | 6.482E−08  | 7.536E−08 |
| S12 | 1.551E−06 | 2.551E−07  | −3.746E−09 | −3.127E−08 | −8.672E−08 | −1.967E−07 | −2.493E−07 | −1.759E−07 |

| Surface sequence number | $A_{150}$ | $A_{152}$ |
|---|---|---|
| S11 | 3.248E−08  | −1.236E−07 |
| S12 | −1.279E−07 | −3.314E−08 |

Symbols such as $A_{10}$, $A_{12}$, $A_{14}$, $A_{21}$, $A_{23}$, $A_{25}$, and $A_{27}$ represent polynomial coefficients. The foregoing parameters are substituted into the following formulas:

$$z = \frac{cr^2}{1 + \sqrt{1-(1+k)c^2r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 25:
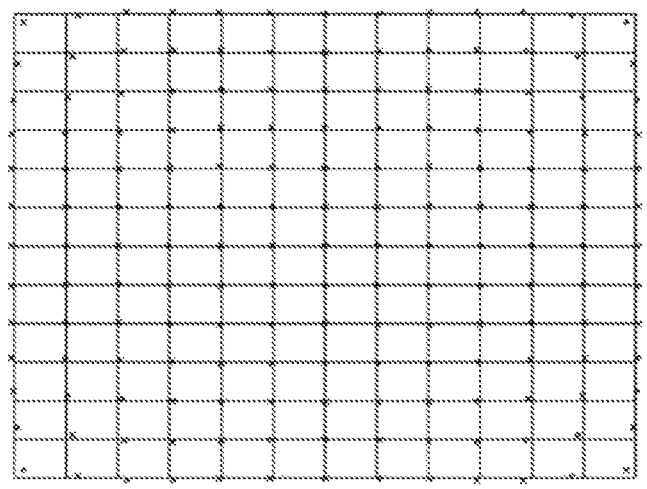
FIG. 25 is an imaging simulation diagram of each lens of the optical lens shown in FIG. 24.

FIG. 25 is an imaging simulation diagram of each lens of the optical lens shown in FIG. 24. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=3.4559%, and TV distortion in the imaging range of the optical lens 45 is small. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion. Therefore, the sixth lens 456 has "a plurality of functions".

Figure 26:
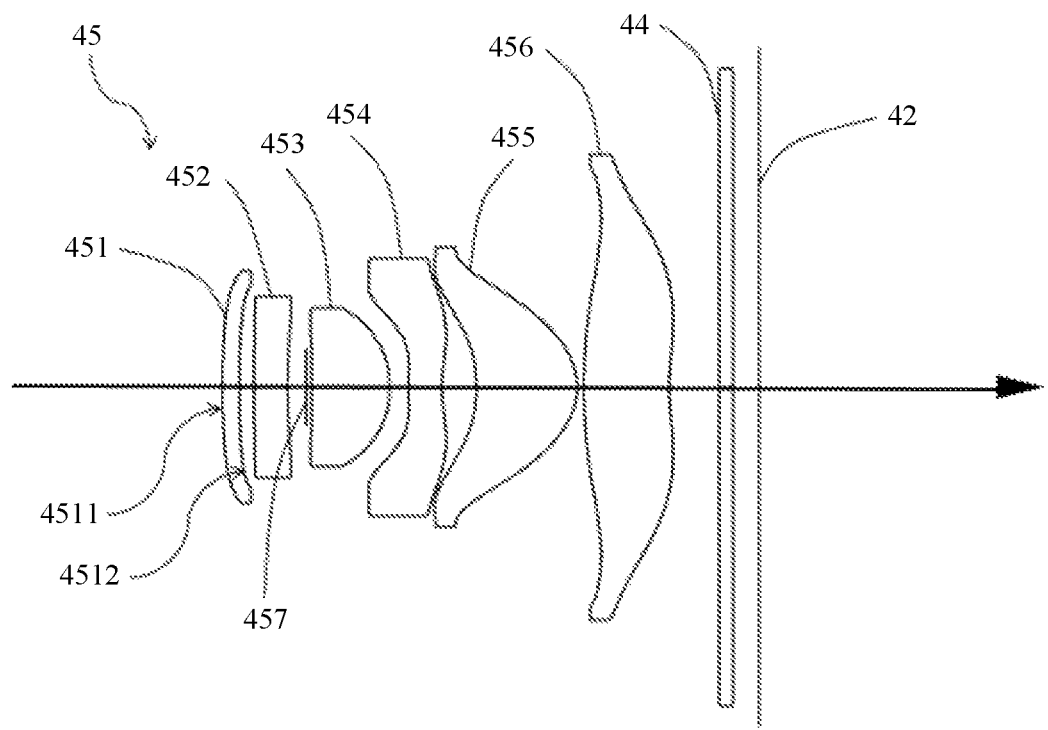
FIG. 26 is a schematic structural diagram of still another implementation of lenses of the optical lens shown in FIG. 5.

Implementation 9: FIG. 26 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, both an object side surface 4511 and an image side surface 4512 of the first lens 451 are anamorphic aspherical surfaces. Other lenses are all non-anamorphic lenses (namely, the second lens 452, the third lens 453, the fourth lens 454, the fifth lens 455, and the sixth lens 456 are all non-anamorphic lenses), and both an object side surface and an image side surface of the non-anamorphic lens are non-anamorphic aspherical surfaces. FIG. 26 shows an optical axis direction of the optical lens 45 by using a solid line with an arrow. In addition, the direction of the arrow represents a direction from the object side to the image side.

Design parameters of the optical lens 45 in Implementation 9 of this application are shown in the following Table 33.

TABLE 33

| | | | | Material | | | |
|---|---|---|---|---|---|---|---|
| Surface number | Surface type | Curvature radius | Thickness | Refractive index | Abbe number | Focal length | Conic coefficient |
| OBJ | Spherical surface | Infinite | Infinite | | | | 0.000 |
| S1 (AAS) | Aspherical surface | 21.574 | 0.250 | 1.544 | 55.865 | 239.029 | 146.140 |
| S2 (AAS) | Aspherical surface | 25.735 | 0.221 | | | | −100.000 |
| S3 | Aspherical surface | 53.729 | 0.499 | 1.901 | 37.054 | −13.708 | 0.000 |
| S4 | Aspherical surface | 10.047 | 0.285 | | | | 0.000 |
| STOP | Spherical surface | Infinite | 0.079 | | | | 0.000 |
| S5 | Aspherical surface | 30.160 | 1.169 | 1.544 | 55.865 | 3.144 | −129.407 |
| S6 | Aspherical surface | −1.798 | 0.285 | | | | 0.292 |
| S7 | Aspherical surface | 4.524 | 0.497 | 1.661 | 20.365 | −4.375 | 0.000 |
| S8 | Aspherical surface | 1.698 | 0.522 | | | | −12.235 |
| S9 | Aspherical surface | −2.360 | 1.514 | 1.498 | 82.571 | 2.051 | −1.929 |
| S10 | Aspherical surface | −0.932 | 0.099 | | | | −3.193 |

Design parameters of an optical lens 45 in Implementation 9

TABLE 33-continued

Design parameters of an optical lens 45 in Implementation 9

| Surface number | Surface type | Curvature radius | Thickness | Material Refractive index | Abbe number | Focal length | Conic coefficient |
|---|---|---|---|---|---|---|---|
| S11 | Aspherical surface | 10.054 | 1.277 | 1.544 | 55.865 | −7.588 | −79.632 |
| S12 | Aspherical surface | 2.804 | 0.751 | | | | −69.210 |
| S13 | Spherical surface | Infinite | 0.210 | 1.517 | 64.167 | | 0.000 |
| S14 | Spherical surface | Infinite | 0.390 | | | | 0.000 |

Based on the data in Table 33, the design parameters of the optical lens 45 in Implementation 9 of this application may be obtained, and are shown in the following Table 34.

TABLE 34

Design parameters of an optical lens 45 in Implementation 9

| | | | |
|---|---|---|---|
| f1 (mm) | 239.029 | f4 (mm) | −4.375 |
| f2 (mm) | −13.708 | f5 (mm) | 2.051 |

TABLE 34-continued

Design parameters of an optical lens 45 in Implementation 9

| | | | |
|---|---|---|---|
| f3 (mm) | 3.144 | f6 (mm) | −7.588 |
| f (mm) | 2.615 | |f1/f| | 91.421 |
| |f2/f| | 5.242 | |f3/f| | 1.203 |
| |f4/f| | 1.673 | |f5/f| | 0.784 |
| |f6/f| | 2.901 | f2/f1 | −0.057 |
| f4/f3 | −1.391 | FOV (°) | 125 |
| f/EPD | 2.23 | T45/f | 0.2 |
| ImagH (mm) | 4.89 | TTL (mm) | 8.0 |
| ImagH/TTL | 0.63 | (T23 + T56)/TTL | 0.048 |
| R6/R10 | 1.928 | Fno | 2.23 |

It may be learned from Table 34 that the field of view (FOV) of the optical lens 45 is 125° and the F-number (Fno) is 2.23. In other words, the optical lens 45 in this application can implement a large field of view and a wide aperture, and can better meet a photographing requirement. In this implementation, TTL is 8.0 mm, ImagH is 4.89 mm, and ImagH/TTL=0.63. In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the second lens 452, the third lens 453, the fourth lens 454, the fifth lens 455, and the sixth lens 456) in Implementation 9 of this application are shown in the following Table 35.

TABLE 35

Design parameters of non-anamorphic lenses of an optical lens 45 in Implementation 9

| Surface number | $A_0$ | $A_1$ | $A_2$ | $A_3$ | $A_4$ | $A_5$ | $A_6$ |
|---|---|---|---|---|---|---|---|
| S3 | 0.0000E+00 | 0.0000E+00 | 0.0000E+00 | 0.0000E+00 | 0.0000E+00 | 0.0000E+00 | 0.0000E+00 |
| S4 | 0.0000E+00 | 0.0000E+00 | 0.0000E+00 | 0.0000E+00 | 0.0000E+00 | 0.0000E+00 | 0.0000E+00 |
| S5 | −1.6177E+00 | 1.0453E+00 | 2.6887E−01 | 3.5938E−02 | 6.3268E−02 | −2.1583E−02 | −2.2346E−02 |
| S6 | −2.8137E+00 | −1.6619E−01 | 2.1352E−01 | 7.9381E−02 | −9.4571E−02 | −5.4848E−02 | −1.3948E−02 |
| S7 | −1.1177E+00 | 2.7400E−01 | −3.6477E−02 | −2.7589E−03 | −2.5818E−03 | −1.3641E−03 | 1.7403E−05 |
| S8 | −9.6010E−01 | 2.2340E−01 | −8.7433E−02 | −1.8932E−02 | −2.1134E−02 | −5.1406E−03 | −1.7481E−03 |
| S9 | 2.8866E−01 | −1.3119E−01 | −1.0555E−01 | 2.5540E−01 | −6.2301E−02 | −1.0146E−01 | −4.9388E−02 |
| S10 | 8.9235E−01 | 2.0611E+00 | −1.8778E−01 | −1.5534E−01 | −2.0511E−01 | −1.7145E−01 | −7.3918E−02 |
| S11 | 1.3487E−02 | −5.7844E−04 | 9.6591E−06 | −2.5138E−08 | −1.3582E−09 | 2.3184E−11 | −2.5945E−13 |
| S12 | −2.9340E−02 | 5.0352E−04 | −4.5837E−06 | −3.0960E−10 | 6.1511E−10 | 5.4947E−12 | −2.2045E−13 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1+\sqrt{1-Kc^2r^2}} + u^4 \sum_{m=0}^{M} A_m Q_m^{con}(u^2)$$

After the foregoing operation, surface types of the object side surfaces and the image side surfaces of the second lens 452, the third lens 453, the fourth lens 454, the fifth lens 455, and the sixth lens 456 can be obtained through design.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u=r/r_{max}$.

In addition, design parameters of anamorphic aspherical surface coefficients of the first lens 451 in Implementation 9 of this application are shown in the following Table 36.

TABLE 36

Design parameters of anamorphic aspherical surfaces of an optical lens 45 in Implementation 9

| Surface sequence number | $A_{10}$ | $A_{12}$ | $A_{14}$ | $A_{21}$ | $A_{23}$ | $A_{25}$ | $A_{27}$ | $A_{36}$ |
|---|---|---|---|---|---|---|---|---|
| S1 | 1.639E−02 | 4.155E−02 | 1.904E−02 | −2.331E−03 | 8.124E−03 | 2.045E−02 | 7.081E−03 | 7.159E−03 |
| S2 | 3.662E−03 | 3.053E−02 | 1.182E−02 | 1.952E−02 | 4.634E−02 | 6.675E−02 | 1.869E−02 | 3.643E−03 |

| Surface sequence number | $A_{38}$ | $A_{40}$ | $A_{42}$ | $A_{44}$ | $A_{55}$ | $A_{57}$ | $A_{59}$ | $A_{61}$ |
|---|---|---|---|---|---|---|---|---|
| S1 | 7.968E−03 | 2.355E−02 | −2.004E−03 | −8.995E−03 | 4.926E−04 | 1.077E−02 | −6.689E−04 | 6.517E−03 |
| S2 | 1.759E−02 | 2.558E−02 | 3.977E−03 | −5.645E−05 | 1.481E−03 | 4.425E−03 | 3.646E−02 | −2.376E−03 |

| Surface sequence number | $A_{63}$ | $A_{65}$ | $A_{78}$ | $A_{80}$ | $A_{82}$ | $A_{84}$ | $A_{86}$ | $A_{88}$ |
|---|---|---|---|---|---|---|---|---|
| S1 | 1.333E−02 | 1.619E−02 | −1.777E−04 | −6.860E−03 | 5.177E−03 | 1.091E−02 | −2.038E−02 | 6.196E−03 |
| S2 | 1.836E−02 | −9.104E−04 | 1.702E−03 | −4.239E−03 | −5.167E−03 | −1.852E−02 | 8.694E−03 | 8.496E−03 |

| Surface sequence number | $A_{90}$ | $A_{105}$ | $A_{107}$ | $A_{109}$ | $A_{111}$ | $A_{113}$ | $A_{115}$ | $A_{117}$ |
|---|---|---|---|---|---|---|---|---|
| S1 | −1.409E−02 | −6.783E−05 | −4.739E−04 | 4.578E−04 | 4.629E−03 | 4.982E−03 | 5.177E−03 | 1.091E−02 |
| S2 | −1.470E−03 | −1.837E−06 | −1.648E−03 | −8.654E−03 | 1.636E−02 | −3.205E−02 | −5.167E−03 | −1.852E−02 |

| Surface sequence number | $A_{119}$ | $A_{136}$ | $A_{138}$ | $A_{140}$ | $A_{142}$ | $A_{144}$ | $A_{146}$ | $A_{148}$ |
|---|---|---|---|---|---|---|---|---|
| S1 | −2.038E−02 | 6.196E−03 | −1.409E−02 | −6.783E−05 | −4.739E−04 | 4.578E−04 | 4.629E−03 | 4.982E−03 |
| S2 | 8.694E−03 | 8.496E−03 | −1.470E−03 | −1.837E−06 | −1.648E−03 | −8.654E−03 | 1.636E−02 | −3.205E−02 |

| Surface sequence number | $A_{150}$ | $A_{152}$ |
|---|---|---|
| S1 | −2.070E−03 | −8.568E−04 |
| S2 | −8.405E−03 | 2.722E−04 |

Symbols such as $A_{10}$, $A_{12}$, $A_{14}$, $A_{21}$, $A_{23}$, $A_{25}$, and $A_{27}$ represent polynomial coefficients. The foregoing parameters are substituted into the following formulas:

$$z = \frac{cr^2}{1 + \sqrt{1 - (1+k)c^2 r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, surface types of the object side surface and the image side surface of the first lens 451 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 27:
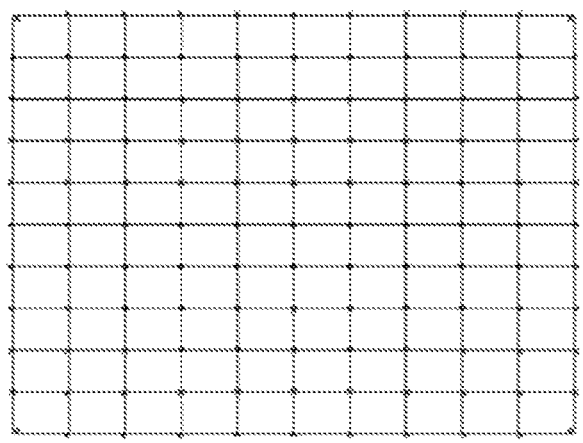
FIG. 27 is an imaging simulation diagram of each lens of the optical lens shown in FIG. 26.

FIG. 27 is an imaging simulation diagram of each lens of the optical lens shown in FIG. 26. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. Specifically, in this implementation, a maximum value TDT of TV distortion in the imaging range of the optical lens 45 meets |TDT|=1.4771%, and TV distortion in the imaging range of the optical lens 45 is small. It may be understood that the object side surface 4511 and the image side surface 4512 of the first lens 451 are set as anamorphic aspherical surfaces. Therefore, when light reflected by a to-be-imaged scene is incident from a lens close to the object side, obvious distortion caused by a large field of view can be corrected, and a correction effect can be achieved more easily.

Figure 28:
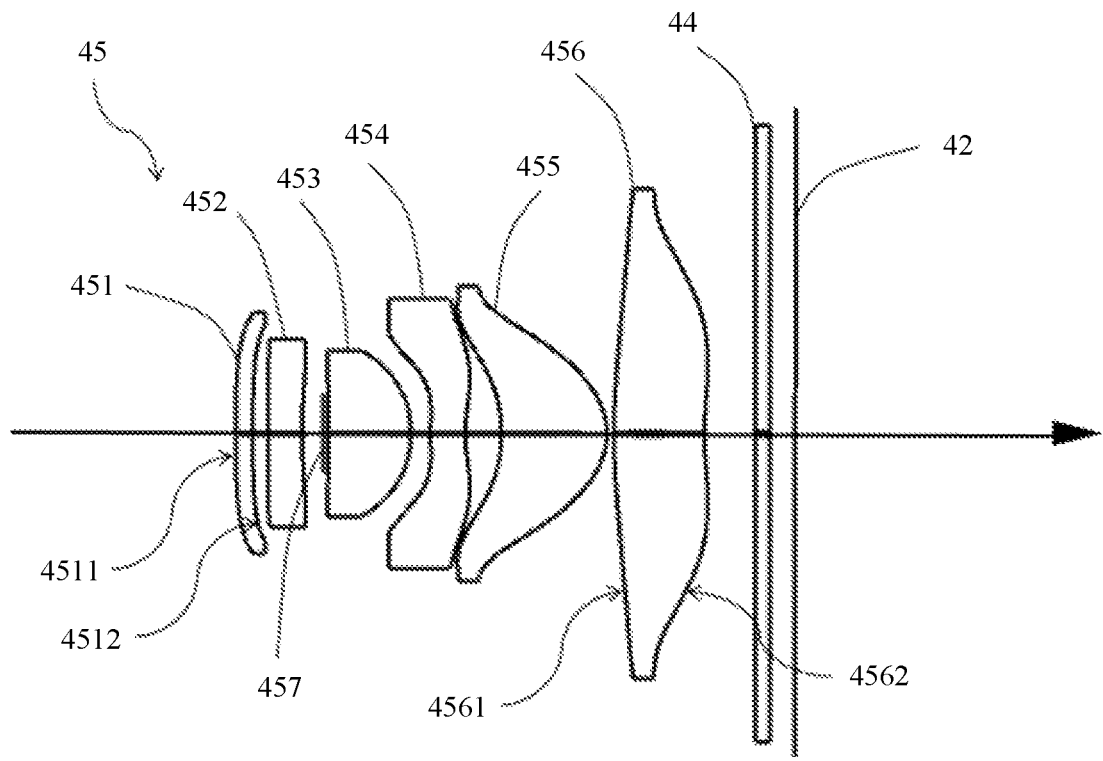
FIG. 28 is a schematic structural diagram of still another implementation of lenses of the optical lens shown in FIG. 5.

Implementation 10: FIG. 28 is a schematic structural diagram of still another implementation of lenses of the optical lens shown in FIG. 5. In this implementation, the optical lens 45 includes six lenses. The optical lens 45 includes a first lens 451, a second lens 452, a third lens 453, a fourth lens 454, a fifth lens 455, and a sixth lens 456 that are sequentially arranged from an object side to an image side. The first lens 451, the third lens 453, and the fifth lens 455 all have positive focal power. The second lens 452 and the fourth lens 454 both have negative focal power. The sixth lens 456 has negative focal power.

In this implementation, both an object side surface 4511 and an image side surface 4512 of the first lens 451 are anamorphic aspherical surfaces. Both an object side surface 4561 and an image side surface 4562 of the sixth lens 456 are anamorphic aspherical surfaces. Other lenses are all non-anamorphic lenses (namely, the second lens 452, the third lens 453, the fourth lens 454, and the fifth lens 455 are all non-anamorphic lenses), and both an object side surface and an image side surface of the non-anamorphic lens are non-anamorphic aspherical surfaces.

Design parameters of the optical lens 45 in Implementation 10 of this application are shown in the following Table 37.

TABLE 37

Design parameters of an optical lens 45 in Implementation 10

| Surface number | Surface type | Curvature radius | Thickness | Material Refractive index | Abbe number | Focal length | Conic coefficient |
|---|---|---|---|---|---|---|---|
| OBJ | Spherical surface | Infinite | Infinite | | | | 0.000 |
| S1 (AAS) | Aspherical surface | 21.69 | 0.25 | 1.544 | 55.865 | 307.23 | 146.14 |
| S2 (AAS) | Aspherical surface | 24.81 | 0.22 | | | | −100.00 |
| S3 | Aspherical surface | 55.29 | 0.49 | 1.901 | 37.054 | −13.50 | −4.09 |
| S4 | Aspherical surface | 9.98 | 0.30 | | | | −0.21 |
| STOP | Spherical surface | Infinite | 0.08 | | | | 0.00 |
| S5 | Aspherical surface | 29.99 | 1.18 | 1.544 | 55.865 | 3.14 | −220.49 |
| S6 | Aspherical surface | −1.79 | 0.28 | | | | 0.29 |
| S7 | Aspherical surface | 4.50 | 0.50 | 1.661 | 20.365 | −4.44 | −0.08 |
| S8 | Aspherical surface | 1.71 | 0.52 | | | | −12.49 |
| S9 | Aspherical surface | −2.36 | 1.51 | 1.544 | 55.865 | 2.04 | −1.93 |
| S10 | Aspherical surface | −0.93 | 0.10 | | | | −3.18 |
| S11 (AAS) | Aspherical surface | 9.03 | 1.29 | 1.544 | 55.865 | −7.96 | −83.14 |
| S12 (AAS) | Aspherical surface | 2.79 | 0.73 | | | | −77.21 |
| S13 | Spherical surface | Infinite | 0.21 | 1.517 | 64.167 | | 0.000 |
| S14 | Spherical surface | Infinite | 0.37 | | | | 0.000 |

Based on the data in Table 38, the design parameters of the optical lens 45 in Implementation 10 of this application may be obtained, and are shown in the following Table 38.

TABLE 38

Design parameters of an optical lens 45 in Implementation 10

| | | | |
|---|---|---|---|
| f1 (mm) | 307.23 | f4 (mm) | −4.44 |
| f2 (mm) | 13.5 | f5 (mm) | 2.04 |
| f3 (mm) | 3.14 | f6 (mm) | −7.96 |
| f (mm) | 2.54 | |f1/f| | 120.967 |
| |f2/f| | 5.314 | |f3/f| | 1.236 |
| |f4/f| | 1.748 | |f5/f| | 0.804 |
| |f6/f| | 3.134 | f2/f1 | −0.044 |
| f4/f3 | −1.414 | FOV (°) | 135 |
| f/EPD | 2.3 | T45/f | 0.199 |
| ImagH (mm) | 4.36 | TTL (mm) | 8.1 |
| ImagH/TTL | 0.538 | (T23 + T56)/TTL | 0.059 |
| R6/R10 | 1.929 | Fno | 2.3 |

It may be learned from Table 38 that the field of view (FOV) of the optical lens 45 is 135° and the F-number (Fno) is 2.3. In other words, the optical lens 45 in this application can implement a large field of view and a wide aperture, and can better meet a photographing requirement. In this implementation, TTL is 8.1 mm, ImagH is 4.36 mm, and ImagH/TTL=0.538.

In other words, when the effective pixel region formed on the photosensitive chip 42 through projection by the optical lens 45 in this implementation is large, the total optical length of the optical lens 45 can be small. Therefore, when high imaging quality is obtained, the length of the optical lens 45 can be small, and the optical lens 45 can be applied to a thin electronic device such as a mobile phone or a tablet.

Design parameters of aspherical surface coefficients of the non-anamorphic lenses (namely, the second lens 452, the third lens 453, the fourth lens 454, and the fifth lens 455) in Implementation 10 of this application are shown in the following Table 39.

TABLE 39

Design parameters of non-anamorphic lenses of an optical lens 45 in Implementation 10

| Surface number | $A_0$ | $A_1$ | $A_2$ | $A_3$ | $A_4$ | $A_5$ | $A_6$ |
|---|---|---|---|---|---|---|---|
| S3 | −1.00E−04 | 7.83E−04 | −6.92E−05 | 3.80E−05 | 1.04E−06 | 4.63E−06 | −3.31E−05 |
| S4 | −1.78E−06 | −2.68E−04 | 7.41E−04 | −1.10E−04 | −2.31E−06 | −3.78E−05 | 1.35E−05 |
| S5 | −1.64E+00 | 1.05E+00 | 2.67E−01 | 3.65E−02 | 6.31E−02 | −2.17E−02 | −2.20E−02 |
| S6 | −2.82E+00 | −1.60E−01 | 2.09E−01 | 8.10E−02 | −9.52E−02 | −5.50E−02 | −1.33E−02 |
| S7 | −1.12E+00 | 2.74E−01 | −3.60E−02 | −2.73E−03 | −2.53E−03 | −1.49E−03 | 5.66E−05 |
| S8 | −9.60E−01 | 2.23E−01 | −8.79E−02 | −1.84E−02 | −2.14E−02 | −5.30E−03 | −1.59E−03 |

TABLE 39-continued

Design parameters of non-anamorphic lenses of an optical lens 45 in Implementation 10

| Surface number | $A_0$ | $A_1$ | $A_2$ | $A_3$ | $A_4$ | $A_5$ | $A_6$ |
|---|---|---|---|---|---|---|---|
| S9 | 2.90E−01 | −1.32E−01 | −1.04E−01 | 2.55E−01 | −6.16E−02 | −1.03E−01 | −4.89E−02 |
| S10 | 8.90E−01 | 2.06E+00 | −1.90E−01 | −1.55E−01 | −2.05E−01 | −1.73E−01 | −7.09E−02 |

Symbols such as $A_0$, $A_1$, $A_2$, $A_3$, $A_4$, $A_5$, and $A_6$ represent the aspherical surface coefficients. The foregoing parameters are substituted into the following formula:

$$z = \frac{cr^2}{1 + \sqrt{1 - Kc^2 r^2}} + u^4 \sum_{m=0}^{M} A_m Q_m^{con}(u^2)$$

After the foregoing operation, surface types of the object side surfaces and the image side surfaces of the second lens 452, the third lens 453, the fourth lens 454, and the fifth lens 455 can be obtained through design.

In this implementation, z is a vector height of the aspherical surface, r is a radial coordinate of the aspherical surface, c is a spherical curvature of a vertex on the aspherical surface, K is a conic constant, $A_m$ is the aspherical surface coefficient, $r_{max}$ is a maximum value of the radial coordinate, and $u = r/r_{max}$.

In addition, design parameters of anamorphic aspherical surface coefficients of the first lens 451 and the sixth lens 456 in Implementation 10 of this application are shown in the following Table 40.

TABLE 40

Design parameters of anamorphic aspherical surfaces of an optical lens 45 in Implementation 10

| Surface sequence number | $A_{10}$ | $A_{12}$ | $A_{14}$ | $A_{21}$ | $A_{23}$ | $A_{25}$ | $A_{27}$ | $A_{36}$ | $A_{38}$ |
|---|---|---|---|---|---|---|---|---|---|
| S1 | 1.57E−02 | 4.11E−02 | 1.82E−02 | −2.18E−03 | 8.58E−03 | 2.12E−02 | 7.25E−03 | 7.17E−03 | 8.52E−03 |
| S2 | 4.91E−03 | 3.35E−02 | 1.32E−02 | 1.94E−02 | 4.62E−02 | 6.63E−02 | 1.86E−02 | 3.56E−03 | 1.72E−02 |
| S11 | −2.12E+03 | 3.31E−02 | 1.65E−02 | −2.44E+06 | −1.77E+08 | −1.95E+08 | −2.90E+07 | −3.75E+08 | −4.76E+10 |
| S12 | −3.14E−02 | −6.38E−02 | −3.20E−02 | 3.24E−03 | 9.61E−03 | 9.70E−03 | 3.23E−03 | −1.26E−04 | −5.14E−04 |

| Surface sequence number | $A_{40}$ | $A_{42}$ | $A_{44}$ | $A_{55}$ | $A_{57}$ | $A_{59}$ | $A_{61}$ | $A_{63}$ | $A_{65}$ |
|---|---|---|---|---|---|---|---|---|---|
| S1 | 2.43E−02 | −1.28E−03 | −8.79E−03 | 5.32E−04 | 1.09E−02 | −3.88E−04 | 6.84E−03 | 1.37E−02 | 1.62E−02 |
| S2 | 2.49E−02 | 3.28E−03 | −1.84E−04 | 1.44E−03 | 4.21E−03 | 3.60E−02 | −2.88E−03 | 1.82E−02 | −9.88E−04 |
| S11 | −2.43E+10 | −7.16E+10 | −1.05E+10 | −2.83E+12 | −4.50E+12 | 2.39E+13 | 1.48E+13 | 9.29E+12 | −2.97E+11 |
| S12 | −7.76E−04 | −5.03E−04 | −1.26E−04 | −7.08E−07 | −3.73E−06 | −8.48E−06 | −7.35E−06 | −3.15E−06 | −6.32E−07 |

| Surface sequence number | $A_{78}$ | $A_{80}$ | $A_{82}$ | $A_{84}$ | $A_{86}$ | $A_{88}$ | $A_{90}$ | $A_{105}$ | $A_{107}$ |
|---|---|---|---|---|---|---|---|---|---|
| S1 | −1.66E−04 | −6.81E−03 | 5.18E−03 | 1.07E−02 | −2.04E−02 | 6.41E−03 | −1.41E−02 | −6.40E−05 | −4.86E−04 |
| S2 | 1.69E−03 | −4.19E−03 | −5.36E−03 | −1.87E−02 | 8.55E−03 | 8.49E−03 | −1.41E−03 | 5.64E−06 | −1.46E−03 |
| S11 | 2.83E+14 | 2.26E+15 | 5.20E+16 | −1.77E+16 | 9.17E+16 | 6.89E+16 | 5.33E+15 | 1.65E+18 | 4.68E+18 |
| S12 | 2.65E−07 | 1.61E−06 | 3.98E−06 | 5.41E−06 | 3.98E−06 | 1.65E−06 | 2.71E−07 | 1.79E−08 | 1.29E−07 |

| Surface sequence number | $A_{109}$ | $A_{111}$ | $A_{113}$ | $A_{115}$ | $A_{117}$ | $A_{119}$ | $A_{136}$ | $A_{138}$ | $A_{140}$ |
|---|---|---|---|---|---|---|---|---|---|
| S1 | 3.85E−04 | 4.29E−03 | 4.55E−03 | −8.79E−03 | −2.35E−03 | 5.86E−03 | 1.15E−05 | 1.37E−03 | −1.70E−03 |
| S2 | −8.40E−03 | 1.61E−02 | −3.20E−02 | −2.12E−05 | −5.10E−03 | 1.25E−03 | −6.05E−04 | 2.27E−03 | 4.10E−03 |
| S11 | 1.41E+19 | −1.77E+19 | −7.12E+19 | 2.47E+20 | 1.17E+20 | 6.80E+18 | 2.26E+21 | 8.95E+21 | −2.58E+22 |
| S12 | 3.88E−07 | 6.53E−07 | 6.54E−07 | 3.77E−07 | 1.35E−07 | 1.81E−08 | −1.75E−09 | −1.36E−08 | −4.74E−08 |

| Surface sequence number | $A_{142}$ | $A_{144}$ | $A_{146}$ | $A_{148}$ | $A_{150}$ | $A_{152}$ |
|---|---|---|---|---|---|---|
| S1 | −9.27E−03 | −1.02E−02 | 1.77E−02 | 2.24E−03 | −2.04E−03 | −8.66E−04 |
| S2 | −8.35E−02 | 7.71E−02 | 7.91E−03 | −1.37E−02 | −7.51E−03 | 2.74E−04 |
| S11 | −7.49E+22 | −1.18E+23 | −1.48E+23 | 5.94E+23 | 9.67E+22 | 6.28E+21 |
| S12 | −9.40E−08 | −1.18E−07 | −9.33E−08 | −5.04E−08 | −1.22E−08 | −1.75E−09 |

Symbols such as $A_{10}$, $A_{12}$, $A_{14}$, $A_{21}$, $A_{23}$, $A_{25}$, and $A_{27}$ represent polynomial coefficients. The foregoing parameters are substituted into the following formulas:

$$z = \frac{cr^2}{1+\sqrt{1-(1+k)c^2r^2}} + \sum_{i=1}^{N} A_i E_i(x, y)$$

$$\sum_{i=1}^{N} A_i x^m y^n = A_1 x^1 y^0 + A_2 x^0 y^1 + A_3 x^2 y^0 + A_4 x^1 y^1 + A_5 x^0 y^2 +$$
$$A_6 x^3 y^0 + A_7 x^2 y^1 + A_8 x^1 y^2 + A_9 x^0 y^3 + A_{10} x^4 y^0 + \ldots + A_{152} x^0 y^{16}$$

After the foregoing operation, the object side surface 4511 and the image side surface 4512 of the first lens 451 and the object side surface 4561 and the image side surface 4562 of the sixth lens 456 in this implementation can be obtained through design.

In this implementation, z is a vector height parallel to a Z-axis, N is a total quantity of polynomial coefficients in series, A is a coefficient of an $i^{th}$ extended polynomial, r is a radial coordinate of the aspherical surface, c is a spherical curvature of a vertex on the aspherical surface, and K is a conic constant. Polynomial coefficients (such as $A_1$ and $A_2$) that do not exist in the table are 0.

Figure 29:
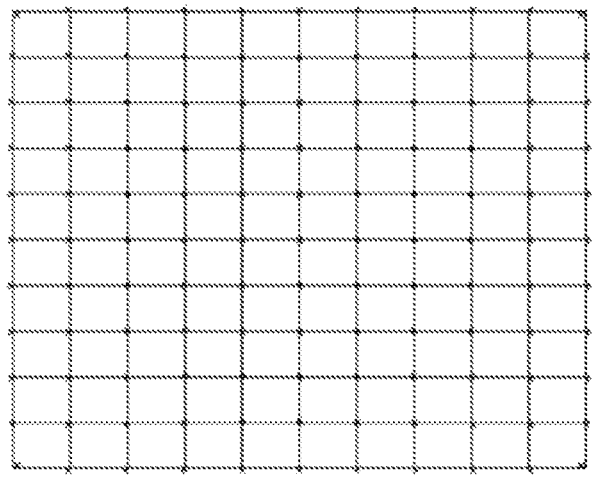
FIG. 29 is an imaging simulation diagram of each lens of the optical lens shown in FIG. 28.

FIG. 29 is an imaging simulation diagram of each lens of the optical lens shown in FIG. 28. A solid-line grid is an ideal imaging grid diagram, and a grid structure formed by a symbol "X" is a schematic diagram of imaging by the optical lens 45 in this implementation. It may be learned from the figure that imaging by the optical lens 45 in this implementation is basically the same as ideal imaging, and TV distortion in an imaging range of the optical lens 45 is small. A maximum value TDT of TV distortion in the imaging range of the optical lens 45 meets |TDT|=1.8%, and TV distortion in the imaging range of the optical lens 45 is small. It may be understood that the object side surface 4511 and the image side surface 4512 of the first lens 451 are set as anamorphic aspherical surfaces. Therefore, when light reflected by a to-be-imaged scene is incident from a lens close to the object side, obvious distortion caused by a large field of view can be corrected, and a correction effect can be achieved more easily. In addition, when the object side surface 4561 and the image side surface 4562 of the sixth lens 456 are set as anamorphic aspherical surfaces, the sixth lens 456 can correct field curvature and astigmatism in imaging by the optical lens 45, and can also correct distortion.

In the foregoing implementations, the first lens 451, the third lens 453, and the fifth lens 455 have positive focal power through setting, the second lens 452 and the fourth lens 454 have negative focal power through setting, and the sixth lens 456 has positive focal power or negative focal power through setting. Therefore, when it is ensured that the optical lens 45 implements good imaging quality, the field of view of the optical lens 45 can be increased to a large degree to implement ultra-wide-angle setting of the optical lens 45.

In addition, as the field of view of the optical lens is increased, imaging distortion of the optical lens becomes more obvious. For example, when the field of view of the optical lens reaches 100°, imaging distortion of the optical lens has been greater than 10%. For ultra-wide-angle setting of the optical lens, imaging distortion of the optical lens is more obvious, and imaging quality is poorer. In this application, at least one anamorphic aspherical surface is disposed in the lenses of the optical lens 45 that implements an ultra-wide-angle design. Therefore, a design degree of freedom of an optical system is improved. In addition, imaging quality of the optical lens can be optimized and distortion of the optical lens can be corrected by using asymmetry of a free region, so that good imaging quality of the optical lens is ensured.

Therefore, the optical lens 45 in this implementation can implement ultra-wide-angle photographing, and can also resolve a distortion problem in ultra-wide-angle imaging to a large degree. In other words, in this implementation, the ultra-wide-angle optical lens 45 with small imaging distortion is designed.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical lens, comprising a first lens, a second lens, a third lens, a fourth lens, a fifth lens, and a sixth lens that are sequentially arranged from an object side to an image side, wherein the first lens, the third lens, and the fifth lens all have positive focal power, the second lens and the fourth lens both have negative focal power, and the sixth lens has positive focal power or negative focal power; and object side surfaces and image side surfaces of lenses from the first lens to the sixth lens comprise at least one anamorphic aspherical surface, wherein the optical lens meets 100°≤FOV≤140°, and FOV is a field of view of the camera lens group.

2. The optical lens according to claim 1, wherein a focal length f1 of the first lens and a focal length f2 of the second lens meet −0.5<f2/f1<−0.01.

3. The optical lens according to claim 2, wherein a focal length f3 of the third lens and a focal length f4 of the fourth lens meet −4<f4/f3<0.

4. The optical lens according to claim 3, wherein a focal length f5 of the fifth lens and a focal length f of the optical lens meet 0.1<f5/f<1.5.

5. The optical lens according to claim 1, wherein a curvature radius R6 of the image side surface of the third lens and a curvature radius R10 of the image side surface of the fifth lens meet 0<R6/R10<2.9.

6. The optical lens according to claim 1, wherein a distance T45 between the fourth lens and the fifth lens and the focal length f of the optical lens meet 0.05<T45/f<0.4.

7. The optical lens according to claim 6, wherein the optical lens meets the following:
   0<(T23+T56)/TTL<0.5, wherein
   T23 is a distance between the second lens and the third lens, T56 is a distance between the fifth lens and the sixth lens, and TTL is a distance from the object side surface of the first lens to an imaging plane in an optical axis direction of the optical lens.

8. The optical lens according to claim 1, wherein the at least one anamorphic aspherical surface comprises a first vertex and a second vertex, the first vertex and the second vertex are located in an optical effective region of the anamorphic aspherical surface, and are both located on a sagittal plane of a lens in which the anamorphic aspherical surface is located, and the first vertex and the second vertex are symmetric with respect to a meridional plane of the lens in which the anamorphic aspherical surface is located; and a distance from the first vertex to a first reference plane is equal to a distance from the second vertex to the first reference plane, the first reference plane is perpendicular to an optical axis of the optical lens, and a point at which the optical axis of the optical lens intersects the anamorphic aspherical surface is located on the first reference plane.

9. The optical lens according to claim 8, wherein the anamorphic aspherical surface further comprises a third vertex and a fourth vertex, the third vertex and the fourth vertex are both located in the optical effective region of the anamorphic aspherical surface, and are both located on the meridional plane of the lens in which the anamorphic aspherical surface is located, and the third vertex and the fourth vertex are symmetric with respect to the sagittal plane of the lens in which the anamorphic aspherical surface is located; and a distance from the third vertex to the first reference plane is equal to a distance from the fourth vertex to the first reference plane.

10. The optical lens according to claim 1, wherein the optical lens comprises a stop, and the stop is located between the second lens and the third lens.

11. The optical lens according to claim 1, wherein the optical lens meets |TDT|≤5.0%, and TDT is a maximum value of TV distortion in an imaging range of the optical lens.

12. The optical lens according to claim 1, wherein the optical lens meets the following:

0<ImagH/TTL<1, wherein TTL is the distance from the object side surface of the first lens to the imaging plane in the optical axis direction of the optical lens, and ImagH is an imaging height on the imaging plane.

13. A camera module, comprising a circuit board, a photosensitive chip, wherein the photosensitive chip and the optical lens are both fastened to the circuit board, and the optical lens is configured to project ambient light to the photosensitive chip;

wherein the optical lens comprises a first lens, a second lens, a third lens, a fourth lens, a fifth lens, and a sixth lens that are sequentially arranged from an object side to an image side, wherein the first lens, the third lens, and the fifth lens all have positive focal power, the second lens and the fourth lens both have negative focal power, and the sixth lens has positive focal power or negative focal power; object side surfaces and image side surfaces of lenses from the first lens to the sixth lens comprise at least one anamorphic aspherical surface; and the optical lens meets 100°≤FOV≤140°, and FOV is a field of view of the camera lens group.

14. An electronic device, comprising a housing, a camera module that is mounted in the housing and comprises a circuit board, a photosensitive chip, and an optical lens, wherein the photosensitive chip and the optical lens are both fastened to the circuit board, wherein the optical lens is configured to project ambient light to the photosensitive chip and comprises a first lens, a second lens, a third lens, a fourth lens, a fifth lens, and a sixth lens that are sequentially arranged from an object side to an image side, wherein the first lens, the third lens, and the fifth lens all have positive focal power, the second lens and the fourth lens both have negative focal power, and the sixth lens has positive focal power or negative focal power; and object side surfaces and image side surfaces of lenses from the first lens to the sixth lens comprise at least one anamorphic aspherical surface, wherein the optical lens meets 100°≤FOV<140°, and FOV is a field of view of the camera lens group.

15. The optical lens according to claim 14, wherein a focal length f1 of the first lens and a focal length f2 of the second lens meet −0.5<f2/f1<−0.01.

16. The optical lens according to claim 15, wherein a focal length f3 of the third lens and a focal length f4 of the fourth lens meet −4<f4/f3<0.

17. The optical lens according to claim 16, wherein a focal length f5 of the fifth lens and a focal length f of the optical lens meet 0.1<f5/f<1.5.

18. The optical lens according to claim 14, wherein a curvature radius R6 of the image side surface of the third lens and a curvature radius R10 of the image side surface of the fifth lens meet 0<R6/R10<2.9.

19. The optical lens according to claim 14, wherein a distance T45 between the fourth lens and the fifth lens and the focal length f of the optical lens meet 0.05<T45/f<0.4.

* * * * *